United States Patent
Batz et al.

(10) Patent No.: US 9,825,769 B2
(45) Date of Patent: *Nov. 21, 2017

(54) SYSTEM AND METHOD TO FACILITATE THE ASSIGNMENT OF SERVICE FUNCTIONS FOR SERVICE CHAINS IN A NETWORK ENVIRONMENT

(71) Applicant: CISCO TECHNOLOGY, INC., San Jose, CA (US)

(72) Inventors: Robert M. Batz, Raleigh, NC (US); Ian McDowell Campbell, Bow Mar, CO (US); Hendrikus G. P. Bosch, Aalsmeer (NL)

(73) Assignee: Cisco Technology, Inc., San Jose, CA (US)

( * ) Notice: Subject to any disclaimer, the term of this patent is extended or adjusted under 35 U.S.C. 154(b) by 114 days.

This patent is subject to a terminal disclaimer.

(21) Appl. No.: 14/728,010

(22) Filed: Jun. 2, 2015

(65) Prior Publication Data

US 2016/0344803 A1 Nov. 24, 2016

Related U.S. Application Data

(63) Continuation of application No. 14/717,887, filed on May 20, 2015.

(51) Int. Cl.
*H04L 12/14* (2006.01)
*H04L 29/08* (2006.01)
(Continued)

(52) U.S. Cl.
CPC ...... *H04L 12/1407* (2013.01); *H04L 41/0893* (2013.01); *H04L 61/25* (2013.01);
(Continued)

(58) Field of Classification Search
CPC . H04L 12/1407; H04L 67/14; H04L 67/1002; H04L 61/25; H04L 61/6068; H04M 15/66
See application file for complete search history.

(56) References Cited

U.S. PATENT DOCUMENTS 3,629,512 A 12/1971 Yuan
4,769,811 A 9/1988 Eckberg et al.
(Continued)

FOREIGN PATENT DOCUMENTS

CN 104011687 A 8/2014
CN 105098809 11/2015
(Continued)

OTHER PUBLICATIONS

Halpern et al., RFC 7665, "Service Function Chaining (SFC) Architecture", Oct. 2015.*
(Continued)

*Primary Examiner* — Jianye Wu
(74) *Attorney, Agent, or Firm* — Patterson + Sheridan, LLP

(57) ABSTRACT

A method is provided in one example embodiment and may include receiving a first Internet protocol (IP) flow for an IP session for a subscriber; selecting a first service function group from a plurality of service function groups to perform one or more services for the IP session for the subscriber, wherein each of the plurality of service function groups comprises a plurality of service function chain types and wherein each service function chain type comprises an ordered combination of one or more service functions; assigning the IP session for the subscriber to the first service function group; and forwarding the first IP flow for the IP session of the subscriber across a first service function chain type for the first service function group based, at least in part, on a service policy for the subscriber.

20 Claims, 13 Drawing Sheets

(51) Int. Cl.
*H04L 29/12* (2006.01)
*H04M 15/00* (2006.01)
*H04L 12/26* (2006.01)
*H04L 12/24* (2006.01)

(52) U.S. Cl.
CPC .......... *H04L 67/1002* (2013.01); *H04L 67/14* (2013.01); *H04M 15/66* (2013.01); *H04L 12/1403* (2013.01); *H04L 41/5096* (2013.01); *H04L 43/028* (2013.01); *H04L 61/2514* (2013.01); *H04L 61/6068* (2013.01)

(56) References Cited

U.S. PATENT DOCUMENTS

| | | |
|---|---|---|
| 5,408,231 A | 4/1995 | Bowdon |
| 5,491,690 A | 2/1996 | Alfonsi et al. |
| 5,600,638 A | 2/1997 | Bertin et al. |
| 5,687,167 A | 11/1997 | Bertin et al. |
| 6,115,384 A | 9/2000 | Parzych |
| 6,167,438 A | 12/2000 | Yates et al. |
| 6,400,681 B1 | 6/2002 | Bertin et al. |
| 6,661,797 B1 | 12/2003 | Goel et al. |
| 6,687,229 B1 | 2/2004 | Kataria et al. |
| 6,799,270 B1 | 9/2004 | Bull et al. |
| 6,888,828 B1 | 5/2005 | Partanen et al. |
| 6,993,593 B2 | 1/2006 | Iwata |
| 7,027,408 B2 | 4/2006 | Nabkel et al. |
| 7,062,567 B2 | 6/2006 | Benitez et al. |
| 7,095,715 B2 | 8/2006 | Buckman et al. |
| 7,096,212 B2 | 8/2006 | Tribble et al. |
| 7,139,239 B2 | 11/2006 | McFarland |
| 7,165,107 B2 | 1/2007 | Pouyoul et al. |
| 7,197,008 B1 | 3/2007 | Shabtay et al. |
| 7,197,660 B1 | 3/2007 | Liu et al. |
| 7,209,435 B1 | 4/2007 | Kuo et al. |
| 7,227,872 B1 | 6/2007 | Biswas |
| 7,231,462 B2 | 6/2007 | Berthaud et al. |
| 7,333,990 B1 | 2/2008 | Thiagarajan |
| 7,443,796 B1 | 10/2008 | Albert et al. |
| 7,458,084 B2 | 11/2008 | Zhang et al. |
| 7,486,622 B2 | 2/2009 | Regan et al. |
| 7,536,396 B2 | 5/2009 | Johnson et al. |
| 7,558,261 B2 | 7/2009 | Arregoces et al. |
| 7,567,504 B2 | 7/2009 | Darling et al. |
| 7,571,470 B2 | 8/2009 | Arregoces et al. |
| 7,573,879 B2 | 8/2009 | Narad |
| 7,610,375 B2 | 10/2009 | Portolani et al. |
| 7,643,468 B1 | 1/2010 | Arregoces et al. |
| 7,644,182 B2 | 1/2010 | Banerjee |
| 7,647,422 B2 | 1/2010 | Singh et al. |
| 7,657,940 B2 | 2/2010 | Portolani et al. |
| 7,668,116 B2 | 2/2010 | Wijnands et al. |
| 7,684,321 B2 | 3/2010 | Muirhead et al. |
| 7,738,469 B1 | 6/2010 | Shekokar et al. |
| 7,814,284 B1 | 10/2010 | Glass et al. |
| 7,831,693 B2 | 11/2010 | Lai |
| 7,860,095 B2 | 12/2010 | Forissier et al. |
| 7,860,100 B2 | 12/2010 | Khalid et al. |
| 7,895,425 B2 | 2/2011 | Khalid et al. |
| 7,899,012 B2 | 3/2011 | Ho et al. |
| 7,899,861 B2 | 3/2011 | Feblowitz et al. |
| 7,907,595 B2 | 3/2011 | Khanna et al. |
| 7,983,174 B1 | 7/2011 | Monaghan et al. |
| 7,990,847 B1 | 8/2011 | Leroy et al. |
| 8,000,329 B2 | 8/2011 | Fendick et al. |
| 8,018,938 B1 | 9/2011 | Fromm et al. |
| 8,094,575 B1 | 1/2012 | Vadlakonda |
| 8,166,465 B2 | 4/2012 | Feblowitz et al. |
| 8,180,909 B2 | 5/2012 | Hartman et al. |
| 8,195,774 B2 | 6/2012 | Lambeth et al. |
| 8,280,354 B2 | 10/2012 | Smith et al. |
| 8,281,302 B2 | 10/2012 | Durazzo et al. |
| 8,291,108 B2 | 10/2012 | Raja et al. |
| 8,305,900 B2 | 11/2012 | Bianconi |
| 8,311,045 B2 | 11/2012 | Quinn et al. |
| 8,316,457 B1 | 11/2012 | Paczkowski et al. |
| 8,442,043 B2 | 5/2013 | Sharma et al. |
| 8,464,336 B2 | 6/2013 | Wei et al. |
| 8,520,672 B2 | 8/2013 | Guichard et al. |
| 8,601,152 B1 | 12/2013 | Chou |
| 8,612,612 B1 | 12/2013 | Dukes et al. |
| 8,676,980 B2 | 3/2014 | Kreeger et al. |
| 8,700,892 B2 | 4/2014 | Bollay |
| 8,730,980 B2 | 5/2014 | Bagepalli et al. |
| 8,743,885 B2 | 6/2014 | Khan et al. |
| 8,751,420 B2 | 6/2014 | Hjelm et al. |
| 8,762,534 B1 | 6/2014 | Hong et al. |
| 8,762,707 B2 | 6/2014 | Killian |
| 8,792,490 B2 | 7/2014 | Jabr et al. |
| 8,793,400 B2 | 7/2014 | McDysan |
| 8,825,070 B2 | 9/2014 | Akhtar et al. |
| 8,830,834 B2 | 9/2014 | Sharma et al. |
| 8,904,037 B2 | 12/2014 | Haggar et al. |
| 9,001,827 B2 | 4/2015 | Appenzeller |
| 9,071,533 B2 | 6/2015 | Hui et al. |
| 9,077,661 B2 | 7/2015 | Andreasen et al. |
| 9,088,584 B2 | 7/2015 | Feng et al. |
| 9,130,872 B2 | 9/2015 | Kumar et al. |
| 9,143,438 B2 | 9/2015 | Khan et al. |
| 9,160,797 B2 | 10/2015 | McDysan |
| 9,178,812 B2 | 11/2015 | Guichard et al. |
| 9,253,274 B2 | 2/2016 | Quinn et al. |
| 9,300,585 B2 | 3/2016 | Kumar et al. |
| 9,344,337 B2 | 5/2016 | Kumar et al. |
| 9,374,297 B2 | 6/2016 | Bosch et al. |
| 9,379,931 B2 | 6/2016 | Bosch et al. |
| 9,398,486 B2 | 7/2016 | La Roche, Jr. et al. |
| 9,413,655 B2 | 8/2016 | La Roche, Jr. et al. |
| 9,479,443 B2 | 10/2016 | Bosch et al. |
| 2001/0023442 A1 | 9/2001 | Masters |
| 2002/0131362 A1 | 9/2002 | Callon |
| 2002/0156893 A1 | 10/2002 | Pouyoul et al. |
| 2002/0167935 A1 | 11/2002 | Nabkel et al. |
| 2003/0023879 A1 | 1/2003 | Wray |
| 2003/0088698 A1 | 5/2003 | Singh et al. |
| 2003/0110081 A1 | 6/2003 | Tosaki |
| 2003/0120816 A1 | 6/2003 | Berthaud et al. |
| 2014/0115062 A1 | 6/2003 | McDysan |
| 2003/0226142 A1 | 12/2003 | Rand |
| 2004/0109412 A1 | 6/2004 | Hansson |
| 2004/1483901 | 7/2004 | Lake et al. |
| 2004/0199812 A1 | 10/2004 | Earl et al. |
| 2004/0264481 A1 | 12/2004 | Darling et al. |
| 2004/0268357 A1 | 12/2004 | Joy et al. |
| 2005/0044197 A1 | 2/2005 | Lai |
| 2005/0086367 A1 | 4/2005 | Conta et al. |
| 2005/0152378 A1 | 7/2005 | Bango et al. |
| 2005/0160180 A1 | 7/2005 | Rabje et al. |
| 2005/0204042 A1 | 9/2005 | Banerjee |
| 2005/0257002 A1 | 11/2005 | Nguyen |
| 2005/0281257 A1 | 12/2005 | Yazaki et al. |
| 2005/0286540 A1 | 12/2005 | Hurtta et al. |
| 2005/0289244 A1 | 12/2005 | Sahu et al. |
| 2006/0005240 A1 | 1/2006 | Sundarrajan |
| 2006/0045024 A1 | 3/2006 | Previdi et al. |
| 2006/0074502 A1 | 4/2006 | McFarland |
| 2006/0092950 A1 | 5/2006 | Arregoces et al. |
| 2006/0095960 A1 | 5/2006 | Arregoces et al. |
| 2006/0112400 A1 | 5/2006 | Zhang et al. |
| 2006/0168223 A1 | 7/2006 | Mishra et al. |
| 2006/0233106 A1 | 10/2006 | Achlioptas et al. |
| 2006/0233155 A1 | 10/2006 | Srivastava |
| 2007/0061441 A1 | 3/2007 | Landis et al. |
| 2007/0067435 A1 | 3/2007 | Landis et al. |
| 2007/0143851 A1 | 6/2007 | Nicodemus et al. |
| 2007/0237147 A1 | 10/2007 | Quinn et al. |
| 2007/0250836 A1 | 10/2007 | Li et al. |
| 2008/0080509 A1 | 4/2008 | Khanna et al. |
| 2008/0080517 A1 | 4/2008 | Roy et al. |
| 2008/0170542 A1 | 7/2008 | Hu |
| 2008/0177896 A1 | 7/2008 | Quinn |
| 2008/0181118 A1 | 7/2008 | Sharma |
| 2008/0196083 A1 | 8/2008 | Parks et al. |
| 2008/0209039 A1 | 8/2008 | Tracey et al. |

(56) References Cited

U.S. PATENT DOCUMENTS

| | | |
|---|---|---|
| 2008/0219287 A1 | 9/2008 | Krueger et al. |
| 2008/0225710 A1 | 9/2008 | Raja et al. |
| 2008/0291910 A1 | 11/2008 | Tadimeti et al. |
| 2009/0003364 A1 | 1/2009 | Fendick et al. |
| 2009/0006152 A1 | 1/2009 | Timmerman et al. |
| 2009/0204612 A1 | 8/2009 | Keshavarz-Nia et al. |
| 2009/0300207 A1 | 12/2009 | Giaretta |
| 2009/0300407 A1 | 12/2009 | Kamath et al. |
| 2009/0305699 A1 | 12/2009 | Deshpande |
| 2009/0328054 A1 | 12/2009 | Paramasivam et al. |
| 2010/0054260 A1 | 3/2010 | Pandey et al. |
| 2010/0063988 A1 | 3/2010 | Khalid |
| 2010/0080226 A1 | 4/2010 | Khalid et al. |
| 2010/0165985 A1 | 7/2010 | Sharma et al. |
| 2010/0214949 A1 | 8/2010 | Smith et al. |
| 2010/0254385 A1 | 10/2010 | Sharma et al. |
| 2010/0318784 A1 | 12/2010 | Rao et al. |
| 2011/0023090 A1 | 1/2011 | Asati et al. |
| 2011/0032833 A1 | 2/2011 | Zhang et al. |
| 2011/0055845 A1 | 3/2011 | Nandagopal |
| 2011/0131338 A1 | 6/2011 | Hu |
| 2011/0161494 A1 | 6/2011 | McDysan |
| 2011/0167471 A1 | 7/2011 | Riley et al. |
| 2011/0184807 A1 | 7/2011 | Wang et al. |
| 2011/0235508 A1 | 9/2011 | Goel |
| 2011/0246899 A1 | 10/2011 | Kwon et al. |
| 2011/0255538 A1 | 10/2011 | Srinivasan |
| 2011/0264905 A1 | 10/2011 | Ovsiannikov |
| 2011/0320580 A1 | 12/2011 | Zhou |
| 2012/0030365 A1 | 2/2012 | Lidstrom et al. |
| 2012/0087262 A1 | 4/2012 | Rasanen |
| 2012/0131662 A1 | 5/2012 | Kuik |
| 2012/0185853 A1 | 7/2012 | Haviv et al. |
| 2012/0278804 A1 | 11/2012 | Narayanasamy et al. |
| 2012/0281540 A1 | 11/2012 | Khan |
| 2012/0281544 A1 | 11/2012 | Anepu |
| 2012/0327767 A1 | 12/2012 | Ramakrishnan |
| 2012/0327947 A1 | 12/2012 | Cai |
| 2012/0331135 A1 | 12/2012 | Alon et al. |
| 2013/0003735 A1 | 1/2013 | Chao et al. |
| 2013/0003736 A1 | 1/2013 | Szyszko |
| 2013/0031271 A1 | 1/2013 | Bosch et al. |
| 2013/0040640 A1 | 2/2013 | Chen et al. |
| 2013/0044636 A1 | 2/2013 | Koponen |
| 2013/0086236 A1 | 4/2013 | Baucke et al. |
| 2013/0097323 A1 | 4/2013 | Barsness et al. |
| 2013/0121137 A1 | 5/2013 | Feng et al. |
| 2013/0121207 A1 | 5/2013 | Parker |
| 2013/0124708 A1 | 5/2013 | Lee |
| 2013/0125124 A1 | 5/2013 | Kempf et al. |
| 2013/0155902 A1 | 6/2013 | Feng et al. |
| 2013/0163594 A1 | 6/2013 | Sharma |
| 2013/0163606 A1 | 6/2013 | Bagepalli et al. |
| 2013/0188554 A1 | 7/2013 | Cai |
| 2013/0198412 A1 | 8/2013 | Saito |
| 2013/0215215 A1 | 8/2013 | Gage et al. |
| 2013/0215888 A1 | 8/2013 | Zhang et al. |
| 2013/0223290 A1 | 8/2013 | Zhou |
| 2013/0223449 A1 | 8/2013 | Koganti et al. |
| 2013/0235874 A1 | 9/2013 | Ringdahl et al. |
| 2013/0238774 A1 | 9/2013 | Davison et al. |
| 2013/0272305 A1 | 10/2013 | Lefebvre et al. |
| 2013/0279503 A1 | 10/2013 | Chiabaut |
| 2013/0311675 A1 | 11/2013 | Kancherla |
| 2013/0329584 A1 | 12/2013 | Ghose |
| 2014/0010084 A1 | 1/2014 | Kavunder et al. |
| 2014/0010085 A1 | 1/2014 | Kavunder et al. |
| 2014/0036730 A1 | 2/2014 | Nellikar |
| 2014/0050223 A1 | 2/2014 | Foo et al. |
| 2014/0059544 A1 | 2/2014 | Koganty et al. |
| 2014/0079070 A1 | 3/2014 | Sonoda et al. |
| 2014/0119367 A1 | 5/2014 | Han et al. |
| 2014/0169215 A1 | 6/2014 | Rajendran et al. |
| 2014/0169375 A1 | 6/2014 | Khan et al. |
| 2014/0188676 A1 | 7/2014 | Marmolejo-Meillon et al. |
| 2014/0201374 A1 | 7/2014 | Ashwood-Smith et al. |
| 2014/0241247 A1 | 8/2014 | Kempf et al. |
| 2014/0254603 A1 | 9/2014 | Banavalikar |
| 2014/0259012 A1 | 9/2014 | Nandlall et al. |
| 2014/0279863 A1 | 9/2014 | Krishnamurthy |
| 2014/0280836 A1 | 9/2014 | Kumar et al. |
| 2014/0280950 A1 | 9/2014 | Bhanujan et al. |
| 2014/0304412 A1 | 10/2014 | Prakash et al. |
| 2014/0317261 A1 | 10/2014 | Shatzkamer et al. |
| 2014/0321459 A1 | 10/2014 | Kumar et al. |
| 2014/0334295 A1 | 11/2014 | Guichard |
| 2014/0334488 A1 | 11/2014 | Guichard et al. |
| 2014/0344439 A1 | 11/2014 | Kempf et al. |
| 2014/0351452 A1 | 11/2014 | Bosch et al. |
| 2014/0362682 A1 | 12/2014 | Guichard et al. |
| 2014/0362857 A1 | 12/2014 | Guichard |
| 2014/0372617 A1 | 12/2014 | Houyou et al. |
| 2014/0379938 A1 | 12/2014 | Bosch et al. |
| 2015/0003455 A1 | 1/2015 | Haddad et al. |
| 2015/0012988 A1 | 1/2015 | Jeng et al. |
| 2015/0026362 A1 | 1/2015 | Guichard |
| 2015/0052516 A1 | 2/2015 | French |
| 2015/0063102 A1 | 3/2015 | Mestery et al. |
| 2015/0063166 A1 | 3/2015 | Sif et al. |
| 2015/0071285 A1 | 3/2015 | Kumar et al. |
| 2015/0074276 A1 | 3/2015 | DeCusatis |
| 2015/0085870 A1 | 3/2015 | Narasimha et al. |
| 2015/0089082 A1 | 3/2015 | Patwardhan et al. |
| 2015/0092551 A1 | 4/2015 | Moisand |
| 2015/0106624 A1 | 4/2015 | Gero |
| 2015/0117308 A1 | 4/2015 | Kant |
| 2015/0120890 A1 | 4/2015 | Ghai |
| 2015/0124622 A1 | 5/2015 | Kovvali et al. |
| 2015/0131484 A1 | 5/2015 | Aldrin |
| 2015/0137973 A1 | 5/2015 | Kumar et al. |
| 2015/0156035 A1 | 6/2015 | Foo et al. |
| 2015/0172170 A1 | 6/2015 | Bosch et al. |
| 2015/0180767 A1 | 6/2015 | Tam et al. |
| 2015/0195197 A1 | 7/2015 | Yong |
| 2015/0215172 A1 | 7/2015 | Kumar |
| 2015/0222516 A1 | 8/2015 | Deval |
| 2015/0236948 A1 | 8/2015 | Dunbar |
| 2015/0263901 A1 | 9/2015 | Kumar et al. |
| 2015/0271102 A1 | 9/2015 | Antich |
| 2015/0271203 A1 | 9/2015 | Duminuco et al. |
| 2015/0271204 A1 | 9/2015 | Duminuco et al. |
| 2015/0271205 A1 | 9/2015 | Duminuco et al. |
| 2015/0282177 A1 | 10/2015 | Dong |
| 2015/0312801 A1 | 10/2015 | Khan et al. |
| 2015/0333930 A1 | 11/2015 | Aysola |
| 2015/0334027 A1 | 11/2015 | Bosch et al. |
| 2016/0050132 A1 | 2/2016 | Zhang |
| 2016/0139939 A1 | 5/2016 | Bosch et al. |
| 2016/0226742 A1 | 8/2016 | Apathotharanan |
| 2016/0285720 A1 | 9/2016 | Maenpaa |

FOREIGN PATENT DOCUMENTS

| | | |
|---|---|---|
| CN | 105099751 | 11/2015 |
| EP | 2122483 | 7/2008 |
| EP | 2073449 | 6/2009 |
| EP | 2791802 | 6/2013 |
| EP | 2945329 | 11/2015 |
| WO | WO 2005/104650 | 11/2005 |
| WO | WO 2008/063858 | 5/2008 |
| WO | WO 2008/088954 | 7/2008 |
| WO | WO 2011/012165 | 2/2011 |
| WO | WO 2013/090035 | 6/2013 |
| WO | WO 2013/095714 | 6/2013 |
| WO | WO 2013/101765 | 7/2013 |
| WO | WO 2014/189670 | 11/2014 |
| WO | WO 2015/073190 | 5/2015 |
| WO | WO 2015/088557 | 6/2015 |

(56) References Cited

FOREIGN PATENT DOCUMENTS

| | | |
|---|---|---|
| WO | WO 2015/094567 | 6/2015 |
| WO | WO2016/081379 | 5/2016 |

OTHER PUBLICATIONS

Quinn, et al., RFC 7498, "Problem Statement for Service Function Chaining", Apr. 2015.*
U.S. Appl. No. 14/717,887, filed May 20, 2015, entitled "System and Method to Facilitate the Assignment of Service Functions for Service Chains in a Network Environment," Inventor(s): Robert M. Batz, et al.
U.S. Appl. No. 15/171,892, filed Jun. 2, 2016, entitled "System and Method for Hosting Mobile Packet Core and Value-Added Services Using a Software Defined Network and Service Chains," Inventor(s): Hendrikus G.P. Bosch, et al.
"3GPP TS 29.212 V13.1.0 (Mar. 2015) Technical Specification: $3^{rd}$ Generation Partnership Project; Technical Specification Group Core Network and Terminals; Policy and Chargig Control (PCC); Reference points (Release 13)," $3^{rd}$ Generation Partnership Project (3GPP), 650 Route des Lucioles—Sophia Antipolis Valbonne—France, Mar. 2015; 230 pages.
"ETSI TS 132 251 V12.7.0 (Oct. 2014) Technical Specification: Digital cellular telecommunications system (Phase 2+); Universal Mobile Telecommunications System (UMTS); LTE; Telecommunication management; Charging management; Packet Switched (PS) domain charging (3GPP TS 32.251 version 12.7.0 Release 12)," European Telecommunications Standards Institute (ETSI), 650 Route des Lucioles, F-06921 Sophia Antipolis Cedex—France, Oct. 2014; 164 pages.
Amazon Web Services, "Amazon Simple Workflow Service Developer Guide," API Version, Jan. 25, 2012, 175 pages http://aws.amazon.com/documentation/swf/.
Amir, et al., "An Active Service Framework and its Application to Real-time Multimedia Transcoding," in Proc. ACM SIGCOMM Conference {SIGCOMM '98}, Sep. 1998, 12 pgs.
Bouthors, N.P., et al., "Metadata Transport in SFC," Network Working Group draft-bouthors-sfc-md-oo.txt, Sep. 19, 2014; 22 pages.
Carpenter, B., et al., "Using the IPv6 Flow Label for Equal Cost Multipath Routing and Link Aggregation in Tunnels," Network Working Group, RFC 6438, Nov. 2011, 9 pages; http://www.hjp.at/doc/rfc/rfc6438.html.
Chen, E., et al., "Outbound Route Filtering Capability for BGP-4," Network Working Group, RFC 5291, Aug. 2008, 12 pages; http://www.hjp.at/doc/rfc/rfc5291.html.
Cisco Systems, Inc., "Cisco vPath and vServices Reference Guide for Intercloud Fabric," Apr. 19, 2015, 48 pages http://www.cisco.com/c/en/us/td/docs/switches/datacenter/vsg/sw_vsg_ic/5_2_1_IC_2_2_1/vpath_vservices/reference/guide/vpath_vservices_reference.pdf.
Cisco Systems, Inc., "Call Flows for Dual-Stack PMIPv6 and GTP," Intelligent Wireless Access Gateway Configuration Guide, first published on or about Feb. 27, 2014; 14 pages.
Cisco Systems, Inc., "Cisco Quantum Services Platform," first published on or about Mar. 25, 2014; 2 pages.
Cisco Systems, Inc., "RADIUS Attribute 8 (Framed-IP-Address) in Access Requests," Sep. 8, 2009; 8 pages.
"Comparison between OS virtualization and hypervisor-based virtualization," Servernest, Feb. 4, 2015, Copyright © 2009-2011 by ServerNest GmbH, 2 pages.
U.S. Appl. No. 14/746,919, filed Jun. 23, 2015, entitled "Mobile Service Routing in a Network Environment," Inventor(s): Muhammad A. Khan et al.
U.S. Appl. No. 14/684,363, filed Apr. 11, 2015, entitled "System and Method to Chain Distributed Applications in a Network Environment," Inventor(s): Hendrikus G.P. Bosch, et al.

U.S. Appl. No. 14/717,887, filed May 20, 2015, entitled "System and Method to Facilitate the Assignment of Service Functions for Service Chains in a Network Environment," Inventors: Robert M. Batz et al.
Fernando, et al., "Virtual Service Topologies in BGP VPNs," Internet Engineering Task Force (IETF) Internet-Draft, draft-rfernando-virt-topo-bgp-vpn-01, Oct. 22, 2012, 11 pages.
Haeffner, W., "Service Function Chaining Use Cases in Mobile Networks," Service Function Chaining Internet Draft draft-ietf-afc-use-case-mobility-03, Jan. 13, 2015; 25 pages.
Kiehle, Christian, et al., "Standardized Geoprocessing—Taking Spatial Data Infrastructures One Step Further", 9th Agile International Conference on Geographic Information Science, Apr. 22, 2006, 10 pages.
Ladner, Roy, et al., "Case-Based Classification Alternatives to Ontologies for Automated Web Service Discovery and Integration" proceedings of the SPIE—The International Society for Optical Engineering, Apr. 17, 2006, 8 pages.
Lapukhov, "Scaling MPLS networks," INE, Mar. 24, 2015, 15 pages; http://blog/ine.com/2010/08/16/scaling-mpls-networks/.
Lemmens, Rob, et al., "Semantic and Syntactic Service Descriptions at Work in Geo-service Chaining", 9th Agile International Conference on Geographic Information Science, Apr. 20, 2006, 11 pages.
Marques, P., et al., "Dissemination of Flow Specification Rules," Network Working Group, RFC 5575, Aug. 2009, 22 pages.
McKeown, et al., "OpenFiow: Enabling Innovation in Campus Networks," ACM SIGCOMM Computer Communication Review, vol. 38, No. 2, Apr. 2008, 6 pages.
Quinn, P., et al., "Network Services Header," Network Working Group Internet Draft draft-quinn-sfc-nsh-07.txt, Feb. 24, 2015; 43 pages.
Raszuk, R., et al., "BGP vector Routing," Network Working Group, Oct. 27, 2014, 12 pages; https://tools.ietf.org/html/draft-patel-raszuk-bgp-vector-routing-04.
Rekhter, Y., et al., "A Border Gateway Protocol 4 (BGP-4)," Network Working Group, RFC 4271, Jan. 2006, 104 pages; https://tools.ietf.org/html/rfc4271.
Rosen, E., et al., "BGP/MPLS IP Virtual Private Networks (VPNs)," Network Working Group, RFC 4364, Feb. 2006, 47 pages; https://tools.ietf.org/html/rfc4364.
Singh, Sumeet et al., Service Portability: Why HTTP redirect is the model for the future [on line], Nov. 2006 [retrieved on Sep. 8, 2009], retrieved from the Internet: URL:http://conferences.sigcomm.org/hotnets/2006/singh06service.pdf, 6 pages.
Bitar, N., et al., "Interface to the Routing System (I2RS) for Service Chaining: Use Cases and Requirements," Internet Engineering Task Force, draft-bitar-i2rs-service-chaining-01; Feb. 14, 2014; 15 pages.
"ATIS-I-0000046: Emerging Opportunities for Leveraging Network Intelligence," ATIS, Oct. 2014; 45 pages.
Balduini, M., et al., "Stream Reasoning for Linked Data," International Semantic Web Conference ISWC 2013, Sydney, Australia, Oct. 21-25, 2013 31 pages.
Bertsekas, Prof. Dimitri P., "Session 1813 Traffic Behavior and Queueing in a QoS Environment," Networking Tutorials, OPNetwork 2002, Washington, DC, Aug. 2002; 90 pages.
Bierman, A., "RESTCONF Protocol," Network Working Group Internet-Draft, draft-ietf-netconf-restconf-10, Mar. 16, 2016; 116 pages.
Bjorklund, M., et al., "YANG—A Data Modeling Language for the Network Configuration Protocol (NETCONF)," Internet Engineering Task Force RFC 6020, Oct. 2010; 173 pages.
Brockners, F., et al., "Data Formats for In-band OAM," Network Working Group Internet-Draft, draft-brockners-inband-oam-data-00, Jul. 8, 2016; 14 pages.
Brockners, F., et al., "Encapsulations for In-band OAM Data," Network Working Group Internet-Draft, draft-brockners-inband-oam-transport-00, Jul. 8, 2016; 14 pages.
Brockners, F., et al., "Proof of Transit," Network Working Group Internet-Draft, draft-brockners-proof-of-transit-00, Jul. 8, 2016; 19 pages.

(56) References Cited

OTHER PUBLICATIONS

Brockners, F., et al., "Requirements for In-band OAM," Network Working Group Internet-Draft, draft-brockners-inband-oam-requirements-oo, Jul. 8, 2016; 18 pages.
Brockners, Frank, et al., "Containers on Routers and Switches: Run your apps and tools natively on Cisco boxes," Cisco LIVE! Berlin, Germany, Feb. 15-19, 2016; 113 pages.
Brockners, Frank, et al., "Next-gen Network Telemetry: Trip-recording and Service Chain/Path Verification for all Traffic," Cisco LIVE! Berlin, Germany, Feb. 15-19, 2016; 88 pages.
Browne, R., et al., "Network Service Header Timestamping," Network Working Group Internet Draft, draft-browne-sfc-nsh-timestamp-00.txt, Dec. 4, 2015; 19 pages.
"CEA-708," from Wikipedia, the free encyclopedia, Nov. 15, 2012; 16 pages.
Chaloupka, Jiri, "NFV Pro Poskytovatele Sluzeb," Tech SP2, Cisco Connect, Praha, Ceska republika; Mar. 24-25, 2015; 114 pages.
"Cisco Nexus 1000V Series Switches," Cisco Systems, Inc., Jul. 2013; 3 pages.
Cisco Systems, Inc., "Cisco IOS Flexible NetFlow Technology," Data Sheet, Dec. 2008; 5 pages.
Cisco Systems, Inc., "Chapter 11: Virtual Routing and Forwarding," Cisco Active Network Abstraction 3.7 Reference Guide, Feb. 1, 2010, 7 pages.
Cisco Systems, Inc., Vmware, Inc., "Joint Cisco and Vmware Solution for Optimizing Virtual Desktop Delivery," Sep. 2008.
"Cisco vPath and vServices Overview," Chapter 1, Cisco vPath and vServices Reference Guide, OL-27702-02, Oct. 19, 2012; 10 pages.
Claise, B., et al., "Specification of the IP Flow Information Export (IPFIX) Protocol for the Exchange of Flow Information," Internet Engineering Task Force RFC 7011; Sep. 2013; 76 pages.
Clark, Joe, "Playing with your Traffic: Exploring the Software-Defined Packet Control Within the IETF," Cisco LIVE! Berlin, Germany, Feb. 15-19, 2016; 91 pages.
Desaunay, Laurent, "Operation & Management Transition with the Adoption of an SDN Architecture and NFV Concepts," Cisco LIVE! Berlin, Germany, Feb. 15-19, 2016; 43 pages.
"Digital Program Insertion," from Wikipedia, the free encyclopedia, Jan. 2, 2012; 1 page.
Dunbar, et al., "Architecture for Chaining Legacy Layer 4-7 Service Functions," IETF Network Working Group Internet Draft, draft-dunbar-sfc-legacy-14-17-chain-architecture-03.txt, Feb. 10, 2014; 17 pages.
"Dynamic Adaptive Streaming over HTTP," from Wikipedia, the free encyclopedia, Oct. 25, 2012; 3 pages.
EPO Oct. 6, 2015 Extended Search Report and Written Opinion from European Application Serial No. 15160159.8.
"ETSI GS NFV 002 V1.2.1 (Dec. 2014) Group Specification: Network Functions Virtualisation (NFV); Architectural Framework," ETSI, 650 Route des Lucioles, F-06921 Sophia Antipols Cedex-France; Dec. 2014; 21 pages.
"ETSI GS NFV-REL 004 V1.1.1 (Apr. 2016) Group Specification: Network Functions Virtualisation (NFV); Assurance; Report on Active Monitoring and Failure Detection," ETSI, 650 Route des Lucioles, F-06921 Sophia Antipols Cedex-France; Apr. 2016; 61 pages.
Fang et al., "BGP IP BPN Virtual PE; draft-fang-13vpn-virtual-pe-02," Internet Engineering Task Force, Apr. 7, 2013; 26 pages.
Freier, et al., "The Secure Sockets Layer (SSL) Protocol Version 3.0," Internet Engineering Task Force (IETF), RFC 6101, Aug. 2011, 67 pages; http://tools.ietf.org/pdf/rfc6101.pdf.
Gray, et al., "Leases: An Efficient Fault-Tolerant Mechanism for Distributed File Cache Consistency," Proceedings of the Twelfth ACM Ssymposium on Operating Systems Principles, New York, NY (Dec. 3-6, 1989), 9 pages; http://www.stanford.edu/class/cs240/reading/89-leases.pdf.
"G-Streamer and in-band Metadata," from RidgeRun Developer Connection, Jun. 19, 2012; 5 pages.

Guichard, J., et al., "Network Service Header (NSH) Context Header Allocation (Data Center)," Service Function Chaining Internet-Draft, draft-guichard-sfc-nsh-dc-allocation-04, Feb. 15, 2016; 8 pages.
Han, Bo, et al. "Network function virtualization: Challenges and opportunities for innovations." Communications Magazine, IEEE 53.2 (Feb. 2015): 90-97.
Higgins, Tim, "How We Test SPI+NAP Routers," SmallNetBuilder, Oct. 18, 2002; 5 pages.
"How do switches, vSwitches and distributed vSwitches differ? Getting Vmware terminology straight," TechTarget, Jun. 11, 2013; 4 pages.
"IEEE Standard for the Functional Architecture of Next Generation Service Overlay Networks, IEEE Std. 1903-2011," IEEE, Piscataway, NJ, Oct. 7, 2011; 147 pages.
"Interim report: Subscriber Aware SGi/Gi-LAN Virtualization," ConteXtream, ETSI, Jul. 24, 2014; 16 pages.
ip infusion™, "A Redundant Architecture for Routing Protocols," White Paper, Jun. 2002, XP002240009, 8 pages; www.ipinfusion.com/pdf/WP_Redundancy_rev0602.pdf.
"ISO/IEC JTC 1/SC 29, Information Technology—Dynamic Adaptive Streaming over HTTP (DASH)—Part 1: Media Presentation Description and Segment Formats," International Standard ©ISO/IEC 2012—All Rights Reserved; Jan. 5, 2012; 131 pages.
Jeff Pang, Distributed Hash Tables< 2004, 33 pages; http://www.cs.cmu.edu/~dga/15-744/S07/lectures/16-dht.pdf.
Jiang, et al., "An Architecture of Service Function Chaining," IETF Network Working Group Internet Draft, draft-jiang-sfc-arch-01.txt, Feb. 14, 2014; 12 pages.
Katz, D., "Bidirectional Forwarding Detection (BFD)," Internet Engineering Task Force RFC 5880, Jun. 2010; 49 pages.
Kim, et al., "Floodless in Seattle: A Scalable Ethernet Architecture for Large Enterprises," Computer Communication Review, Oct. 2008, 14 pages; http://www.cs.princeton.edu/~chkim/Research/Seattle/seattle.pdf.
Kumar, S., et al., "Service Function Path Optimization: draft-kumar-sfc-sfp-optimization-00.txt," Internet Engineering Task Force, IETF; Standard Working Draft, May 10, 2014.
Lampson, "How to Build a Highly Available System Using Consensus," Proceedings of the 10th International Workshop on Distributed Algorithms (Oct. 1996), 17 pages; http://research.microsoft.com/en-us/um/people/blampson/58-Consensus/Acrobat.pdf.
Lawful interception, Wikipedia, the free encyclopedia, Nov. 17, 2015; 7 pages.
Lesniewski-Laas, et al., "SSL splitting: securely serving data from untrusted caches," Laboratory for Computer Science, Massachusetts Institute of Technology, First published on or about Aug. 30, 2008, 13 pages; http://pdos.csail.mit.edu/papers/ssl-splitting-usenixsecurity03.pdf.
Li, Hongyu, "Service Function Chaining Use Cases," IETF 88 Vancouver, Nov. 7, 2013.
"Little's law," from Wikipedia, the free encyclopedia, Oct. 25, 2016; 4 pages.
"M/D/1 queue," from Wikipedia, the free encyclopedia, May 16, 2016; 6 pages.
Mackie, B., et al., "Service Function Chains Using Virtual Networking," draft-mackie-sfc-using-virtual-networking-o2.txt; Internet Engineering Task Force, IETF Standard Working Draft, Oct. 17, 2013; 44 pages.
"M-PEG 2 Transmission," © Dr. Gorry Fairhurst, 9 pages [Published on or about Jan. 12, 2012] http://www.erg.abdn.ac.uk/future-net/digital-video/mpeg2-trans.html.
"MPEG Transport Stream," from Wikipedia, the free encyclopedia, Nov. 11, 2012; 7 pages.
Netmanias, "LTE QoS: SDF and EPS Bearer QoS," Netmanias: Analyze Trends, Technologies and Market, Sep. 11, 2013; 18 pages.
"NFV ISG PoC Proposal: SDN Enabled Virtual EPC Gateway," ETSI, NFV World Congress San Jose, May 5-7, 2015; 7 pages.
PCT Jan. 2, 2013 International Search Report and Written Opinion of the International Searching Authority from International Application Serial No. PCT/US2012/048764; 14 pages.

(56) References Cited

OTHER PUBLICATIONS

PCT Nov. 10, 2014 International Search Report from International Application No. PCT/US2014/036907; 3 pages.
PCT Jun. 24, 2014 International Preliminary Report on Patentability from International Application No. PCT/US2012/048674; 8 pages.
PCT Jun. 26, 2014 International Preliminary Report on Patentability from International Application PCT/US2012/067502.
PCT Jan. 19, 2015 International Search Report and Written Opinion from International Application Serial No. PCT/US2014/062244.
PCT Mar. 16, 2015 International Search Report and Written Opinion from International Application No. PCT/US2014/066629.
PCT Aug. 20, 2015 International Search Report and Written Opinion of the International Searching Authority from International Application Serial No. PCT/US2015/020242; 12 pages.
PCT-Jun. 30, 2008 International Search Report and Written Opinion from International Application No. PCT/IB05/01013, 5 pages.
PCT-Apr. 4, 2013 International Search Report and Written Opinion from International Application No. PCT/US2012/067502 11 pages.
Quinn, et al., "Network Service Header," Network Working Group Internet Draft draft-quinn-nsh-01, Jul. 12, 2013.
Quinn, P., et al., "Network Service Header," Network Working Group Internet-Draft draft-quinn-sfc-nsh-02.txt, Feb. 14, 2014, 21 pages.
Quinn, P., et al., "Network Service Header," Networking Working Group Internet Draft draft-quinn-nsh-00.txt, Jun. 13, 2013, 20 pages.
Quinn, P., et al., "Service Function Chaining (SFC) Architecture," IETF Standard Working Draft draft-quinn-sfc-arch-05.txt; May 5, 2014, 31 pages.
"Realising the Benefits of Network Functions Virtualisation in Telecoms Networks," Intel Corporation, White Paper, First published on or about Apr. 20, 2015.
Rescorla, "Introduction to Distributed Hash Tables," Proceedings of the sixty-seventh Internet Engineering Task Force, IAB Plenary, Nov. 5-10, 2006, San Diego, CA, 39 pages; http://www.ietf.org/proceedings/65/slides/plenaryt-2.pdf.
Rosen, E., et al., "MPLS Label Stack Encoding," Network Working Group RFC 3032, Jan. 2001; 23 pages.
Salaets, Bart, "Advanced Traffic Steering & Optimization Technologies," MENOG 2014, Mar. 30, 2015, XP055214882 http://www.menog.org/presentations/menog-14/272-Advanced_Traffic_Steering_v04.pdf.
Salisbury, Brent, "The Control Plane, Data Plane and Forwarding Plane in Networks," NetworkStatic: Brent Salisbury's Blog, Sep. 27, 2012; 6 pages.
Salsano, S., et al., "Generalized Virtual Networking: an enabler for Service Centric Networking and Network Function Virtualization", 16th International Telecommunications Network Strategy and Planning Symposium, Networks 2014, Sep. 17-19, 2014, Funchal, Portugal (pdf on arXiv) (slides: pptx pdf SlideShare) http://netgroup.uniroma2.it/people/faculties/stefano-salsano/stefano-salsano-publications-list/.
Snell, "HTTP/2.0 Discussion: Binary Optimized Header Encoding," Network Working Group, Internet Draft, Expires Aug. 22, 2013, Feb. 18, 2013, 8 pages; http://tools.ietf.org/pdf/draft-snell-httpbis-keynego-02.pdf.
"Tutorial on Stream Reasoning for Linked Data at ISWC 2013," International Semantic Web Conference 2013, Sydney, Australia, Oct. 2013.
"Verizon Network Infrastructure Planning: SDN-NFV Reference Architecture, Version 1.0," Verizon Wireless, Inc., Feb. 2016; 220 pages.
Virtamo, J., "Poisson process," 38.3143 Queueing Theory/Poisson process, first published on or about Apr. 23, 2006; 19 pages.
"Virtual Gi-LAN and EPC to Create and Deploy Services Faster," Intel Corporation, Solution Brief, Software-based Network Solutions; Copyright © 2015 Intel Corporation. All rights reserved; 6 pages.
"Virtual Solutions for your NFV Environment," F5 Networks Solution Center, first published on or about Feb. 2, 2016; 12 pages.
Vishwanath, Arun, et al., "How Poisson is TCP Traffic at Short Time-Scales in a Small Buffer Core Network?" ANTS'09 3rd international conference on Advanced Networks and Telecommunication Systems, New Delhi, India, Dec. 2009; 3 pages.
"What is the difference between the Data Link Layer and the Network Layer in the OSI Model?" Yahoo Answers; Dec. 14, 2008; 2 pages.
Williams, et al., et al., "Overlay Path Option for IP and TCP," Network Working Group, Internet Draft, Expires Dec. 21, 2013, Jun. 19, 2013, 17 pages; http://tools.ietf.org/pdf/draft-williams-overlaypath-ip-tcp-rfc 04.pdf.
Wolf, K.H., "VPP: Virtual Presence Protocol," Internet Draft, draft-wolf-vpp-01.txt, Jul. 5, 1999; 46 pages.
Wong, F., et al., "SMPTE-TT Embedded in ID3 for HTTP Live Streaming, draft-smpte-id3-http-live-streaming-00," Informational Internet Draft, Jun. 2012; 7 pages.
Wu, et al., "Resilient and efficient load balancing in distributed hash tables," Journal of Network and Computer Applications 32 (Jan. 2009), 16 pages; http://sist.sysu.edu.cn/~dwu/papers/jnca09-ib.pdf.
Yavatkar, R., et al., "A Framework for Policy-Based Admission Control," Network Working Group, RFC 2753, Jan. 2000; 21 pages.
Yourtchenko, et al., "Revealing hosts sharing an IP address using TCP option," Network Working Group, Internet Draft, Expires Jun. 10, 2012, Dec. 8, 2011, 10 pages; http://tools.ietf.org/pdf/draft-wing-nat-reveal-option-03.pdf.
U.S. Appl. No. 15/252,028, filed Aug. 30, 2016, entitled "System and Method for Managing Chained Services in a Network Environment," Inventor(s): Hendrikus G.P. Bosch, et al.
U.S. Jul. 8, 2016 Non-Final Office Action from U.S. Appl. No. 14/684,363.
U.S. Dec. 30, 2016 Notice of Allowance from U.S. Appl. No. 14/717,887.
3GPP TR 23.401 V9.5.0 (Jun. 2010) Technical Specification: Group Services and Systems Aspects; General Packet Radio Service (GPRS) Enhancements for Evolved Universal Terrestrial Radio Access Network (E-UTRAN) Access (Release 9), 3rd Generation Partnership Project (3GPP), 650 Route des Lucioles—Sophia Antipolis Valbonne—France, Jun. 2010; 259 pages.
3GPP TS 23.401 V13.5.0 (Dec. 2015) Technical Specification: 3rd Generation Partnership Project; Technical Specification Group Services and System Aspects; General Packet Radio Service (GPRS) enhancements for Evolved Universal Terrestrial Radio Access Network (E-UTRAN) access (Release 13), 3GPP, 650 Route des Lucioles—Sophia Antipolis Valbonne—France, Dec. 2015.
"3GPP TR 23.803 V7.0.0 (Sep. 2005) Technical Specification: Group Services and System Aspects; Evolution of Policy Control and Charging (Release 7)," 3rd Generation Partnership Project (3GPP), 650 Route des Lucioles—Sophia Antipolis Valbonne—France, Sep. 2005; 30 pages.
"3GPP TS 23.203 V8.9.0 (Mar. 2010) Technical Specification: Group Services and System Aspects; Policy and Charging Control Architecture (Release 8)," 3rd Generation Partnership Project (3GPP), 650 Route des Lucioles—Sophia Antipolis Valbonne—France, Mar. 2010; 116 pages.
"ETSI TS-123-401 V9.5.0 (Jun. 2010) Technical Specification: LTE; General Packet Radio Service (GPRS) enhancements for Evolved Universal Terrestrial Radio Access Network (E-UTRAN) access (3GPP TS 23.401 version 9.5.0 Release 9)," © European Telecommunication Standards Institute 2010; Jun. 2010, 261 pages.
"ETSI TS-129-212 V9.5.0 (Jan. 2011) Technical Specification: Universal Mobile Telecommunications System (UMTS); LTE; Policy and charging control over Gx reference point (3GPP TS 29.212 version 9.5.0 Release 9)," © European Telecommunication Standards Institute 2011; Jan. 2011,120 pages.
ETSI TS 129 212 V13.4.0 (Jan. 2016) Technical Specification: Universal Mobile Telecommunications System (UMTS); LTE; Policy and Charging Control (PCC); Reference points (3GPP TS 29.212 version 13.4.0 Release 13), European Telecommunications Standards Institute (ETSI), 650 Route des Lucioles, F-06921 Sophia Antipolis Cedex—France, Jan. 2016; 249 pages.
"ETSI TS-136-401 V8.6.0 (Jul. 2009) Technical Specification: LTE; Evolved Universal Terrestrial Radio Access Network (E-UTRAN);

(56) References Cited

OTHER PUBLICATIONS

Architecture description (EGPP TS 36.401 version 8.60 Release 8)," © European Telecommunication Standards Institute 2009; Jul. 2009, 21 pages.
"ANSI/SCTE 35 2007 Digital Program Insertion Cueing Message for Cable," Engineering Committee, Digital Video Subcommittee, American National Standard, Society of Cable Telecommunications Engineers, © Society of Cable Telecommunications Engineers, Inc. 2007 All Rights Reserved, 140 Philips Road, Exton, PA 19341; 42 pages.
Bhatia, M., et al., "Bidirectional Forwarding Detection (BFD) on Link Aggregation Group (LAG) Interfaces," Internet Engineering Task Force RFC 7130, Feb. 2014; 11 pages.
Bitar, et al., "Interface to the Routing System (I2RS) for Service Chaining: Use Cases and Requirements," draft-bitar-i2rs-service-chaining-00.txt; Internet Engineering Task Force, IETF Standard Working Draft; Jul. 15, 2013; 30 pages.
Bosch, et al., "Telco Clouds and Virtual Telco: Consolidation, Convergence, and Beyond", May 23-27, 2011, Proceedings of 2011 IFIP/IEEE International Symposium on Integrated Network Management (IM), Dublin, 7 pages.
Boucadair et al., "Differentiated Service Function Chaining Framework," Network Working Group Internet Draft draft-boucadair-network-function-chaining-03, Aug. 21, 2013.
Boucadair, et al., "Analysis of Potential Solutions for Revealing a Host Identifier (HOST_ID) in Shared Address Deployments," Internet Engineering Task Force (IETF), RFC 6967, Jun. 2013, 24 pages; http://tools.ietf.org/pdf/rfc6967.pdf.
Cao, Z., "Data Plane Processing Acceleration Framework," Internet Engineering Task Force Internet Draft, draft-cao-dataplane-acceleration-framework-o1, Jul. 4, 2014; 10 pages.
Carmes, "Delivering Data Plane Acceleration for ETSI's NFV PoC," SDxC Central, Jan. 16, 2014; 8 pages.
Brown, Gabriel, "Designing 5G-Ready Mobile Core Networks," White Paper, Heavy Reading, Sep. 2016; 14 pages.
Sayeed, Akbar M., "Millimeter-Wave MIMO Architectures for 5G Gigabit Wireless," GLOBECOM Workshop on Emerging Technologies for 5G Wireless Cellular Networks, Dec. 8, 2014; 37 pages.
"Stream Control Transmission Protocol," from Wikipedia, the free encyclopedia, Oct. 11, 2016, 8 pages.
"LTE Quick Reference, IDs in LTE," ShareTechnote Handbook, first published on or about Jul. 13, 2012; 13 pages.
Ghodsi, Ali, et al., "Information-Centric Networking: Seeing the Forest for the Trees," Hotnets 2011, Nov. 14-15, 2011, Cambridge, MA; 6 pages.
"Information-centric networking," from Wikipedia, the free encyclopedia, Oct. 19, 2016; 2 pages.
"ETSI GS NFV-MAN 001 V1.1.1 (Dec. 2014) Group Specification: Network Functions Virtualisation (NFV); Management and Orchestration," ETSI, 650 Route des Lucioles, F-06921 Sophia Antipols Cedex-France, Dec. 2014; 184 pages.
4G Americas, "Executive Summary—Inside 3GPP Release 13: Understanding the Standards for HSPA+ and LTE-Advanced Enhancements," Sep. 2015, 9 pages.
"3GPP TS 23.008 V14.0.0 (Dec. 2016) Technical Specification: 3rd Generation Partnership Project; Technical Specification Group Core Network and Terminals; Organization of subscriber data (Release 14)," 3GPP, 650 Route des Lucioles—Sophia Antipolis Valbonne—France, Dec. 2016; 131 pages.
"3GPP TS 23.122 V14.1.0 (Dec. 2016) Technical Specification: 3rd Generation Partnership Project; Technical Specification Group Core Network and Terminals; Non-Access-Stratum (NAS) functions related to Mobile Station (MS) in idle mode (Release 14)," 3GPP, 650 Route des Lucioles—Sophia Antipolis, Valbonne—France, Dec. 2016; 50 pages.
"3GPP TS 23.236 V13.0.0 (Jun. 2015) Technical Specification: 3rd Generation Partnership Project; Technical Specification Group Services and System Aspects; Intra-domain connection of Radio Access Network (RAN) nodes to multiple Core Network (CN) nodes (Release 13)," 3GPP, 650 Route des Lucioles—Sophia Antipolis, Valbonne—France, Jun. 2015; 41 pages.
"3GPP TS 23.236 V14.0.0 (Sep. 2016) Technical Specification: 3rd Generation Partnership Project; Technical Specification Group Services and System Aspects; Intra-domain connection of Radio Access Network (RAN) nodes to multiple Core Network (CN) nodes (Release 14)," 3GPP, 650 Route des Lucioles—Sophia Antipolis, Valbonne—France, Sep. 2016; 41 pages.
"3GPP TS 23.401 V13.8.0 (Sep. 2016) Technical Specification: 3rd Generation Partnership Project; Technical Specification Group Services and System Aspects; General Packet Radio Service (GPRS) enhancements for Evolved Universal Terrestrial Radio Access Network (E-UTRAN) access (Release 13)," 3GPP, 650 Route des Lucioles—Sophia Antipolis, Valbonne—France, Sep. 2016; 374 pages.
"3GPP TR 23.711 V14.0.0 (Sep. 2016) Technical Report: 3rd Generation Partnership Project; Technical Specification Group Services and System Aspects; Enhancements of Dedicated Core networks selection mechanism (Release 14)," 3GPP, 650 Route des Lucioles—Sophia Antipolis, Valbonne—France, Sep. 2016; 36 pages.
"3GPP TR 23.799 V0.2.0 (Feb. 2016) Technical Report: 3rd Generation Partnership Project; Technical Specification Group Services and System Aspects; Study on Architecture for Next Generation System (Release 14)," 3GPP, 650 Route des Lucioles—Sophia Antipolis, Valbonne—France, Feb. 2016; 17 pages.
"3GPP TR 23.799 V0.3.0 (Mar. 2016) Technical Report: 3rd Generation Partnership Project; Technical Specification Group Services and System Aspects; Study on Architecture for Next Generation System (Release 14)," 3GPP, 650 Route des Lucioles—Sophia Antipolis, Valbonne—France, Mar. 2016; 52 pages.
"3GPP TR 23.799 V0.4.0 (Apr. 2016) Technical Report: 3rd Generation Partnership Project; Technical Specification Group Services and System Aspects; Study on Architecture for Next Generation System (Release 14)," 3GPP, 650 Route des Lucioles—Sophia Antipolis, Valbonne—France, Apr. 2016; 96 pages.
"3GPP TR 23.799 V0.5.0 (May 2016) Technical Report: 3rd Generation Partnership Project; Technical Specification Group Services and System Aspects; Study on Architecture for Next Generation System (Release 14)," 3GPP, 650 Route des Lucioles—Sophia Antipolis, Valbonne—France, May 2016; 178 pages.
"3GPP TR 23.799 V0.6.0 (Jul. 2016) Technical Report: 3rd Generation Partnership Project; Technical Specification Group Services and System Aspects; Study on Architecture for Next Generation System (Release 14)," 3GPP, 650 Route des Lucioles—Sophia Antipolis, Valbonne—France, Jul. 2016; 321 pages.
"3GPP TR 23.799 V0.7.0 (Aug. 2016) Technical Report: 3rd Generation Partnership Project; Technical Specification Group Services and System Aspects; Study on Architecture for Next Generation System (Release 14)," 3GPP, 650 Route des Lucioles—Sophia Antipolis, Valbonne—France, Aug. 2016; 323 pages.
"3GPP TR 23.799 V0.8.0 (Sep. 2016) Technical Report: 3rd Generation Partnership Project; Technical Specification Group Services and System Aspects; Study on Architecture for Next Generation System (Release 14)," 3GPP, 650 Route des Lucioles—Sophia Antipolis, Valbonne—France, Sep. 2016; 423 pages.
"3GPP TR 23.799 V1.0.0 (Sep. 2016) Technical Report: 3rd Generation Partnership Project; Technical Specification Group Services and System Aspects; Study on Architecture for Next Generation System (Release 14)," 3GPP, 650 Route des Lucioles—Sophia Antipolis, Valbonne—France, Sep. 2016; 423 pages.
"3GPP TR 23.799 V1.0.1 (Sep. 2016) Technical Report: 3rd Generation Partnership Project; Technical Specification Group Services and System Aspects; Study on Architecture for Next Generation System (Release 14)," 3GPP, 650 Route des Lucioles—Sophia Antipolis, Valbonne—France, Sep. 2016; 423 pages.
"3GPP TR 23.799 V1.0.2 (Sep. 2016) Technical Report: 3rd Generation Partnership Project; Technical Specification Group Services and System Aspects; Study on Architecture for Next Generation System (Release 14)," 3GPP, 650 Route des Lucioles—Sophia Antipolis, Valbonne—France, Sep. 2016; 423 pages.
"3GPP TR 23.799 V1.1.0 (Oct. 2016) Technical Report: 3rd Generation Partnership Project; Technical Specification Group Services

(56) References Cited

OTHER PUBLICATIONS and System Aspects; Study on Architecture for Next Generation System (Release 14)," 3GPP, 650 Route des Lucioles—Sophia Antipolis, Valbonne—France, Oct. 2016; 501 pages.

"3GPP TR 23.924 V13.0.0 (Dec. 2015) Technical Report: 3rd Generation Partnership Project; Technical Specification Group Services and System Aspects; Feasibility study on Non-Access Stratum (NAS) node selection function above Base Station Controller (BSC)/Radio Network Controller (RNC) (Release 13)," 3GPP, 650 Route des Lucioles—Sophia Antipolis, Valbonne—France, Dec. 2015; 41 pages.

"3GPP TS 29.274 V14.2.0 (Dec. 2016) Technical Specification: 3rd Generation Partnership Project; Technical Specification Group Core Network and Terminals; 3GPP Evolved Packet System (EPS); Evolved General Packet Radio Service (GPRS) Tunnelling Protocol for Control Plane (GTPv2-C); Stage 3 (Release 14)," 3GPP, 650 Route des Lucioles—Sophia Antipolis, Valbonne—France, Dec. 2016; 369 pages.

"3GPP TS 36.331 V13.3.0 (Sep. 2016) Technical Specification: 3rd Generation Partnership Project; Technical Specification Group Radio Access Network; Evolved Universal Terrestrial Radio Access (E-UTRA); Radio Resource Control (RRC); Protocol specification (Release 13)," 3GPP, 650 Route des Lucioles—Sophia Antipolis, Valbonne—France, Sep. 2016; 627 pages.

"3GPP TS 36.331 V14.1.0 (Dec. 2016) Technical Specification: 3rd Generation Partnership Project; Technical Specification Group Radio Access Network; Evolved Universal Terrestrial Radio Access (E-UTRA); Radio Resource Control (RRC); Protocol specification (Release 13)," 3GPP, 650 Route des Lucioles—Sophia Antipolis, Valbonne—France, Dec. 2016; 654 pages.

"3GPP TS 36.413 V14.1.0 (Jan. 2017) Technical Specification: 3rd Generation Partnership Project; Technical Specification Group Radio Access Network; Evolved Universal Terrestrial Radio Access Network (E-UTRAN); S1 Application Protocol (S1AP) (Release 14)," 3GPP, 650 Route des Lucioles—Sophia Antipolis, Valbonne—France, Jan. 2017; 333 pages.

"3GPP TR 38.801 V0.4.0 (Aug. 2016) Technical Report Technical Report: 3rd Generation Partnership Project; Technical Specification Group Radio Access Network; Study on New Radio Access Technology; Radio Access Architecture and Interfaces (Release 14)," 3GPP, 650 Route des Lucioles—Sophia Antipolis, Valbonne—France, Aug. 2016.

3GPP TSG-RAN WG3 Meeting #93bis, Document No. R3-162416, entitled "On Common and Specific Building Blocks for Inactive UEs," Source: Ericsson, Sophia Antipolis, France, Oct. 10-14, 2016; 7 pages.

SA WG2 Meeting #114, SA WG2 Temporary Document No. S2162010, entitled "NextGen Core Architecture solution for sharing Network Function across multiple Network Slices," Source: ZTE, Sophia Antipolis, Apr. 11-15, 2016; 8 pages.

\* cited by examiner

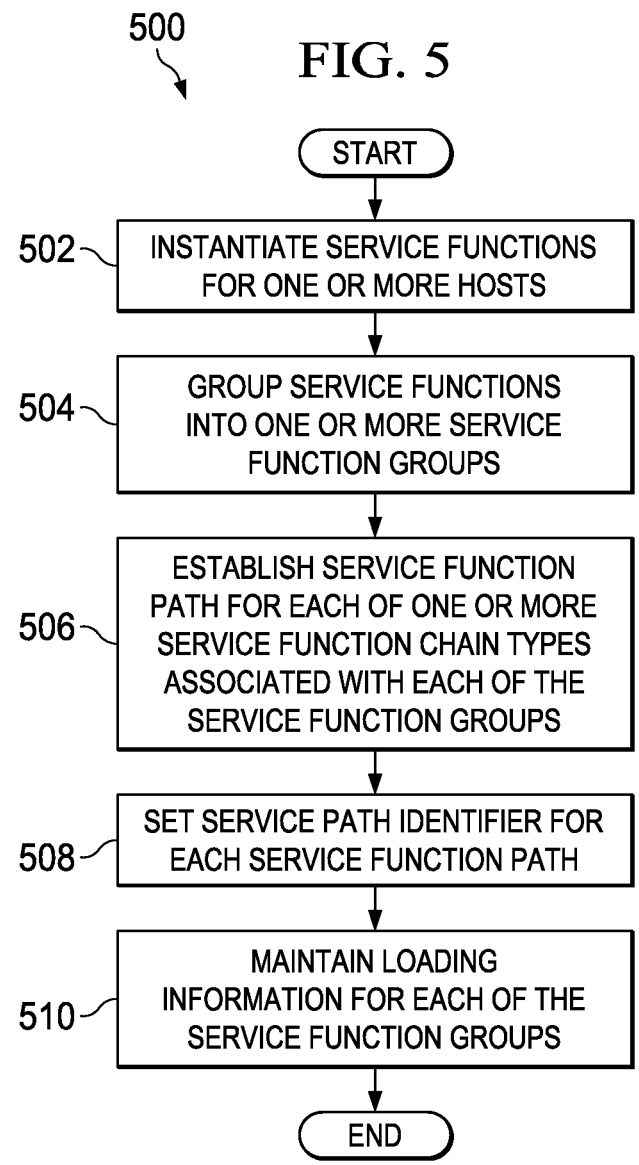

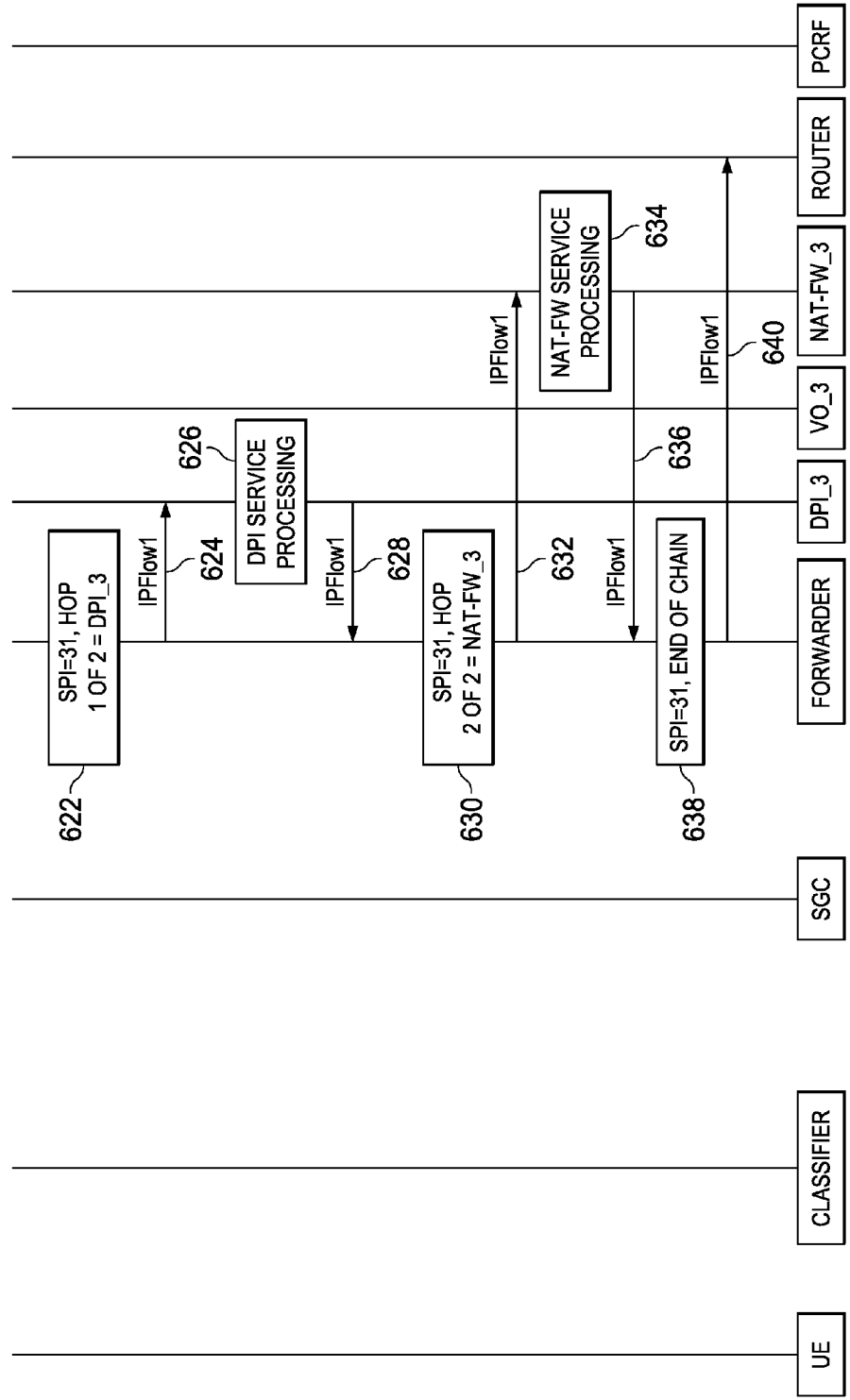

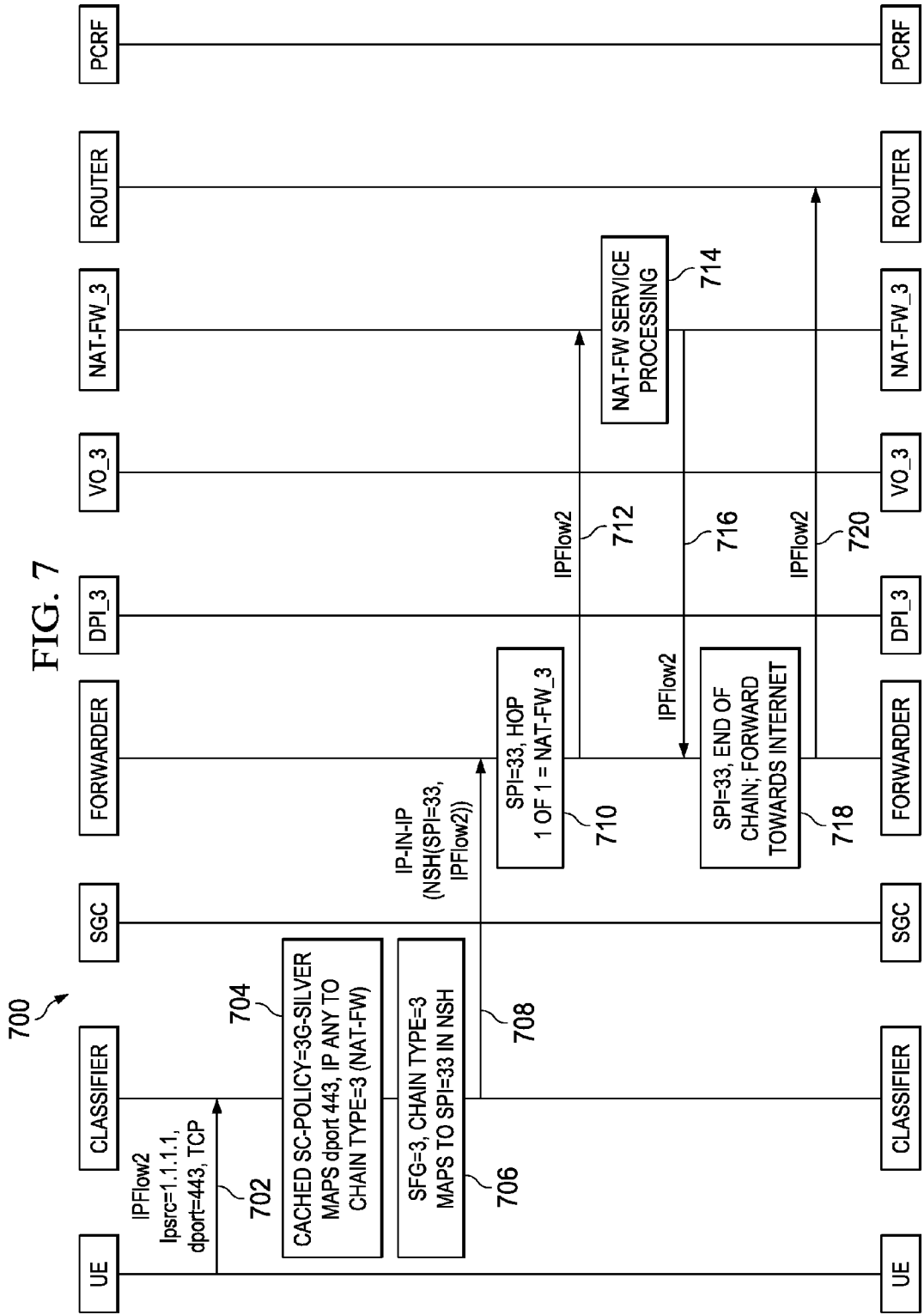

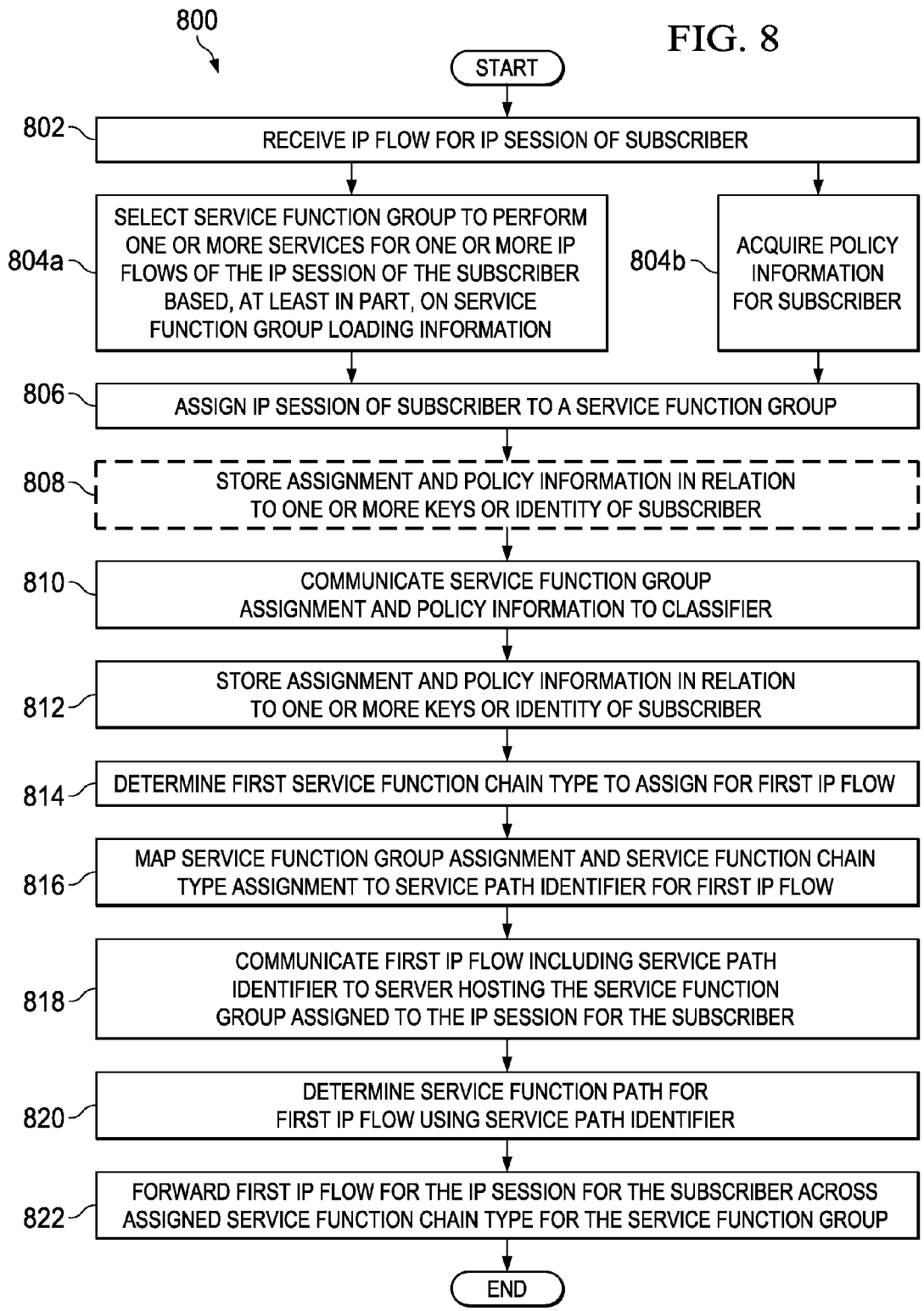

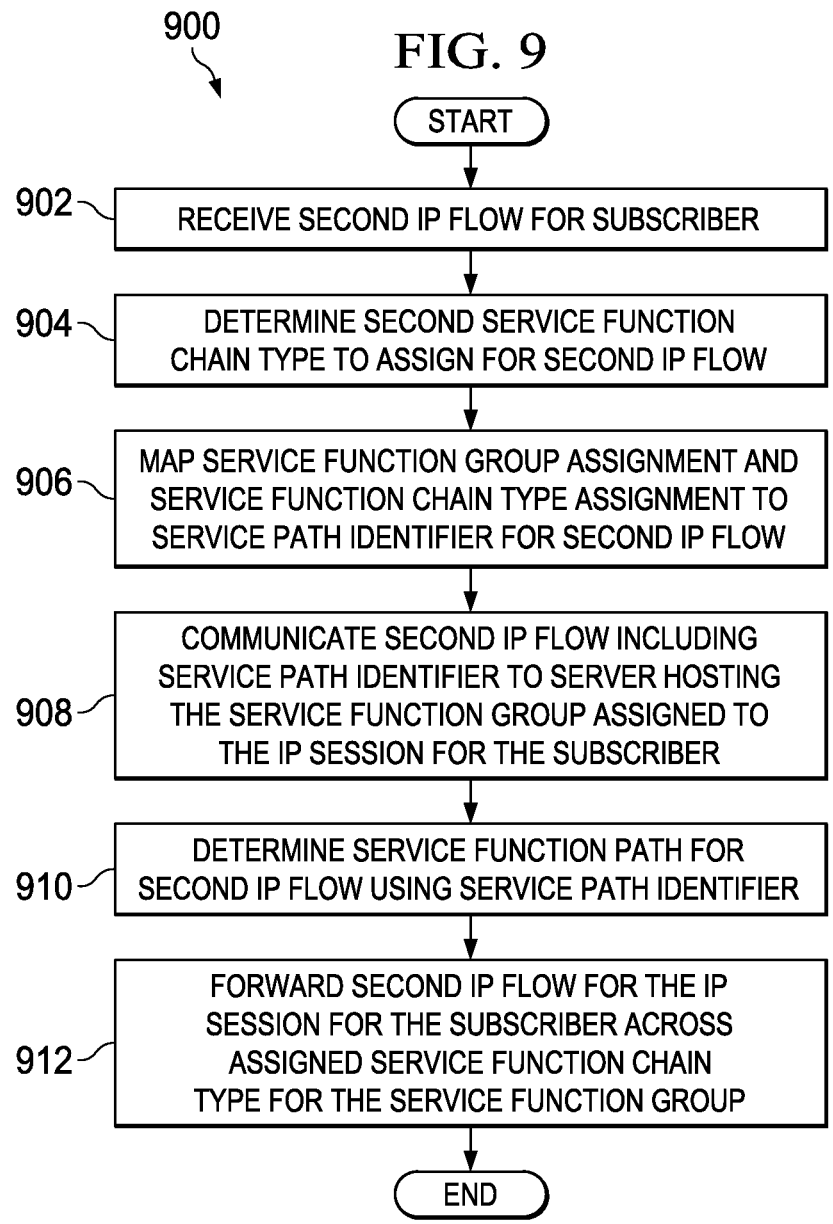

SYSTEM AND METHOD TO FACILITATE THE ASSIGNMENT OF SERVICE FUNCTIONS FOR SERVICE CHAINS IN A NETWORK ENVIRONMENT

RELATED APPLICATION

This Application is a continuation (and claims the benefit of priority under 35 U.S.C. §120) of U.S. application Ser. No. 14/717,887, filed May 20, 2015, entitled "SYSTEM AND METHOD TO FACILITATE THE ASSIGNMENT OF SERVICE FUNCTIONS FOR SERVICE CHAINS IN A NETWORK ENVIRONMENT," Inventors Robert M. Batz, et al. The disclosure of the prior application is considered part of (and is incorporated in its entirety by reference in) the disclosure of this application.

TECHNICAL FIELD

This disclosure relates in general to the field of communications and, more particularly, to a system and method to facilitate the assignment of service functions for service chains in a network environment.

BACKGROUND

Networking architectures have grown increasingly complex in communication environments. Data traffic has grown extensively in recent years, which has significantly increased the demands on network resources. Network operators often provide differentiated services to subscribers according to one or more policies for the subscribers. As the number of mobile subscribers and the number of operator services provided to mobile subscribers increases, efficient management of communication resources becomes even more critical. In some instances, providing multiple services to multiple subscribers may cause network equipment to be overwhelmed, provide suboptimal performance or create congestion in the network. Accordingly, there are significant challenges in managing network resources, particularly in managing routing of subscriber traffic across multiple services provided throughout the network.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 5 is a simplified flow diagram illustrating example operations associated with management of service function groups in accordance with one potential embodiment of the communication system;

FIGS. 6A-6B are simplified interaction diagrams illustrating example interactions associated with an example subscriber flow in accordance with various potential embodiments of the communication system;

FIG. 7 is a simplified interaction diagram illustrating example interactions associated with another example flow for the subscriber of FIGS. 6A-6B in accordance with various potential embodiments of the communication system;

FIG. 8 is a simplified flow diagram illustrating example operations that can be associated with handling a first subscriber flow in accordance with one potential embodiment of the communication system;

FIG. 9 is a simplified flow diagram illustrating example operations that can be associated with handling one or more subsequent subscriber flows following the example operations of FIG. 8 in accordance with one potential embodiment of the communication system;

DETAILED DESCRIPTION OF EXAMPLE EMBODIMENTS

Overview

Figure 1:
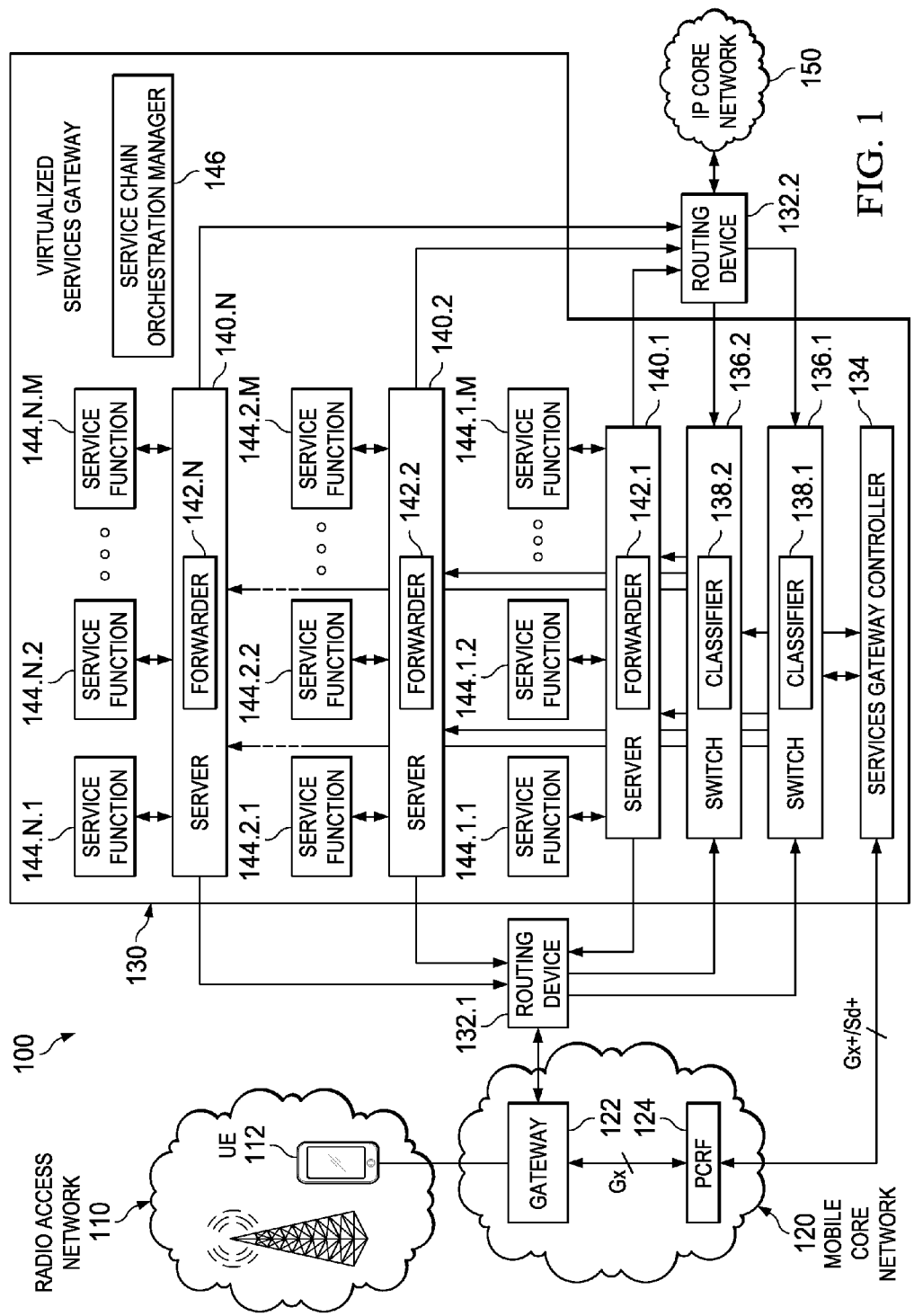
FIG. 1 is a simplified block diagram illustrating a communication system to facilitate the assignment of service functions for service chains in a network environment according to one embodiment of the present disclosure.

A method is provided in one example embodiment and may include receiving a first Internet protocol (IP) flow for an IP session for a subscriber; selecting a first service function group from a plurality of service function groups to perform one or more services for the IP session for the subscriber, wherein each of the plurality of service function groups comprises a plurality of service function chain types and wherein each service function chain type comprises an ordered combination of one or more service functions; assigning the IP session for the subscriber to the first service function group; and forwarding the first IP flow for the IP session of the subscriber across a first service function chain type for the first service function group based, at least in part, on a service policy for the subscriber. In some instances, the selecting can further include retrieving loading information for each of the plurality of service function groups; and determining the first service function group is available to support the IP session for the subscriber based, at least in part, on the loading information.

In some cases, the method can further include acquiring the service policy for the subscriber from a Policy and Charging Rules Function (PCRF), wherein the service policy identifies one or more service function chain types that can be associated with one or more IP flows for the subscriber. In some instances, the acquiring can be performed once per IP session for the subscriber.

In other cases, the method can further include determining a first service function chain type to assign the first IP flow for the subscriber based on the service policy and flow information associated with the first IP flow; mapping the first IP flow for the subscriber to a first service path identifier, wherein the first service path identifier identifies the first service function group and the first service function chain type; and appending the first service path identifier to each IP packet of the first IP flow for the subscriber. In some instances, the appending can include encapsulating the first service path identifier in a Network Services Header (NSH) of each IP packet of the first IP flow. In some instances, the forwarding can include forwarding each IP packet of the first IP flow of the subscriber to each of one or more service functions associated with the first service function chain type.

In yet other cases, the method can further include receiving a second IP flow for the IP session of the subscriber; determining a second service function chain type for the first service function group based on the service policy for the subscriber and flow information associated with the second IP flow; mapping the second IP flow for the subscriber to a second service path identifier, wherein the second service path identifier identifies the first service function group and the second service function chain type; appending the second service path identifier to each IP packet of the second IP flow of the subscriber; and forwarding the second IP flow of the subscriber across the second service function chain type according to the second service path identifier.

Another method is provided in another example embodiment and can include instantiating a plurality of service functions for each of one or more hosts, wherein each service function corresponds to a particular service function type; grouping each of the plurality of service functions into one or more service function groups; establishing a service function path for each of a plurality of service function chain types associated with the one or more service function groups, wherein each service function chain type comprises an ordered combination of one or more of the service functions within each service function group; and maintaining loading information for each of the plurality of service function groups based, at least in part, on a number of subscriber Internet protocol (IP) flows assigned to each service function group. In some instances, each service function instance can be a member of only one service function group for a particular host. In other instances, a particular service function instance can be a member of at least two service function groups established across one or more hosts.

In some cases, the loading information can be maintained in a service function group load balancing table, which includes a load balancing metric for each of the one or more service function groups. In some instances, the method can further include determining each of the plurality of service function groups is unavailable to support additional subscriber IP flows; instantiating one or more new service functions based, at least in part, on the determination; grouping the one or more new service functions into a new service function group; and establishing a service function path for each of the plurality of service function chain types associated with new service function group.

In other cases, the method can further include adding the new service function group and a load balancing metric associated with the new service function group into the service function group load balancing table, wherein the load balancing metric indicates that the new service function group is available to support additional IP flows. In yet other cases, the method can further include determining a failure of a particular service function of a particular service function group; instantiating a new service function to replace the particular service function; grouping the new service function into the particular service function group; and establishing a new service function path for one or more service function chain types for the particular service function group. In yet other cases, the method can include determining a particular service function of a particular service function group is underutilized; grouping the particular service function into a new service function group; and adding the new service function group and a load balancing metric associated with the new service function group into a service function group load balancing table.

EXAMPLE EMBODIMENTS

As used herein, the terms 'service function' and 'virtual machine' encompass an emulation of a computer system, operating based on the computer architecture and functions of a real or hypothetical computer, with particular implementations involving specialized hardware, software, or a combination of both. In various embodiments, a service function or virtual machine may execute via a hypervisor-based virtualization or a container-based virtualization of a server (e.g., blade server, rack server, stand-alone server) using the server's hardware (e.g., processor and memory element) and/or operating system. In various embodiments a service function or virtual machine can be instantiated or 'spun-up', as sometimes referred to, by a central management entity and can be configured to carry out one or more service function operations. In various embodiments, one or more service functions or virtual machines can be 'chained' or 'linked' together in a particular order to create one or more 'service chains', also referred to herein as 'service function chains', which can perform one or more service functions on one or more Internet protocol (IP) flows for a particular IP session of a particular subscriber. As referred to herein in this Specification, an IP session for a subscriber can be any IP Data Session, such as, for example, an IP connectivity access network (IP-CAN) session or a packet data network (PDN) session, etc., which supports multiple IP flows for the subscriber.

Turning to FIG. 1, FIG. 1 is a simplified block diagram illustrating a communication system 100 to facilitate the assignment of service functions for service chains in a network environment according to one embodiment of the present disclosure. This particular configuration may be tied to the 3rd Generation Partnership Project (3GPP) Evolved Packet System (EPS) architecture, also sometimes referred to as the Long Term Evolution (LTE) EPS architecture. In various embodiments, the depicted architecture may be applicable to an environment capable of supporting various virtualized services architectures, such as, for example, the Quantum Services Platform architecture developed by Cisco. Alternatively, the depicted architecture may be applicable to other environments equally.

The example architecture of FIG. 1 can include users operating user equipment (UE) 112 within a radio access network (RAN) 110, one or more routing devices 132.1-132.2, a mobile core network 120, a virtualized Services Gateway (vSG) 130 and an Internet protocol (IP) core network 150. Mobile core network 120 can include one or more gateway(s) 122 and a Policy and Charging Rules Function (PCRF) 124. Virtualized Services Gateway (vSG) 130 can include a services gateway controller (SGC) 134, one or more switch(es) 136.1-136.2, one or more server(s) 140.1-140.N and a service chain orchestration manager 146. Each respective switch 136.1-136.2 can include a respective classifier 138.1-138.2. Each respective server 140.1-140.N can include a respective forwarder 142.1-142.N and each respective server 140.1-140.N can host one or more respective service functions 144.1.1-144.1.M through 144.N.1-144.N.M.

It should be understood that service functions, as referred to herein in this Specification, are service function instances, which can be instantiated for a particular host (e.g., servers 140.1-140.N) and each service function instantiated for a particular host can interface with a respective forwarder provided therein. Thus, as referred to herein in this Specification, the terms 'service function' and 'service function instance' are interchangeable. Further, as referred to herein in this Specification, the terms 'service chain' and 'service chain instance' are interchangeable.

For the example architecture of FIG. 1, server 140.1 can host one or more service functions 144.1.1-144.1.M, each of which can interface with forwarder 142.1 via respective logical connections; server 140.2 can host one or more service functions 144.2.1-144.2.M, each of which can interface with forwarder 142.2 via respective logical connections; and server 140.N can host one or more service functions 144.N.1-144.N.M, each of which can interface with forwarder 142.N via respective logical connections.

Each of the elements of FIG. 1 may couple to one another through simple interfaces (as illustrated) or through any other suitable connection (wired or wireless), which provides a viable pathway for network communications. Additionally, any one or more of these elements may be combined or removed from the architecture based on particular configuration needs. For example, communication system 100 may include a configuration capable of transmission control protocol/Internet protocol (TCP/IP) communications for the transmission or reception of packets in a network. Communication system 100 may also operate in conjunction with a user datagram protocol/IP (UDP/IP) or any other suitable protocol where appropriate and based on particular needs.

RAN 110 is a communications interface between UE 112 and mobile core network 120. In various embodiments, RAN 110 may include 3GPP access networks such as, for example, Global System for Mobile Communications (GSM) Enhanced Data Rates for GSM Evolution (EDGE) Radio Access Network (GERAN), generally referred to as 2G, Universal Mobile Telecommunications System (UMTS) Terrestrial Radio Access Network (UTRAN), generally referred to as 3G, and/or evolved UTRAN (E-UTRAN), generally referred to as 4G, Long Term Evolution (LTE) or LTE-Advanced (LTE-A). In various embodiments, RAN 110 may include non-3GPP IP access networks such as digital subscriber line (DSL), Cable, a wireless local area network (WLAN) (e.g., Wireless Fidelity (WiFi), Worldwide Interoperability for Microwave Access (WiMAX)) or the Internet. In various embodiments, RAN 110 can include one or more Node Bs (NodeBs) (e.g., for 3G RANs), evolved Node Bs (eNodeBs) (e.g., for 4G/LTE RANs), combinations thereof or the like, which can facilitate over-the-air communications with UE 112 and interfacing with mobile core network 120.

In various embodiments, UE 112 can be associated with users, employees, clients, customers, meters, machines, etc. wishing to initiate a flow in communication system 100 via some network. The terms 'user equipment' and 'mobile node' are inclusive of devices used to initiate a communication, such as a computer, a personal digital assistant (PDA), a laptop or electronic notebook, a cellular telephone, an i-Phone™, i-Pad™, a Google Droid™ phone, an IP phone, or any other device, component, element, or object capable of initiating voice, audio, video, media, or data exchanges within communication system 100. UE 112 may also be inclusive of a suitable interface to a human user such as a microphone, a display, a keyboard, or other terminal equipment. As used herein in this Specification, the terms 'user equipment,' 'user' and 'subscriber' are interchangeable.

UE 112 may also be any device that seeks to initiate a communication on behalf of another entity or element such as a program, a database, or any other component, device, element, or object capable of initiating an exchange within communication system 100. Data, as used herein in this document, refers to any type of numeric, voice, video, media, or script data, or any type of source or object code, or any other suitable information in any appropriate format that may be communicated from one point to another. In certain embodiments, UE 112 may have a bundled subscription for network access and application services (e.g., voice), etc. Once the access session is established, the user can register for application services as well, without additional authentication requirements. UE IP addresses can be assigned using dynamic host configuration protocol (DHCP), remote authentication dial in user service (RADIUS), Stateless Address Auto-configuration, default bearer activation procedures, etc., or any suitable variation or combination thereof. In various embodiments, UE 112 can include one or transmitters and/or receivers (e.g., transceivers) and one or more antenna(s) to facilitate over the air communications with one or more cell radios that may be deployed within RAN 110.

UE 112 can interface with gateway 122 within mobile core network 120 via RAN 110 (e.g., via NodeBs, eNodeBs, etc.). Gateway 122 can have one or more logical connection(s) to PCRF 124 via a Gx interface. In general, mobile core network 120 represents a series of points or nodes of interconnected communication paths for receiving and transmitting packets of information that propagate through communication system 100. In various embodiments, mobile core network 120 can be configured according to 3GPP standards to include one or more elements of an Evolved Packet Core (EPC) in order to provide services (e.g., voice, data, multimedia, etc.) and interconnectivity to UE 112 to one or more packet data networks (e.g., IP core network 150). Mobile core network 120 may offer communicative interfaces between UE 112 and selected nodes or elements in the network, and may be any local area network (LAN), wireless local area network (WLAN), metropolitan area network (MAN), wide area network (WAN), virtual private network (VPN), Intranet, extranet or any other appropriate architecture or system that facilitates communications in a network environment. IP core network 150 may be any LAN, WLAN, MAN, WAN, VPN, Intranet, extranet or any other appropriate architecture or system that facilitates communications in a network environment.

In at least one embodiment, gateway 122 can be deployed as packet data network (PDN) gateway (PGW), which may provide IP session connectivity for UE 112 to one or more external packet data networks (PDNs), such as, for example, IP core network 150, and may also serve as policy enforcement points to manage Quality of Service (QoS), online/offline flow-based charging, etc. In general, PCRF 124 may aggregate information to and from the mobile core network 120, operational systems, and/or other sources in real-time and may support the creation of policy charging and control (PCC) rules and may automatically make policy decisions for each subscriber such as, for example, quality of service (QoS) level decisions and charging rule decisions. In various embodiments, PCRF 124 can be configured to use user-related, subscription-related and/or application-related information as a basis for the policy and charging control decisions. In some embodiments, PCRF 124 may determine PCC rules based on an application or service described to the PCRF, for example, from an application function (AF). In some embodiments, a traffic detection function (TDF), as defined in 3GPP Technical Specification (TS) 32.251 and 29.212, can be included in mobile core network 120 to provide for application-based charging for UE 112. In some embodiments, a TDF can interface with PCRF 124 via a DIAMETER-based Sd interface.

Gateway 122 can have a logical connection to routing device 132.1. IP core network 150 can have a logical connection to routing device 132.2. In various embodiments routing devices 132.1-132.2 can be associated with any network element capable of routing data or information between one or more points of a network such as, for example, routers (e.g., data center router, top of rack (ToR) router, End of Row (EoR) router, etc.), switches, servers, gateways, bridges, processors, modules or any other suitable device, component, element or object, which may be operable to facilitate the exchange of information or otherwise help coordinate the operations described herein between network elements of communication system 100. In various embodiments, routing devices 132.1-132.2 can be implemented in a single routing device or distributed across multiple routing devices.

In various embodiments, vSG 130 can be associated with a Gi-LAN virtual services area (e.g., for virtualized applications/services), which may be associated with services or applications that can operate on subscriber IP flows between a PGW (e.g., gateway 122) and one or more PDNs (e.g., IP core network 150). In 3GPP standards, the interface or reference point between the PGW and one or more PDNs is typically referred to as the service gateway interface (SGi). Routing devices 132.1-132.2 can further interface with switches 136.1-136.2 (e.g., to route traffic towards the switches) and servers 140.1-140.N (e.g., to receive traffic from the servers) via respective logical connections to facilitate the exchange of information or otherwise help coordinate the operations described herein between network elements of communication system 100. In various embodiments, routing devices 131.1-132.2 can include load balancing capabilities to load balance traffic routed towards classifiers 136.1-136.2.

In various embodiments, switches 136.1-136.2 can be associated with any network element capable of routing data or information between one or more points of a network such as, for example, routers, servers, gateways, bridges, processors, modules or any other suitable device, component, element or object, which may be operable to facilitate the exchange of information or otherwise help coordinate the operations described herein. In certain embodiments, each respective classifier 138.1-138.2 for each respective switch 136.1-136.2 may be configured to provide data-plane packet-switching (PS) functionality that maps a subscriber IP Flow to a service function path for service processing. Each switch 136.1-136.2 may further interface with services gateway controller (SGC) 134 via respective logical connections to facilitate the exchange of information or otherwise help coordinate the operations described herein.

In various embodiments, SGC 134 can be associated with any network element capable of routing data or information between one or more points of a network such as, for example, routers, switches, servers, gateways, bridges, processors, modules or any other suitable device, component, element or object, which may be operable to facilitate the exchange of information or otherwise help coordinate the operations described herein. In certain embodiments, SGC 134 may be configured to provide subscriber-aware controller functionality in a Gi-LAN solution and may interface with PCRF 124 to acquire policy information for a subscriber (e.g., a subscriber associated with UE 112) and/or application via DIAMETER-based Gx and/or Sd protocols, as prescribed by 3GPP standards. Note, the connection(s) between SGC 134 and PCRF 124 are identified using 'Gx+' and 'Sd+' labels to indicate that these connection(s) may include extensions of respective DIAMETER-based Gx and Sd protocols as defined in 3GPP standards and are further shown using the 'Gx+/Sd+' label to indicate that one or both of Gx+ and/or Sd+ connections can be present between SGC 134 and PCRF 124. In certain embodiments, each respective classifier 138.1-138.2 may include a respective intermediate node or module, which can be referred to as a Services Gateway Controller Agent (SGC-A), which may store subscriber information and interface to both the SGC and to the packet-switching functionality for each classifier 138.1-138.2.

Various interfaces are provided in the architecture of FIG. 1, which can facilitate policy and charging functions, Authentication, Authorization and Accounting (AAA) functions and/or charging activities (offline and online) among various network elements. For example, interfaces can be used to exchange point of attachment, location, and/or access data for one or more end users, for example, a user operating UE 112. Resource information, accounting information, location information, access network information, network address translation (NAT) control, etc. can be exchanged using a remote authentication dial in user service (RADIUS) protocol or any other suitable protocol where appropriate. Other protocols that can be used in communication system 100 can include DIAMETER protocol, SGi, terminal access controller access-control system (TACACS), TACACS+, etc. Generally, interfaces such as, for example, Gx and Sd and extensions thereto (e.g., Gx+, Sd+) represent policy and charging control (PCC) reference points, as generally provided in 3GPP TS 29.212, for communicating policy and charging related information between various network elements.

Each switch 138.1-138.2 may further interface with each server 140.1-140.N via respective logical connections. In various embodiments, each server 140.1-140.N can be associated with any network element capable of routing data or information between one or more points of a network and hosting one or more service functions (e.g., service function instances) such as, for example, stand-alone servers, rack mounted blade servers, processors, modules or any other suitable device, component, element or object, which may be operable to facilitate the exchange of information or otherwise help coordinate the operations described herein. In various embodiments, each respective forwarder 142.1-142.N for each respective server 140.1-140.N can be configured to provide functionality to switch packets to and from respective service functions (e.g., service function instances) hosted thereon for various service chains. In certain embodiments, packets for IP flows for subscribers can be appended with a Network Services Header (NSH), as defined by the Internet Engineering Task Force (IETF), configured to carry service function path information for use by respective forwarders 142.1-142.N to switch packets for subscriber IP flows to and from service function instances hosted on respective servers 140.1-140.N.

In various embodiments, each service function 144.1.1-144.1.M through 144.N.1-144.N.M can be associated with one or more virtualized service functions, such as, for example deep packet inspection (DPI) service functions (SFs), Network Address Translation-Firewall (NAT-FW) SFs, Video Optimizer (VO) SFs, Traffic Detection Function (TDF) SFs, combinations thereof or the like. In various embodiments, a DPI is a function that can perform inspections at Layer 3 (L3) through Layer 7 (L7) and can determine the application. In at least one embodiment, it may enforce QoS based on the application and subscriber policy. In various embodiments, a NAT-FW is typically a networks security device with capabilities to perform NAT and/or Port Address Translation (PAT) functions on subscriber IP flows. In various embodiments, a VO can perform video related optimization functions on subscriber IP flows in order to optimize subscriber traffic by changing the quality, compression, etc. of video flows, including but not limited to, compression/decompression, encoding/decoding format, encoding/decoding rate, combinations thereof or the like. Other optimization service functions can be provided within the scope of the present disclosure, such as, for example audio optimizers. In various embodiments, a TDF SF can perform application-based charging functions for subscriber IP flows, can detect application traffic, can report the start and stop of traffic for a detected application, can enforce application based QoS and/or can perform application-based usage monitoring for subscriber IP flows.

As noted previously, in various embodiments, one or more service functions can be 'chained' or 'linked' together in a particular order to create a service chain, also referred to herein as a 'service function chain'. In various embodiments, different combinations of different types of service functions can be chained together in particular orders to form different service function chain types, each of which can perform particular service processing operations on various IP flows for an IP session of a given subscriber (e.g., a subscriber associated with UE 112). In certain embodiments, each service function chain can be identified by an integer indicating the service function chain type. This integer may not identify a specific service function path (e.g., specific instances of service functions), but rather can indicate a particular service function chain type (e.g., a sequence of different types of one or more service functions).

Note each instance of a particular service function type hosted by each server 140.1-140.N, as represented in the architecture of FIG. 1, can be identified according to the sub-index 'M'. For example, consider a first service function type, say, for example, a DPI service function can be associated with the sub-index M=1 such that service function 144.1.1 hosted by server 140.1 may be associated with a first instance of the DPI service function, service function 144.2.1 hosted by server 140.2 may be associated with a second instance of the DPI service function and so on for any number of DPI service functions 144.N.1 which can be hosted by respective servers 140.N for vSG 130. In another example, a Video Optimizer (VO) service function can be associated with sub-index M=2 such that service function 144.1.2 hosted by server 140.1 may be associated with a first instance of the VO service function, service function 144.2.2 may be associated with a second instance of the VO service function and so on for any number of VO service functions 144.N.2 which can be hosted by respective servers 140.N for vSG 130. Any number/type of M service functions can be hosted by server 140.1-140.N according to various embodiments as configured by a network operator and/or service provider.

Note other embodiments described herein, particularly with respect to describing example service function chain configurations, illustrate specific service function types for the example service function chains and do not adopt the sub-index 'M' labeling as shown in FIG. 1. However, it should be understood that all service function types described throughout the various embodiments provided herein can be interchanged in any manner to support a virtualized services architecture, such as that provided in FIG. 1.

In various embodiments, service functions hosted by one or more servers 140.1-140.N can be grouped into service function groups. In various embodiments, a service function group can be defined as set of service functions consisting of one specific instance of a service function of each type that can be hosted by servers 140.1-140.N. In various embodiments, each service function group that may be configured for communication system 100 can be identified by another integer (e.g., a service function group ID), which may be separate and distinct from the integers used to identify service function chain types. More generally, a service function group (SFG) differs from a service function chain type in that an SFG does not identify a sequence of one or more service functions, but rather a identifies group of specific service functions that can be used to chain together one or more service function chain types. For example, in a system consisting of 10 DPI SFs, 20 VO SFs, and 5 NAT-FW SFs, a particular service function group, say, for example, a second service function group (e.g., service function group 2) might consist of a second instance of a DPI SF (e.g., DPI_2), a fourth instance of a VO SF (e.g., VO_4), and a third instance of a NAT-FW SF (e.g., NAT-FW_3) such that one specific instance of each type of service function may be provided in the second service function group. As provided by various embodiments of communication system 100, a particular service function group may handle all service chains for all IP flows of a particular IP session for a particular subscriber. In various embodiments, each server 140.1-140.N can host multiple instances of a same service function type and multiple service functions of a same type for a same server can interface with the forwarder of that server (e.g., each respective forwarder 142.1-142.N for each respective server 140.1-140.N).

In various embodiments, communication system 100 may provide for the definition of a service function group as a building block to enable both simple groups and virtual groups of service functions. In certain embodiments, for simple service function groups, an instance of a service function is a member of only one group. Simple service function groups can be referred to herein as a 'slice' model. In certain embodiments, for virtual service function groups, an instance of a service function may be a member of multiple virtual groups with the assignment of service function instances to different service function groups provided more dynamically. In various embodiments, virtual service function groups can enable groupings based on available service function capacity where a new service function of say, for example, type 'X' can be combined in a group with an underutilized existing service function of say, for example, type 'Y'. In various embodiments, assignment of underutilized service functions can enable such underutilized service functions to be assigned to new virtual groups without impact to existing subscribers served by existing service functions.

In various embodiments, service chain orchestration manager 146 can be associated with an application or other similar function executing in a suitable server or other network element in vSG 130 to facilitate instantiation and maintenance of one or more service functions (e.g., service functions 144.1.1-144.1.M through 144.N.1-144.N.M), chaining of different service function chain types, assignment of different integer service function chain type identifiers (IDs) for different service function chain types, grouping of different service functions into service function groups, assignment of different integer group IDs to different service function groups and/or setting up of related service function paths for each service function group and service function chain type. In at least one embodiment, a service function path can include hop information (e.g., input/output nodes, addresses, etc.) between one or more service functions of a service chain. It should be understood that service chain orchestration manager 146 can interface with each of: SGC 134, switches 136.1-136.2, servers 140.1-140.N and/or service functions 144.1.1-144.1.M through 144.N.1-144.N.M. Connections to these elements from service chain orchestration manager 146 are not shown in order to illustrate other features of communication system 100.

Before detailing some of the operational aspects of FIG. 1, it is important to understand some common requirements that can be imposed on virtualized services architectures in commercial environments. The following foundation is offered earnestly for teaching purposes only and, therefore should not be construed in any way to limit the broad teachings of the present disclosure. Assignment of subscriber IP flows to a service function chain (e.g., an ordered set of service function types) can be based on factors such as, for example, IP flow parameters, user subscription, and network status. After a service function chain is assigned for an IP flow of a subscriber, the IP flow for the subscriber should be steered to a service function path which is an ordered set of specific service functions (e.g., an instance of a service function chain). Typically, there can be many possible service function paths for a given service function chain.

In order to successfully deploy a Gi-LAN services solution, assignments of service function paths to IP flows should be provided such that various requirements can be satisfied. A first requirement can include a subscriber persistence requirement. To satisfy the subscriber persistence requirement all IP Flows for a given subscriber should utilize a single instance of each type of service function. This may prevent problems such as splitting the same type of policy enforcement (e.g., quota, policing, firewall, etc.) across several service functions of the same type and may prevent having multiple policy sessions for a subscriber from the same type of service function. A second requirement can include a load balancing requirement. To satisfy the load balancing requirement, IP flows should be balanced across various service function paths while maintaining subscriber persistence to service functions. In some cases, the load balancing requirement can include providing that underutilized service function paths can be more heavily weighted.

A third requirement can include a flexible service chaining requirement. To satisfy the flexible service chaining requirement, service functions should be capable of being grouped together to support service function paths for multiple service function chains while maintaining subscriber persistence. Grouping can be simple with a service function supporting one (1) service function path for each service function chain, or it can be more complex with service functions supporting multiple service function paths for some or all service function chains. Grouping can be statically assigned, or it can be dynamic where new service function paths are created as needed with underutilized service functions.

A fourth requirement can include an elasticity requirement. To satisfy the elasticity requirement, the architecture should be capable of adding new service functions and grouping them without disrupting existing IP Flows and subscriber persistence. New service functions can be assigned a higher weight for load distribution. Additionally, the system should support the addition of classifiers without impact to the user experience. A fifth requirement can include a high availability requirement. To satisfy the high availability requirement, the architecture should be capable of automatically detecting failures (e.g., of service functions, forwarders, classifiers, etc.) and should be capable of recovering without operator intervention while minimizing disruptions to the user experience and to the system when components fails.

A sixth requirement can include a policy push support requirement. To satisfy the policy push support requirement, the architecture should be capable of working in collaboration with the policy layer (e.g., PCRF) to push policy information to service functions handling a subscriber in advance of switching subscriber data packets to such service functions. A seventh requirement can include a PCRF integration requirement. To satisfy the PCRF integration requirement, the PCRF should be able to specify service chaining policies based on subscription, 3GPP network characteristics (e.g., 3G/4G, roaming, etc.) and/or usage.

In accordance with various embodiments described herein, communication system 100 is configured to provide a system and method to facilitate the assignment of service functions for service chains for a virtualized services architecture, which satisfies the aforementioned requirements. In various embodiments, communication system 100 may provide a method for assigning a set or group of service functions to a particular subscriber associated with a given UE (e.g., UE 112) for handling service function chains for the subscriber. Within the context of the aforementioned requirements, communication system 100 provides for the definition of one or more service function group(s), centralized management (e.g., via SGC 134 and service chain orchestration manager 146) of the service function group(s) for subscriber(s), and a method for mapping service chain types and service function groups to service function paths. In various embodiments, communication system 100 is capable of satisfying the aforementioned requirements for subscriber persistence to service functions, flexible and dynamic service function groupings with elasticity, load balancing of subscribers to service function groups, high availability, support for policy push, and PCRF specification of service chaining policies.

As discussed previously, service chain orchestration manager 146 can, in various embodiments, be configured to facilitate instantiation and maintenance of one or more service functions (e.g., service functions 144.1.1-144.1.M through 144.N.1-144.N.M), grouping of different service functions into service function groups, assignment of different integer group IDs to different service function groups chaining of different service function chain types, assignment of different integer service function chain type identifiers (IDs) for different service function chain types, and/or setting up of service function paths for each service function group and service function chain type.

In various embodiments, service chain orchestration manager 146 may specify the contents of a service function group (SFG) load balancing (SFG-LB) table (e.g., configure, maintain, update, etc.), which can be stored within a memory element, database or other similar storage within or external to service chain orchestration manager 146 and may provide the SFG-LB table to SGC 134 for use in assigning subscriber IP sessions to service function groups. In at least one embodiment, the SFG load balancing table is a table which consists of ordered pairs of service function group IDs and load capacity/availability metrics. In at least one embodiment, a metric value of zero (0) may be an indicator of "unavailable for new work" while a metric value of 100 may be an indicator of "fully available for new work". It should be understood that various metrics and associated indicators can be configured for the SFG load balancing table.

As noted, service chain orchestration manager 146 can communicate the SFG-LB to SGC 134. In various embodiments, the SFG-LB communicated to SGC 134 can be stored within a memory element, database or other similar storage within or external to SGC 134. SGC 134 may use the SFG load balancing table to assign a service function group ID to a given IP session for a given subscriber (e.g., a subscriber associated with UE 112). Thus, in various embodiments, SGC 134 may provide for the coordination of service function group assignment for subscribers. In certain embodiments, classifiers (e.g., classifiers 138.1-138.2) may not assign subscribers to service function groups, rather they may request the assignment of a service function group for a particular subscriber from SGC 134 and then may cache the information received from SGC 134 in a memory element, database or other similar storage for respective switches 136.1-136.2.

In various embodiments, SGC 134 can maintain the affinity of group ID and subscriber for one or more subscribers in a storage element so all classifier functions can use the same service function group number (ID) for switching packets of each of a given subscriber towards one or more server(s)/forwarder(s) handling one or more service function chain types associated with the assigned service function group for each subscriber. In certain embodiments, if SGC 134 changes the assignment (e.g., due to failure of a forwarder, or member service function of a service function group), it can push the new assignment to all classifiers having knowledge of the subscriber. In certain embodiments, multiple classifiers (e.g., both classifiers 138.1 and 138.2) can switch IP flows for a subscriber to the same set of service functions because SGC 134 may provide service function group information to any classifier if a classifier indicates reception of an IP flow for the subscriber.

In various embodiments, classifiers 138.1-138.2 can be configured to determine a service function path for one or more IP flows of a given IP session for a given subscriber (e.g., a subscriber associated with UE 112) based, at least in part, on policy information, service function group assignment and/or service function chain type assignment for the subscriber. In at least one embodiment, service function path can be associated with one or more hops (e.g., input/output nodes, addresses, etc.) between one or more service functions of each service function chain type for each service function group.

In at least one embodiment, classifiers 138.1-138.2 can be configured to maintain a service policy map of policy information (e.g., levels or classes of service) to service function chain type(s) in one or more service policy table(s). As referred to herein in this Specification, the terms 'policy information' and 'service chaining policy information' can be used interchangeably. In various embodiments, a service policy table can be used by classifiers 138.1-138.2 to associate policy information acquired for a subscriber to a particular service function chain type for a particular IP flow of the subscriber. In various embodiments, levels or classes of service for the policy information table can be based on coarse levels of service (e.g., Gold, Silver, Bronze, etc.) and/or a combination of coarse levels and fine levels of service (e.g., IP flow access control lists (ACLs), groups of flows, application identifiers, etc.).

In at least one embodiment, SGC 134 may assign a SFG to handle all IP flows (e.g., all service function chain types) for a given IP session for a given subscriber based on a load balancing determination for all service function groups maintained in a load balancing table for SGC 134. In at least one embodiment, during operation, SGC 134 can assign a particular service function group to handle IP flows for a subscriber based on the service function group having a load capacity metric indicating that the SFG is currently underutilized. In another embodiment, during operation, SGC 134 can determine that load capacity metrics for all service function groups maintained in the load balancing table indicate that all service function groups are at or near a maximum capacity, in which SGC 134 may indicate to service chain orchestration manager 146 that a new service function group may be needed. In turn, service chain orchestration manager 146 can instantiate new service function types (e.g., as supported by the current service function groups) for one or more servers 140.1-140.N, may group the new service function types into a new service function group, may assign a new group ID to the new service function group and may provide the new group ID to SGC 134, which, in turn, can assign the subscriber to the new service function group (e.g., being an underutilized group) for handling IP flows for the subscriber.

Consider an operational example to illustrate how a service function path for a given IP flow for a given subscriber (e.g., subscriber associated with UE 112) can be determined in at least one embodiment. During operation, for example, upon receiving an indication from a given classifier, say, for example an indication from classifier 138.1 indicating a first IP flow for an IP session for a subscriber associated with UE 112 being received by switch 136.1, SGC 134 may acquire policy information for the subscriber via PCRF 124. In various embodiments, each classifier 138.1-138.2 can provide an indication for an IP flow for a subscriber based on a First Sign of Life (FSOL) packet received from the subscriber, such as, for example, TCP synchronize (SYN) packet or a UDP Domain Name System (DNS) request.

Either before, after or concurrent with the acquisition of the policy information, SGC 134 can determine a service function group to handle the IP session for the subscriber (e.g., to handle all IP flows for the session) based on an evaluation of load capacity metrics that may be maintained for multiple service function groups managed for the system. For the current example, assume that four (4) service function groups are currently being managed for the system. Based on the evaluation, SGC 134 may determine, for example, that service function group three (3) is underutilized (e.g., it's capacity metric is high) and can assign or associate the subscriber's session to service function group 3. In various embodiments, SGC 134 may associate IP sessions for one or more subscribers to corresponding service function group assignments and corresponding subscriber policy information using one or more keys, such as, for example, an International Mobile Subscriber Identity (IMSI) of the subscriber associated with a given UE, Mobile Station International Subscriber Directory Number (MSISDN) for the subscriber, IP address of the UE, etc.

In at least one embodiment, SGC 134 can communicate the policy information and the service function group assignment (e.g., group ID) for the subscriber to classifier 138.1. As noted, classifiers 138.1-138.2 can be configured to store a service policy table, which can be used to assign particular IP flows to particular service function chain types for communication system 100. During operation, for example, upon receiving the policy information and service function group assignment for the IP flow for the IP session for the subscriber, classifier 138.1 can evaluate the service policy table in relation to the policy information for the subscriber and/or any information associated with the IP flow for the subscriber (e.g., source/destination (s/d) port, IP address, etc.), to determine a service function chain type to handle the IP flow for the subscriber. An example service policy table is described in further detail below.

Assume, for purposes of the present example, that classifier 138.1 determines, based on the evaluation, that the IP flow is to be assigned to a particular service function chain type, say, for example a service function chain type of type 2, which may include an instance of a video optimizer service function chained together with a subsequent instance of a firewall service function and which may be identified using a service function chain type integer ID=2. For any subsequent IP flows (e.g., subsequent FSOL) for the subscriber received by classifier 138.1, the classifier may not need to obtain the policy information or service function group assignment from SGC 134 for the subscriber, as this information may be locally cached by classifier 138.1 upon receiving such information for the first IP flow for the subscriber. However, if a subsequent flow is routed to another switch (e.g., switch 136.2 including classifier 138.2), which may not have received the first IP flow, classifier 138.2 may query SGC for the policy information and SFG assignment for the subscriber.

As noted previously, a service function chain type ID may not, in itself, identify a particular service function path, but rather may identify a type of service function chain (e.g., a particular sequence of one or service function types chained together) to be associated with a particular IP flow for an IP session for a given subscriber. In various embodiments, a service function path for a particular IP flow for an IP session for a given subscriber can be mapped to a Service Path Identifier (SPI) by a given classifier based on a service function group ID assignment and service function chain type assignment for the IP flow of the subscriber. In at least one embodiment, an SPI can be a label indicating a sequence (e.g., hops) of specific instances of specific service function types for a specific service function chain type for a specific service function group. In some embodiments, an SPI may be carried in a Network Services Header (NSH), as defined by the IETF, for packets of an IP flow for a given subscriber. In other embodiments, SPI can be carried in a Layer 2 (L2) encapsulation, a Generic Routing Encapsulation (GRE), combinations thereof or the like.

In at least one embodiment, the mapping of a service chain type assignment and service function group assignment to an SPI for an IP flow of a subscriber can be accomplished via a simple algorithm. Consider, in one example, an 8-bit SPI space in which the high order 4-bit nibble can be set to the service function group ID for the service function group assigned to handle all IP flows for an IP session for the subscriber and the low-order 4-bit nibble can be set to the service function chain type as assigned for a particular IP flow for the subscriber. However, this may limit the number of available service function group IDs within a range of 1-15 and the number of service function chain types within a range of 1-15. Consider, in another example, a 24-bit SPI space in which the first high-order 16 bits can be set to the service function group ID and the last low-order 8 bits can be set to the service function chain type. In this example, a service function group ID=18 and a service function chain type ID=3 for the SPI is (18<<8)+3=4608+3=4611. Thus, it should be understood that the SPI size/space can be varied in any manner within the scope of the teachings of this Specification to accommodate a wide array of service function group IDs and service function chain types as may desired by a network operator and/or service provider.

It should be understood that this example algorithm is only one example algorithm that can be used to determine SPI for combinations of service function groups and service function chain types. Any other algorithm and/or number of bits can be assigned to service function group ID/the service function chain type ID within the scope of the present disclosure. Alternatively, in some embodiments, the mapping of service function chain type ID and service function group ID to an SPI can be performed via a look-up table. As noted, in various embodiments, service chain orchestration manager 146 can manage the assignment of service function instances to groups and can inform the forwarding layer (e.g., forwarders 142.1-142.N) of the mappings of SPI values to sequences of service function instances via a service path table.

During operation, in at least one embodiment, an SPI in an NSH for subscriber IP flows can be used by each forwarder 142.1-142.N for each server 140.1-140.N serving one or more service function groups to route packets for IP flows to and from service function instances in the particular order as prescribed for each service function chain type provided by the service path table. Various example operational flows are described in further detail below to illustrate various hops to and from service functions for service function chains. An example service path table is also discussed in further detail below.

In some embodiments, each forwarder 142.1-142.N can be configured to maintain and/or update one or more service function chain type table(s) based on service function chain type information that may be communicated to forwarders 142.1-142.N from service chain orchestration manager 146. In various embodiments, a service function chain type table(s) can be used to identify the order of one or more service function chain types, which forwarders 142.1-142.N can use in combination with service function group ID information to maintain and/or update a service path table. An example service function chain type table is described in further detail below.

Accordingly, communication system 100 can be configured in various embodiments to provide a system and method to facilitate the assignment of service functions for service chains for a virtualized services architecture to satisfy the aforementioned requirements. For example, to satisfy the subscriber persistence requirement, communication system 100 may, in various embodiments, enforce subscriber persistence to service functions (e.g., service functions function 144.1.1-144.1.M through 144.N.1-144.N.M) by assigning a service function group to a particular IP session for a given subscriber and by having SGC 134 assign the same service function group for a subscriber to all classifiers handling IP Flows for the subscriber. Since each group, by definition, only has one instance of a service function type, a subscriber is only handled by one service function of any specific type at a time. In certain embodiments, communication system 100 may also support assigning the same group for an IP version 4 (IPv4) address and an IP version 6 (IPv6) prefix for a subscriber to provide dual-stack bearer support, and could be used across subscriber sessions with the same subscriber key (e.g., same IMSI).

To satisfy the load balancing requirement, SGC 134 may, in various embodiments, load balance subscribers to service function groups and may also support weighted load balancing (e.g., based on load capacity metrics, etc.) so lightly load service function groups can be assigned to new subscriber sessions. Communication system 100, via SGC 134 may support load balancing through embodiments discussed herein without requiring a data plane load balancer. In general, data plane load balancers can make good real-time decisions, but typically require high availability and state replication to prevent impact to the user experience upon failure (e.g., failure of a forwarder, classifier, service function, etc.). Additionally, data plane load balancers may become a bottleneck, which may then require additional distributed data plane load balancing.

To satisfy the flexible service chaining requirement, communication system 100 may, in various embodiments, support the assignment of service functions to multiple groups in a dynamic fashion. This can enables flexible use of service function resources compared to a simple slice model advocated by many current solutions. In various embodiments, service chain orchestration manager 146 can be configured (e.g., by a network operator and/or service provider) to support/instantiate various service function types and service function chain types for different service processing. During operation, at start of day, power-up, etc. service chain orchestration manager 146 can determine a number of servers 140.1-140.N available to host service functions and resources available for each server 140.1-140.N (e.g. memory, number virtual CPUs (vCPUs) and/or virtual machines (VMs) that each server can support, etc.). In various embodiments, each service function type for vSG 130 can be associated with a set of compute requirements (e.g., memory, number of vCPUs, VMs, etc.).

In various embodiments, based on various service function types and service function chain types configured for service chain orchestration manager 146, the servers and resources can be evaluated in order to perform one or more of the following: instantiate a number of service function types, group them into service function groups, associate service function chain types with service functions within each service function group, create a service function chain type table, create service paths for each chain type supported by each group, create a service path table, create a service function group load balancing table, add the groups into the load balancing table based on load balancing metrics (e.g., the metric for each group can be set to 100 at start of day), and/or create a service policy table for each policy and each service function chain type supported by vSG 130.

To satisfy the elasticity requirement, service chain orchestration manager 146 can, in various embodiments, spin up new service functions, group new service functions into one or more new service function group(s), associate service function chain types to new service functions, create service paths for each service function chain type supported by each new service function group and add the new group(s) to the service function group load balancing table for assignment to new subscriber sessions. This can be done while maintaining subscriber persistence to existing service functions and preventing impact to user experience. In certain embodiments, service chain orchestration manager 146 can re-evaluate resources for each service function type and each supported service function chain type for vSG 130 in relation to available resources for each server 140.1-140.N in order to determine one or more servers on which new service function types and/or new service function chain types can be supported. In particular, the architecture of communication system 100 can satisfy the elasticity requirement through the use of virtual service function groups.

For example, consider a case in which all current service function groups in a particular vSG (e.g., vSG) are unavailable for new work, yet a service function type for a particular group, say, for example a DPI service function is underutilized. Based on an evaluation of available resources for each service function type and service function chain types for a new service function group, service chain orchestration manager 146 can spin up new service function types and group the existing underutilized DPI service function together with the new service function types in order to create a new service function group (e.g., a new service function group) and associated service function chain types and populate/update the appropriate tables as needed. In another embodiment, service chain orchestration manager 146 can inspect key performance indicators (KPIs) of current service function groups to determine whether new service functions/service function groups are needed. Accordingly, the architecture of communication system 100 and, in particular service chain orchestration manager 146 can provide for elastic service function type and service function group creation and allocation. In one or more embodiments, communication system 100 can include redundant service chain orchestration managers and/or SGCs, each replicating data for subscriber IP sessions/IP flows, service function information, service function group information, etc. such that if a particular service chain orchestration manager and/or SGC fails, its respective functionality can be replaced by a back-up service chain orchestration manager SGC without impacting user experience.

To satisfy the high availability requirement, SGC 134 can, in certain embodiments, assign a zero metric (or other appropriate metric, depending on configuration) in the load balancing table when a particular service function of a service function group fails to indicate that the service function group is unavailable for servicing subscriber flows. In at least one embodiment, SGC 134 can notify any classifiers supporting IP flows for any subscribers assigned to the service function group upon which such classifiers can request a new service function group assignment for these subscribers. If a classifier fails, a new classifier can, in certain embodiments, retrieve policy and service function group information from SGC 134. In various embodiments, SGC 134 can be configured or built with redundancy so that it is a highly available component with replicated data to support potential network element failures within communication system 100.

To satisfy the policy push support requirement, SGC 134 can, in various embodiments, perform both assigning service function groups for a subscriber and managing policy. SGC 134 can, in at least one embodiment, push policy (e.g., via a message such as Sd TDF Session request (TSR)) for a subscriber in advance to service functions for a service function group assigned to the subscriber instead of waiting for a pull from the service functions. To satisfy the PCRF integration requirement, PCRF 124 can, in certain embodiments, push down service chaining policy (e.g., via vendor-specific attributes (VSAs)) for mapping user IP flows to service function chain types at a coarse level (e.g., Gold, Silver, Bronze) or at a finer level (e.g., IP flow ACLs, group of flows, application identifier, etc.). In various embodiments, the policy can be based on a combination of user subscription, network characteristics such as 3G or 4G, usage, combinations thereof or the like. In certain embodiments, PCRF 124 does not need to know the details of service function groupings or service function paths for operation of communication system 100.

In one or more embodiments, communication system 100 can provide several advantages for a virtualized services architecture. For a first advantage, communication system 100 can provide for the ability to support virtual groups of service functions where a service function can be a member of multiple virtual groups. In at least one embodiment, this can enable under-utilized service functions to be assigned to new virtual groups without an impact to existing subscribers. Many existing solutions only support the slice model or a model where each service chain uses a different set of virtual machines. As another advantage, communication system 100 can provide for the ability to load-balance without requiring data-plane load balancer components and any associated redundancy and state replication.

As still another advantage, communication system 100 can provide a solution in which multiple classifiers can consistently handle IP flows for a subscriber, which can result in less dependency on external load-balancing of classifiers by adjacent routers. As yet another advantage, if a particular classifier restarts or another classifier has to take over some of the load of a particular classifier, another classifier can simply get service function group information from the SGC such that no additional data replication is required. As yet another advantage, each direction of an IP flow for a subscriber can be handled by a different classifier. As yet another advantage, policy push can easily be supported from the SGC by the architecture provided by communication system 100. As yet another advantage, the PCRF can specify service chaining for subscriber IP flows without knowing details of service function paths or grouping through the use of one or more tables linking service policy and service function chain types.

Figure 2:
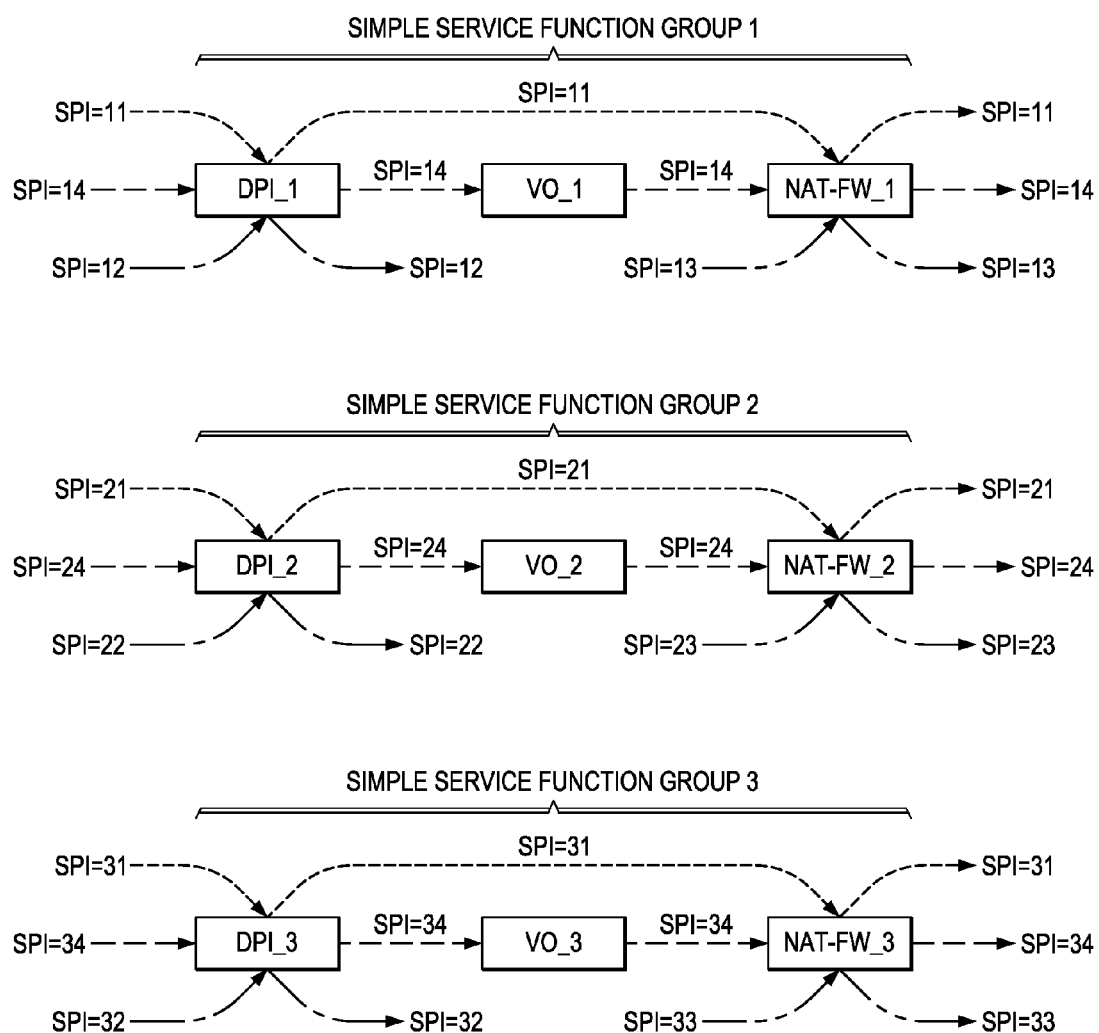
FIGS. 2-4 are simplified block diagrams illustrating various example service chains that can be established in accordance with various embodiments of the communication system.

Turning to FIG. 2, FIG. 2 is a simplified block diagram 200 illustrating example details associated with example service chains that can be provided using simple service function groups (e.g., slices) in accordance with one potential embodiment of communication system 100. FIG. 2 illustrates a first simple service function group, which can be identified using an integer group ID=1, a second simple service function group, which can be identified using an integer group ID=2, and a third simple service function group, which can be identified using an integer group ID=3. Service function group 1 can include a first DPI service function (DPI_1) (e.g., a first instance of a DPI service function), a first VO service function (VO_1) (e.g., a first instance of a VO service function) and a first NAT-FW service function (NAT-FW_1) (e.g., a first instance of a NAT-FW service function). Service function group 2 can include a second DPI service function (DPI_2) (e.g., a second instance of the DPI service function), a second VO service function (VO_2) (e.g., a second instance of the VO service function) and a second NAT-FW service function (NAT-FW_2) (e.g., a second instance of the NAT-FW service function). Service function group 3 can include a third DPI service function (DPI_3) (e.g., a third instance of the DPI service function), a third VO service function (VO_3) (e.g., a third instance of the VO service function) and a third NAT-FW service function (NAT-FW_3) (e.g., a third instance of the NAT-FW service function).

It should be understood that each group of service functions can be hosted by one or more servers (e.g., servers 140.1-140.N of FIG. 1) in accordance with various embodiments of communication system 100. In various embodiments, each service function group 1-3 can support a number of service function chain types. Consider for purposes of FIG. 2, for example, that a first service function chain type can include a DPI service function type followed by a NAT-FW service function type and can be identified using an integer chain type ID=1; a second service function chain type can include a DPI service function type and can be identified using an integer chain type ID=2; a third service chain type can include a NAT-FW service function type and can be identified using an integer chain type ID=3; and a fourth service chain type can include a DPI service function type followed by a VO service function type followed by a NAT-FW service function chain type and can be identified using an integer chain type ID=4. As noted, a service function chain type does not identify a specific service function path, but rather indicates a sequence of one or more types of service functions than can be chained together to provide certain service processing for subscriber IP flows.

In various embodiments embodiment, service chain orchestration manager 146 can be configured to instantiate service functions, group service functions into service function groups, create service paths for each service function chain type supported by each service function group and add service function groups to a service function group load balancing table. In at least one embodiment, each service function chain type identified by a corresponding chain type ID can be represented in a service function chain type table. One possible organizational example of a service function chain type table is illustrated below in TABLE 1. In at least one embodiment, an example organization for the service function chain type table can include the service function chain type ID for each service function chain type (e.g., chain type IDs 1-4) and a description of each respective service function sequence for each respective chain type.

TABLE 1

EXAMPLE SERVICE FUNCTION CHAIN TYPE TABLE ORGANIZATION

| SERVICE FUNCTION CHAIN TYPE ID | SERVICE FUNCTION SEQUENCE |
| --- | --- |
| 1 | DPI, NAT-FW |
| 2 | DPI |
| 3 | NAT-FW |
| 4 | DPI, VO, NAT-FW |

In at least one embodiment, each service function group identified by group 1-3 can be represented in a service function group load balancing table. One possible organizational example of a service function group load balancing table is illustrated below in TABLE 2. In at least one embodiment, an example organization for the service function group load balancing table can include the service function group ID for each service function group (e.g., groups 1-3) and a load balancing metric for each respective group. In various embodiments, load balancing metrics for each service function group can be acquired by service chain orchestration manager 146 and/or SGC 134 using, for example, subscriber IP flow assignments to service function groups provided by SGC 134, load monitoring of traffic flows across each server hosting service functions, combinations thereof or the like. In at least one embodiment, a load balancing metric for each SFG can be associated with a number reflecting availability and capacity for each SFG.

TABLE 2

EXAMPLE SERVICE FUNCTION GROUP LOAD BALANCING TABLE ORGANIZATION

| SERVICE FUNCTION GROUP ID | LOAD BALANCING METRIC |
| --- | --- |
| 1 | 37 |
| 2 | 0 |
| 3 | 100 |

As shown in the example organization of TABLE 2, service function group 3 may have a high load balancing metric of 100, which, in certain embodiments, can indicate that service function group 3 is fully available for new work (e.g., available for assignment of new subscriber IP flows by SGC 134). However, service function group 2 may have a low load balancing metric of 0, which, in certain embodiments, can indicate that service function group 2 is unavailable for new work (e.g. unavailable for assignment of new subscriber IP flows by SGC 134). In contrast, service function group 1 may have a load balancing metric of 37, which, in certain embodiments, can indicate that service function group 1 is available for new work, however, its availability is not has high as service function group 3. Accordingly, SGC 134 may load balance between service function group 1 and service function group 3 for new work. SGC can communicate the assignment of an IP session for a given subscriber (e.g., subscriber associated with UE 112) to one or more classifier(s) (e.g., classifier 138.1, 138.2) handling one or more IP flow(s) for the subscriber.

As discussed for various embodiments provided herein, policy information for a subscriber IP session can be acquired by SGC 134 via PCRF 124 and can also be communicated to the classifier(s). In various embodiments, policy information for the subscriber (e.g., coarse and/or fine policy information) and information associated with an IP flow for a particular IP session of the subscriber (e.g., source/destination (s/d) port, IP address, etc.) can be evaluated by a given classifier (e.g., classifier 138.1, classifier 138.2) in relation to a service policy table to determine a particular service function chain type to which the IP flow for the subscriber should be assigned.

One possible organizational example of a service policy table is illustrated below in TABLE 3. In at least one embodiment, an example organization for the service policy table can include the one or more coarse policy level(s) (e.g., GOLD, SILVER, BRONZE, etc.), one or more fine policy filters for each of the one or more coarse policy level(s) (e.g., s/d port, IP address, etc.) and an associated service function chain type for each corresponding coarse and/or corresponding fine policy level(s).

TABLE 3

EXAMPLE SERVICE POLICY TABLE ORGANIZATION

| POLICY | FILTER | SERVICE FUNCTION CHAIN TYPE |
|---|---|---|
| GOLD | S/D PORT = 80 | 4 |
|  | S/D PORT = 53 | 2 |
|  | IP ANY | 3 |
| SILVER | S/D PORT = 80 | 1 |
|  | IP ANY | 3 |

As shown in the example organization of TABLE 3 coarse policy levels can include GOLD and SILVER for different service function chain types. The GOLD policy level can further include fine policy level filters including: s/d port=80 (e.g., typically associated with TCP traffic), which can correspond to an assignment of a subscriber IP flow to service function chain type 4 (e.g., DPI, VO, NAT-FW); s/d port=53 (e.g., typically associated with UDP traffic), which can correspond to an assignment of a subscriber IP flow to service function chain type 2 (e.g., DPI); and an IP address of 'any', which can correspond to an assignment of a subscriber IP flow to service function chain type 3 (e.g., NAT-FW). In certain embodiments, the 'IP address any' filter can be used for cases in which the s/d port of an subscriber IP flow does not fall under the port 80 or port 53 filters. The SILVER policy level can further include fine policy level filters including: s/d port=80, which can correspond to an assignment of a subscriber IP flow to service function chain type=1 (e.g., DPI, NAT-FW); and an 'IP address any' filter, which can correspond to an assignment of a subscriber IP flow to service function chain type 3 (e.g., NAT-FW).

In various embodiments, a given classifier (e.g., classifier 138.1, 138.2) can determine a service function path for an IP flow of a given subscriber by mapping a service function group assignment for the IP session of the subscriber and a service function chain type assignment for the IP flow of the subscriber to an SPI and evaluating the SPI in relation to a service path table, which can map each of one or more SPIs supported by communication system 100 to a corresponding specific service function instance sequence for a particular service chain instance for a particular service function group. In various embodiments, the service path table for each classifier 138.1-138.2 can be provided by service chain orchestration manager 146. One possible organizational example of a service path table is illustrated below in TABLE 4. In at least one embodiment, an example organization for the service function chain type table can include one or more Service Path IDs (SPIs) and a corresponding sequence of specific service function instances for each SPI.

TABLE 4

EXAMPLE SERVICE PATH TABLE ORGANIZATION

| SERVICE PATH ID (SPI) | SEQUENCE OF SERVICE FUNCTIONS |
|---|---|
| 11 | DPI_1, NAT-FW_1 |
| 12 | DPI_1 |
| 13 | NAT-FW_1 |
| 14 | DPI_1, VO_1, NAT-FW_1 |
| 21 | DPI_2, NAT-FW_2 |
| 22 | DPI_2 |
| 23 | NAT-FW_2 |
| 24 | DPI_2, VO_2, NAT-FW_2 |
| 31 | DPI_3, NAT-FW_3 |
| 32 | DPI_3 |
| 33 | NAT-FW_3 |
| 34 | DPI_3, VO_3, NAT-FW_3 |

As shown in the example organization of TABLE 4, an SPI can, in at least one embodiment, be represented using two digits; a first digit can correspond to service function group ID assignment and a second digit can correspond to a service function chain type ID assignment for a particular IP flow of a particular IP session for a given subscriber. For example, SPI '11' can correspond to an assignment of service function group 1 for a particular IP session of a given subscriber and an assignment of service function chain type 1 for an IP flow of the subscriber; SPI '21', can correspond to an assignment of service function group 2 for a particular IP session of a given subscriber and an assignment of service function chain type 1 for an IP flow of the subscriber, and so on. Each SPI as shown in TABLE 4 is illustrated in FIG. 2 for each corresponding service function group 1-3 for each sequence of service functions.

It should be understood that the example SPIs shown in TABLE 4 are provided to illustrate one example organization of a service path table. As discussed above, the mapping of service function group assignment and service function chain type assignment to an SPI can be provided using a simple algorithm or variations thereof in one or more embodiments.

As shown in FIG. 2, each SPI can include one or more "hops" between one or more service function types, depending on service function chain type. For example, service function chain type 1 can include a first hop to DPI_1 and a second hop to NAT-FW_1 before exiting the service chain. As noted, in various embodiments, one or more forwarders (e.g., forwarders 142.1-142.N), depending on service chain configuration (e.g., simple or virtual) can route packets for subscriber IP flows according to the SPI contained in each packet for the various hop(s) for one or more service chains supported by vSG 130.

Figure 3:
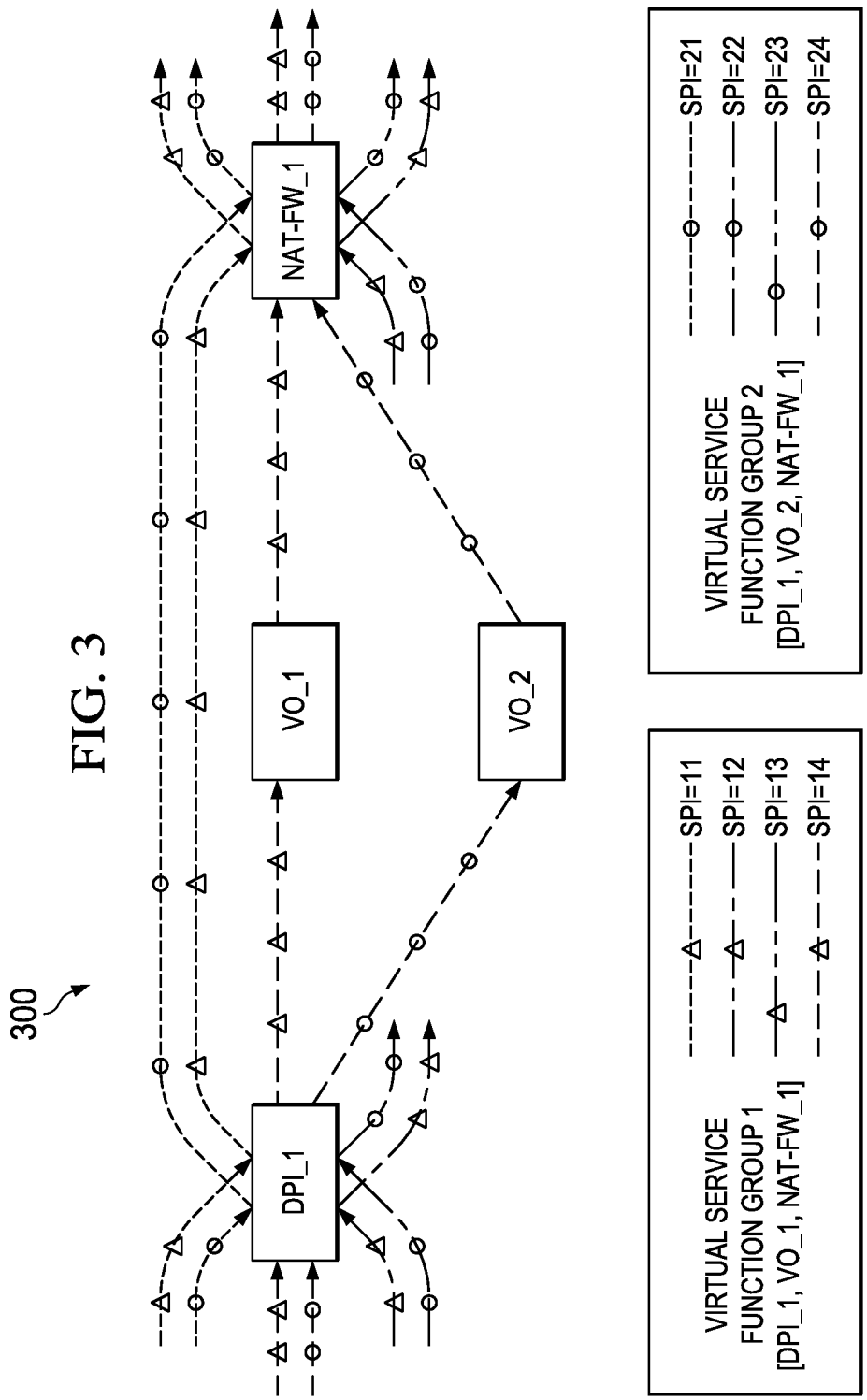

Turning to FIG. 3, FIG. 3 is a simplified block diagram 300 illustrating example details associated with example service chains that can be provided using virtual service function groups in accordance with one potential embodiment of communication system 100. As discussed herein, communication system 100 can facilitate the assignment of service functions for service chains using virtual service function groups, which can provide for flexible and elastic service chaining in a dynamic fashion for virtualized Services Gateway (vSG) 130 in a manner such that subscriber persistence to existing service functions/groups is maintained and impact to user experience is reduced. FIG. 3 includes a first virtual service function group, which can be identified using an integer group ID=1 and a second virtual service function group, which can be identified using an integer group ID=2. Virtual service function group 1 can include service function instances: DPI_1, VO_1 and NAT-FW_1. Virtual service function group 2 can include service function instances: DP_1, VO_2 and NAT-FW_1.

Each virtual service function group 1-2 supports four service function chain types: a first service chain type (e.g., chain type ID=1) include a DPI service function type and a NAT-FW service function type; a second service function chain type (e.g., chain type ID=2) can include a DPI service function type; a third service function chain type (e.g., chain type ID=3) can include a NAT-FW service function type; and a fourth service function chain type (e.g., chain type ID=4) can include a DPI service function type, a VO service function type and a NAT-FW service function type. A service function path for each SPI for each virtual service function group and each service function chain type is shown in FIG. 3 (e.g., hollow triangles for each SPI of each service function path associated with service function chain types for virtual service function group 1 and hollow circles for each SPI of each service function path associated with service function chain types for virtual service function group 2 of FIG. 3). For virtual service function group 1 shown in FIG. 3, SPI=11 can include DPI_1 and NAT-FW_1; SPI=12 can include DPI_1; SPI=13 can include NAT-FW_1; and SPI=14 can include DPI_1, VO_1 and NAT-FW_1. For virtual service function group 2 shown in FIG. 3, SPI=21 can include DPI_1 and NAT-FW_1; SPI=22 can include DPI_1; SPI=23 can include NAT-FW_1; and SPI=24 can include DPI_1, VO_2 and NAT-FW_1. It should be understood that the service function types and chain orders shown in FIG. 3 are provided for illustrative purposes only and are not meant to limit the broad scope of the teachings of the present disclosure. Any service function types can be chained together in any order within the scope of the teachings of the present disclosure.

As noted, virtual service function groups can facilitate flexible use of service function instances into multiple service function groups as compared to simple service function groups, such as those shown in FIG. 2, in which service function instances are limited to a single service function group. Accordingly, in various embodiments, service chain orchestration manager 146 can group one or more underutilized service function instances into multiple virtual service function groups, thereby providing for efficient management of resources for virtual Services Gateway (vSG) 130. For example, as shown in FIG. 3, service function instances DPI_1 and NAT-FW_1 may be underutilized for virtual service function group 1 and can therefore be grouped into a another virtual service function group, such as virtual service function group 2 including VO_2.

Although not described for FIG. 3, it should be understood that various tables, such as, for example a service function chain type table, a service function group load balancing table, a service policy table and a service path table can be provisioned for virtual service function groups via service chain orchestration manager 146 in a manner similar to that as described for simple service function groups.

Figure 4:
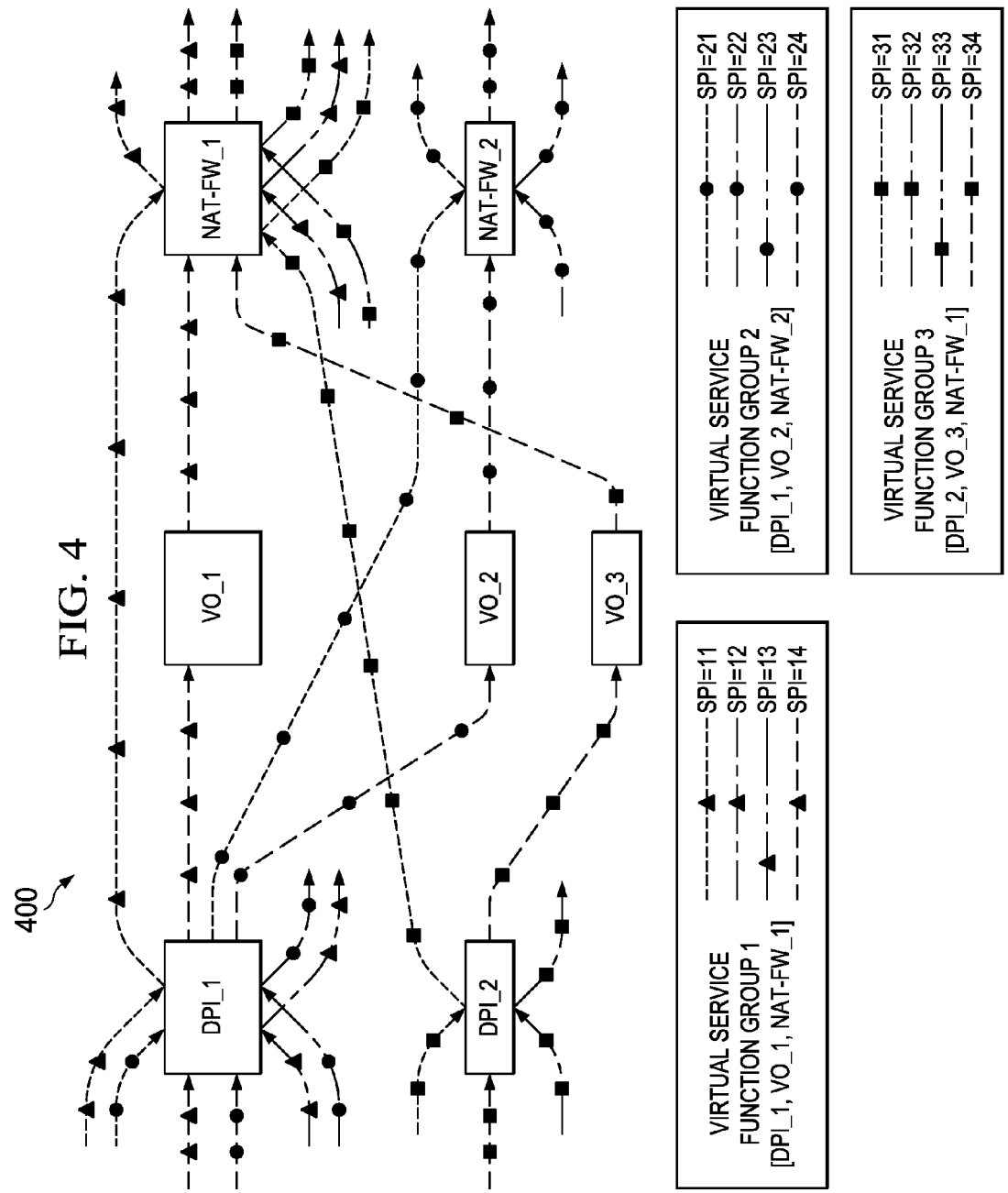

Turning to FIG. 4, FIG. 4 is a simplified block diagram 400 illustrating other example details associated with other example service chains that can be provided using virtual service function groups in accordance with one potential embodiment of communication system 100. FIG. 4 includes a first virtual service function group, which can be identified using an integer group ID=1, a second virtual service function group, which can be identified using an integer group ID=2, and a third virtual service function group, which can be identified using an integer group ID=3. For FIG. 4, virtual service function group 1 can include service function instances: DPI_1, VO_1 and NAT-FW_1; virtual service function group 2 can include service function instances: DP_1, VO_2 and NAT-FW_2; and virtual service function group 3 can include service function instances: DPI_2, VO_3 and NAT-FW_1.

Each virtual service function group 1-3 shown in FIG. 4 can support four service function chain types: a first service chain type (e.g., chain type ID=1) include a DPI service function type and a NAT-FW service function type; a second service function chain type (e.g., chain type ID=2) can include a DPI service function type; a third service function chain type (e.g., chain type ID=3) can include a NAT-FW service function type; and a fourth service function chain type (e.g., chain type ID=4) can include a DPI service function type, a VO service function type and a NAT-FW service function type. A service function path SPI for each virtual service function group and each service function chain type is shown in FIG. 4 (e.g., filled triangles for each SPI of each service function path associated with service function chain types for virtual service function group 1 of FIG. 4, filled circles for each SPI of each service function path associated with service function chain types for virtual service function group 2 of FIG. 4, and filled squares for each service function path associated with service function chain types for virtual service function group 3 of FIG. 4). For virtual service function group 1 shown in FIG. 4, SPI=11 can include DPI_1 and NAT-FW_1; SPI=12 can include DPI_1; SPI=13 can include NAT-FW_1; and SPI=14 can include DPI_1, VO_1 and NAT-FW_1. For virtual service function group 2 shown in FIG. 4, SPI=21 can include DPI_1 and NAT-FW_2; SPI=22 can include DPI_1; SPI=23 can include NAT-FW_2; and SPI=24 can include DPI_1, VO_2 and NAT-FW_2. For virtual service function group 3 shown in FIG. 4, SPI=31 can include DPI_2 and NAT-FW_1; SPI=32 can include DPI_2; SPI=33 can include NAT-FW_1; and SPI=34 can include DPI_2, VO_3 and NAT-FW_1. It should be understood that the service function types and chain orders shown in FIG. 4 are provided for illustrative purposes only and are not meant to limit the broad scope of the teachings of the present disclosure. Any service function types can be chained together in any order within the scope of the teachings of the present disclosure.

Accordingly, as shown in FIGS. 2-4, communication system 100 can facilitate the assignment of service functions to a variety of different types of service function groups, including simple service function groups, virtual service function groups and variations thereof for virtualized services architectures.

Turning to FIG. 5, FIG. 5 is a simplified flow diagram illustrating example operations 500 associated with management of service function groups in accordance with one potential embodiment of communication system 100. In various embodiments operations 500 can be performed via service chain orchestration manager 146 and one or more servers 140.1-140.N for vSG 130. In various embodiments, the operations can begin at start of day, power-up, etc. for a server on which service chain orchestration manager 146 may operate. Accordingly, at 502, the operations can include instantiating service functions for one or more hosts (e.g., servers 140.1-140.N) by service chain orchestration manager 146. In various embodiments, the service function to be instantiated can be configured for service chain orchestration manager 146 by a network operator and/or service provider. At 504, the operations can include grouping the service functions into one or more service function groups. In at least one embodiment, service chain orchestration manager 146 can assign a corresponding integer ID to each service function group, can associate with a corresponding load balancing metric to each service function group, and can populate a service function group load balancing table, which can be maintained in suitable storage for service chain orchestration manager 146, with the group ID and load balancing metric for each service function group.

At 506, the operations can include establishing a service function path for each of one or more service function chain types that can be associated with each of the service function groups. In at least one embodiment, establishing a service function path can include determining hops (e.g., input/output nodes, addresses, etc.) between service functions of each service function chain type for each service function group. In at least one embodiment, service chain orchestration manager 146 can maintain, in suitable storage, a service function chain type table, which can identify each of one or more service function chain types that can be associated with service function groups. Each service function chain type can be associated with an ordered sequence of one or more of service functions. At 508, the operations can include setting a service path identifier for each service function path. In various embodiments, the service path identifiers can be set according to an algorithm relating service function chain type for each service function group.

At 510, the operations can include maintaining loading information for each of the service function groups. In various embodiments, maintaining loading information can include maintaining load balancing metrics for each service function group in a service function group load balancing table. In at least one embodiment, the service function group load balancing table can be updated with load balancing metrics for any additional service function groups, which may be created/updated accordingly by service chain orchestration module 146. Accordingly, the architecture of communication system 100 can facilitate the management of service function groups to satisfy the aforementioned requirements.

Figure 6A:
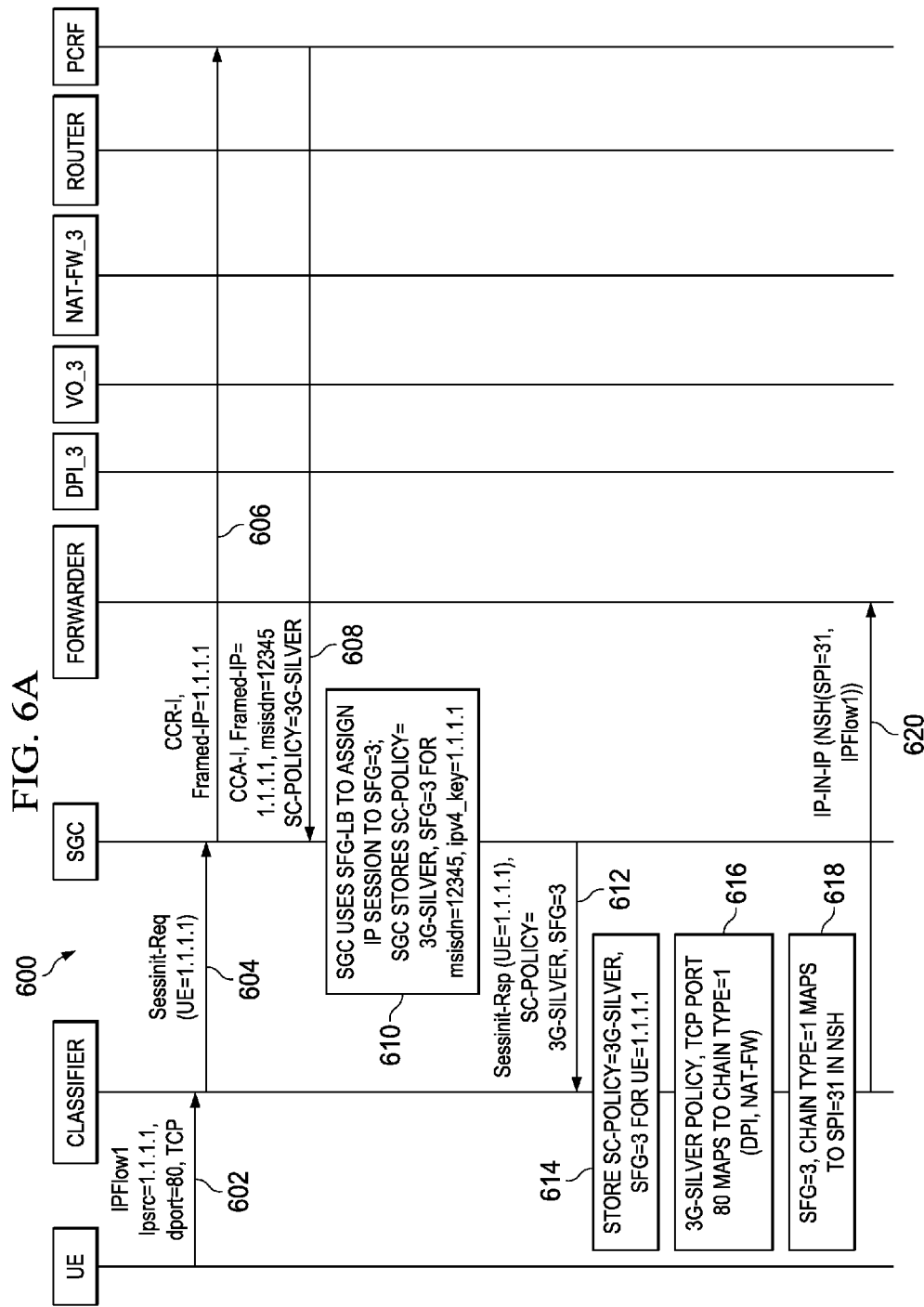

Turning to FIGS. 6A-6B, FIGS. 6A-6B are simplified interaction diagrams illustrating interactions 600 for an example subscriber IP flow in accordance with one embodiment of the communication system. For purposes of the example interactions 600 illustrated in FIGS. 6A-6B, a service function chain type table, such as that shown in TABLE 1, a service function group load balancing (SFG-LB) table, such as that shown in TABLE 2, a policy table, such as that shown in TABLE 3, and a service path table, such as that shown in TABLE 4 are assumed to have been configured and organized in the manner illustrated in this table including the values and information contained therein. However, it should be noted that the example interactions illustrated in FIGS. 6A-6B can be performed in a similar manner for both simple and virtual service function groups.

In various embodiments, interactions 600 can be performed via a given UE (e.g., UE 112), one or more gateway(s) 122 and PCRF 124 within mobile core network 120, routing devices 132.1-132.2, SGC 134, a given switch (e.g., 136.1, 136.2) including a given classifier (e.g., 138.1, 138.2), one or more respective servers (e.g., servers 140.1-140.N) including one or more respective forwarders (e.g., forwarders 142.1-142.N) and one or more service functions (e.g., any combination of service functions (144.1.1-144.1.M through 144.N.1-144.N.M), depending on configuration.

At any time, UE 112 can initiate a first IP flow such as, for example, an IP flow associated voice services, data services, video services, multimedia services, etc. for a particular IP session towards a packet data network, such as, for example IP core 150. Accordingly, at 602 a first IP flow (IPFlow1) for UE 112 can be communicated from UE 112 to a given classifier for a given switch, say, for example classifier 138.1 for switch 136.1. Although not shown in FIGS. 6A-6B, it should be understood that IPFlow1 may traverse one or more gateway(s) 122 via mobile core network 120 and routing device 132.1 before reaching the classifier. In various embodiments, various IP flow information can be associated and/or included with IPFlow1 such as, for example, a source IP address (ipsrc), a destination port (dport) and an associated protocol for the flow. As shown in FIG. 6A, IPFlow1 is a TCP flow having ipsrc=1.1.1.1 for the IP session for UE 112 and a dport=80.

At 604, classifier 138.1 can communicate a session initialization request (sessinit-req) to SGC 134 for UE 112 (e.g., UE=1.1.1.1) to request a service function group assignment for the IP session of the subscriber and to request a service chaining (SC) policy. Based on the session initialization request, SGC can communicate an initial Credit Control Request (CCR-I) to PCRF at 606 including a framed IP address equal to 1.1.1.1 for UE 112. In various embodiments, PCRF 124 can look-up the subscriber policy the subscriber associated with the UE 112 via cached SC policy information for the subscriber and/or via a Home Location Register (HLR) or other similar subscriber directory service. Upon determining SC policy information for the subscriber associated with UE 112, PCRF 124 can communicate an initial Credit Control Answer (CCA-I) to SGC including the service chaining (SC) policy for the subscriber (e.g., SC-policy=3G-SILVER) and the MSISDN for the subscriber (e.g., msisdn=12345) per 3GPP standards.

At 610, SGC 134 may use the SFG-LB table (e.g., TABLE 2) to assign the IP session for the subscriber to service function group (SFG) 3. For example, TABLE 2 illustrates that SFG=3 has a load balancing metric of 100, which can indicate that the SFG=3 is fully available for new work. In comparison to SFG=2, which has a load balancing metric of 0, and SFG=1, which has a load balancing metric of 37, SGC 134 can determine that SFG=3 is the best choice for handling one or more IP flows for the IP session for the subscriber. At 610, SGC 134 can also store the SC policy (e.g., 3G-SILVER) and the service function group assignment (e.g., SFG=3) for the subscriber (e.g., msisdn=12345) and may also set the IPv4 key for the subscriber to 1.1.1.1. (e.g., ipv4_key=1.1.1.1).

At 612, SGC 134 can communicate a session initialization response (Sessinit-Rsp) for UE 112 (e.g., UE=1.1.1.1) along with the service chaining (SC) policy (e.g., 3G-SILVER) and service function group assignment (e.g., SFG=3) to classifier 138.1. At 614, classifier 138.1 can store the SC policy and service function group assignment in association with the IP address of UE 112. At 616, classifier 138.1 can determine a service function chain type to which to assign IPFlow1 for the subscriber using a service policy table that includes a mapping of one or more policy levels and/or filters to one or more corresponding service function chain types. In at least one embodiment, based on an evaluation of the service policy table (e.g., example TABLE 3, as illustrated above) classifier 138.1 can determine that SC policy level SILVER for TCP dport=80 maps to service function chain type=1 (e.g., including an instance, DPI_3, of a DPI service function followed by an instance, NAT-FW_3, of a NAT-FW service function). However, as noted herein, determination of service function chain type does not, in itself, indicate the service function path for the IP flow for a subscriber. Rather, classifier 138.1 can map the SFG assignment and service function chain type mapping for the IP flow to a corresponding service path identifier (SPI). Accordingly, at 618, classifier 138.1 can map the SFG=3 assignment and the service function chain type=1 to a corresponding SPI=31, which can be carried in a Network Services Header (NSH) for IP packets of IPFlow1.

At 620, classifier 138.1 can communicate one or more IP-in-IP encapsulated packets having NSH carrying SPI=31 for IPFlow1 to a corresponding server/forwarder handling IP flows for SFG=3. For purposes of the present interactions, assume that server 140.2/forwarder 142.2 are handling IP flows for SFG=3 and further assume that server 140.2/forwarder 142.2 has received a service path table, such as the one shown above in TABLE 4. Upon receiving the one or more packets for IPFlow1 including SPI=31, forwarder 142.2 can evaluate the service path table to determine at 622 a service function path for IPFlow1, which can include a first hop for service function chain type=1 to the DPI_3 service function and a second hop to the NAT-FW_3 service function. At 624, forwarder 142.2 can begin forwarding the one or more packets for IPFlow1 to DPI_3, which, in turn, can perform corresponding DPI service processing on the packets at 626 and can return the packets to forwarder 142.2 at 628. At 630, forwarder 142 can determine that IPFlow1 is now to be forwarded to the second hop, NAT-FW_3, of service function chain type=1. At 632, forwarder 142.2 can begin forwarding the one or more packets for IPFlow1 to NAT-FW_3, which, in turn, can perform corresponding NAT-FW service processing on the packets at 634 and can return the packets to forwarder 142.2 at 636.

At 638, forwarder 142.2 can determine that the end of the service chain has been reached for the one or more packets for IPFlow1, and at 640 can forward the one or more packets for IPFlow1 towards a PDN facing routing device, such as, for example, routing device 132.2, which can forward the packets toward a PDN, such as, for example IP core network 150. In various embodiments, one or more return packets for the subscriber resulting from IPFlow1 can be forwarded through a same or different service chain according to a policy for such return packets, which can be evaluated by classifier 138.1 upon receipt of such return packets. Accordingly, as shown in FIGS. 6A-6B, the architecture of communication system 100 can facilitate the assignment of service function groups, service function chain types and service functions for IP flows of a subscriber. As discussed for various embodiments, the architecture of communication system 100 can also provide for handling subsequent IP flows for a particular subscriber IP session in a more streamlined manner than for a first IP flow for the subscriber since the classifier(s) handling IP flow(s) for the subscriber can cache policy information and service function group assignment for the subscriber as received from SGC 134 for an initial flow (e.g., IPFlow1) for the subscriber. Various example interactions for handling subsequent subscriber IP flows, such as, for example a second flow (IPFlow2) for the subscriber associated with UE 112 as discussed for FIGS. 6A-6B are provided below in FIG. 7.

Turning to FIG. 7, FIG. 7 is a simplified interaction diagram illustrating example interactions 700 associated with a second IP flow (IPFlow2) for the subscriber of FIGS. 6A-6B in accordance with one potential embodiment of communication system 100. At 702, UE 112 can communicate IPFlow2 for TCP dport=443 for IP session IP source address 1.1.1.1 to classifier 138.1 for switch 136.1. At 704, classifier 138.1, having previously stored the service chaining (SC) policy (e.g., 3G-SILVER) and service function group assignment (e.g., SFG=3) for UE 112, can evaluate the service policy table (e.g., example TABLE 3) to determine that dport=443 is not a filter level within the table, thus classifier 138.1 can map IPFlow2 under the 'ip any' filter (e.g., IPsrc=1.1.1.1) to corresponding service function chain type=3 (e.g., including an instance, NAT-FW_3, of a NAT-FW service function). At 706, classifier 138.1 can map the SFG=3 assignment and the service function chain type=3 to corresponding SPI=33, which can be carried in a Network Services Header (NSH) for IP packets of IPFlow2.

At 708, classifier 138.1 can communicate one or more IP-in-IP encapsulated packets having NSH carrying SPI=33 for IPFlow2 to a corresponding server 140.2/forwarder 142.2 handling IP flows for SFG=3. Upon receiving the one or more packets for IPFlow2 including SPI=33, forwarder 142.2 can evaluate the service path table to determine at 710 a first hop for service function chain type=3, which corresponds to the NAT-FW_3 service function. At 712, forwarder 142.2 can begin forwarding the one or more packets for IPFlow2 to NAT-FW_3, which, in turn, can perform corresponding NAT-FW service processing on the packets at 714 and can return the packets to forwarder 142.2 at 716. At 718, forwarder 142.2 can determine, based on the service path table, that there are no more service chain hops for the one or more packets for IPFlow2, and at 720 can forward the one or more packets for IPFlow2 towards routing device 132.2, which can forward the packets for IPFlow2 towards IP core network 150.

Accordingly, as shown in FIG. 7, the architecture of communication system 100 can facilitate the handling of subsequent IP flows for a particular IP session of a subscriber using fewer interactions than for an initial IP flow for the subscriber by exploiting cached service function group assignment information and policy information for the subscriber in a given classifier handling IP flows for the subscriber.

Turning to FIG. 8, FIG. 8 is a simplified flow diagram illustrating example operations 800 that can be associated with handling a first subscriber flow in virtualized Services Gateway (vSG) 130 in accordance with one potential embodiment of communication system 100. In various embodiments, operations 800 can be performed via one or more UE (e.g., UE 112), one or more gateway(s) 122 and PCRF 124 within mobile core network 120, routing devices 132.1-132.2, SGC 134, one or more respective switches (e.g., 136.1, 136.2), each including a respective classifier (e.g., 138.1, 138.2, respectively), one or more respective servers (e.g., servers 140.1-140.N) including one or more respective forwarders (e.g., forwarders 142.1-142.N) and one or more service functions (e.g., any combination of service functions (144.1.1-144.1.M through 144.N.1-144.N.M).

At any time, UE 112 can initiate one or more IP flows a particular IP session towards an APN, PDN, etc. such as, for example IP core 150. Accordingly, at 802, the operations can include receiving a first IP flow for an IP session for a given subscriber (e.g., subscriber associated with UE 112) at a given switch including a given classifier. At 804a, the operations can include selecting, via SGC 134, a service function group from a plurality of service function groups to perform one or more services for one or more IP flow(s) of the IP session of the subscriber based, at least in part, on service function group loading information for the plurality of service function groups (e.g., via an evaluation a service function group load balancing table as maintained by service chain orchestration manager 146). At 804b, the operations can include acquiring by SGC 134, policy information (e.g., a service policy) for the subscriber from PCRF 124. In one or more embodiments, operations 804a and 804b can be performed concurrent with each other or in a predetermined order.

At 806, the operations can include SGC 134 assigning the IP session of the subscriber to the selected service function group. In various embodiments, the assigning can provide that all IP flows for the subscriber are handled by the same instance of a particular service function in order to maintain subscriber persistence to the service function. In various embodiments, as shown at 808, SGC 134 can store (e.g., within suitable storage) an association of the policy information and the service function group assignment in relation to one or more keys and/or identity of the subscriber (e.g., IMSI, MSISDN, UE IP session IP address, etc.). At 810, the operations can include communicating the service function group assignment and policy information for the subscriber to the classifier associated with the switch that received the first IP flow for the subscriber. At 812, the classifier can store (e.g., within suitable storage) an association of the policy information and the service function group assignment in relation to one or more keys and/or identity of the subscriber (e.g., IMSI, MSISDN, UE IP address, etc.).

At 814, the operations can include determining by the classifier a first service function chain type, which may perform service processing on the first IP flow, to assign for the first IP flow. In various embodiments, the determination can be performed by evaluating a service policy table (e.g., provided via service chain orchestration manager 146) in relation to the policy information for the subscriber and IP flow information for the first IP flow including one or more of: source or destination port information associated with the first IP flow, and/or an IP address associated with the subscriber, combinations thereof or the like. At 816, the operations can include mapping the service function group assignment and the service function chain type assignment to a service path identifier. In one or more embodiments, the service path identifier (SPI) can be carried in a Network Services Header (NSH), as defined by IETF, for the first IP flow.

At 818, the operations can include communicating the first IP flow including the service path identifier to a given server hosting the service function group assigned to the IP session for the subscriber; the server can include a forwarder to forward the first IP flow across a given service function path for the assigned service function chain type. As described herein, virtual service function groups can be hosted across one or more servers. Accordingly, in at least one embodiments, the operations at 818 can include forwarding the first IP flow to a server hosting a first service function for a given service function group. At 820, the operations can include determining a service function path for the first IP flow based, at least in part on an evaluation of the service path identifier in relation to a preconfigured service path table that may be provided to the server/forwarder via service chain orchestration manager 146. At 822, the operations can include forwarding the first IP flow for the IP session for the subscriber across the assigned service function chain type for the service function group and the operations may end. In at least one embodiment, forwarding an IP flow for a subscriber can include forwarding the flow across one or more servers/forwarders, depending on service function group configuration.

FIG. 9 is a simplified flow diagram illustrating example operations 900 that can be associated with handling one or more subsequent subscriber flows following the example operations of FIG. 8 in accordance with one potential embodiment of communication system 100. At any time, one or more subsequent IP flows for the subscriber can be received via the switch/classifier, which handled the first IP flow for the subscriber. Accordingly, the operations can begin at 902 in which a second IP flow can be received for the subscriber at the classifier. [Note it is assumed for operations 900 that the second flow is received at the same switch/classifier as the first flow such that SGC 134 need not be queried for the SFG assignment of the IP session of the subscriber. If however, the second flow were received at a different switch/classifier, the classifier could query SGC for the SFG assignment of the IP session for the subscriber, in which case SGC 134 could merely query its cached information for the subscriber to determine the assignment for the classifier.]

At 904, the operations can include determining at the classifier a second service function chain type to assign for the second IP flow. In various embodiments, the determination can be performed by evaluating a service policy table (e.g., provided via service chain orchestration manager 146) in relation to the policy information for the subscriber and IP flow information for the second IP flow including one or more of: source or destination port information associated with the first IP flow, and/or an IP address associated with the subscriber, combinations thereof or the like. At 906, the operations can include mapping the service function group assignment and the service function chain type assignment to a service path identifier for the second IP flow. In one or more embodiments, the service path identifier (SPI) can be carried in a Network Services Header (NSH), as defined by IETF, for the second IP flow.

At 908, the operations can include communicating the second IP flow including the service path identifier to a given server hosting the service function group assigned to the IP session for the subscriber; the server can include the forwarder to forward the second IP flow across a given service function path for the assigned service function chain type. As described herein, virtual service function groups can be hosted across one or more servers. Accordingly, in at least one embodiments, the operations at 908 can include forwarding the first IP flow to a server hosting a first service function for a given service function group. At 910, the operations can include determining a service function path for the second IP flow based, at least in part on an evaluation of the service path identifier in relation to a preconfigured service path table that may be provided to the server/forwarder via service chain orchestration manager 146. At 912, the operations can include forwarding the second IP flow for the IP session for the subscriber across the assigned service function chain type for the service function group and the operations may end. In at least one embodiment, forwarding an IP flow for a subscriber can include forwarding the flow across one or more servers/forwarders, depending on service function group configuration.

Figure 10:
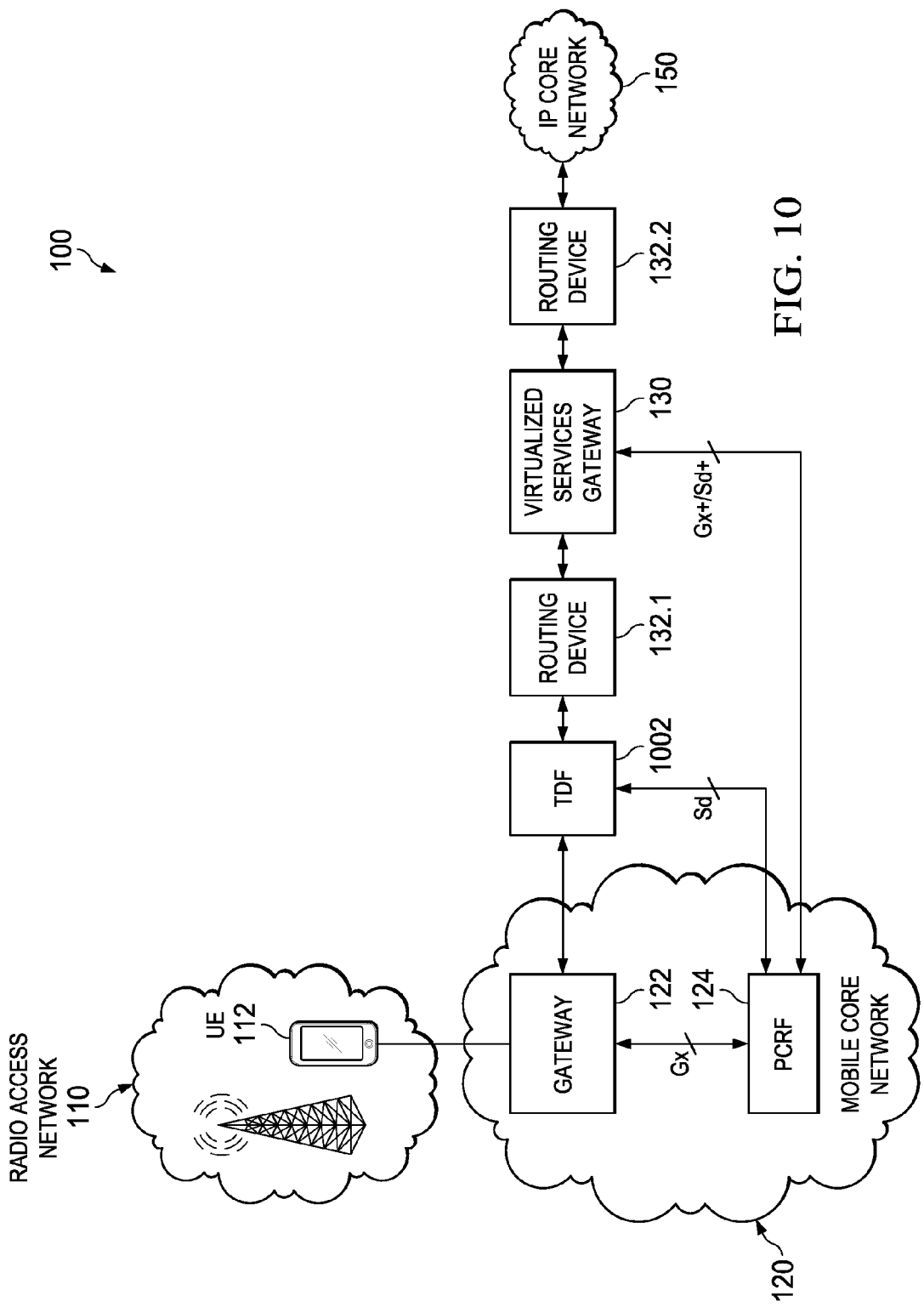
FIG. 10 is a simplified block diagram illustrating other example details associated with one potential embodiment of the communication system.

Turning to FIG. 10, FIG. 10 is a simplified block diagram illustrating other example details associated with one potential embodiment of communication system 100. FIG. 10 includes RAN 110, UE 112, mobile core network 120, gateway 122 (e.g., a PGW), PCRF 124, a traffic detection function (TDF) 1002, routing device 132.1, virtualized Services Gateway (vSG) 130, routing device 132.2 and IP core network 150. In various embodiments, TDF 1002, as defined in 3GPP Technical Specification (TS) 32.251 and TS 29.212, can be included in mobile core network 120 to provide for application-based charging for UE 112. As shown in FIG. 10, TDF 1002 can have a respective logical connection with gateway 122 and routing device 132.1 and can have a logical interface with PCRF 124 via a DIAMETER-based Sd interface. In various embodiments, TDF 1002 can provide services for user equipment service data flows (SDFs), such as, for example, gating, redirection, bandwidth limitations, combinations thereof or the like as described in 3GPP TS 29.212. Accordingly, one or more service chain types (e.g., simple and/or virtual) can be configured to perform service processing for SDFs of one or more UE (e.g., UE 112) in accordance with various embodiments of communication system 100. In various embodiments, SGC 134 can push policy (e.g., via a message such as a Sd TSR) to service functions for a group to which a subscriber is assigned in order to provide policy push support for communication system 100.

Turning to FIGS. 11A-11F, FIGS. 11A-11F are simplified block diagrams illustrating example details of various elements that can be associated with communication system 100 in accordance with one or more embodiments.

Figure 11A:
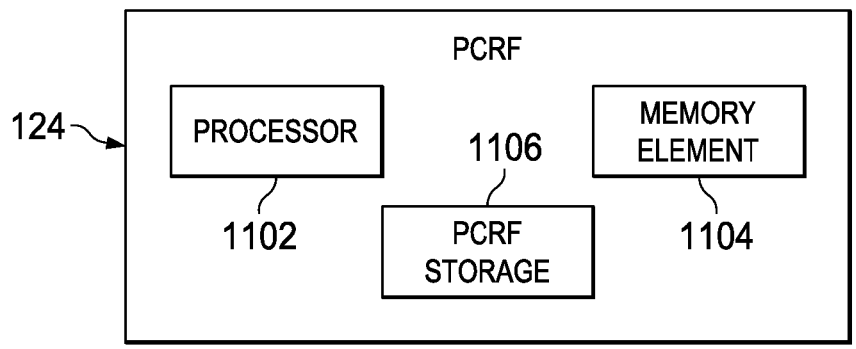
FIGS. 11A-11F are a simplified block diagrams illustrating additional details associated with various potential embodiments of the communication system.

Referring to FIG. 11A, FIG. 11A is a simplified block diagram illustrating example details that can be associated with PCRF 124 in accordance with one embodiment of communication system 100. FIG. 11A includes PCRF 124, which, in one or more embodiments, can include at least one processor 1102, at least one memory element 1104 and a PCRF storage 1106. In at least one embodiment, processor 1102 is a hardware processor configured to execute various tasks, operations and/or functions of PCRF 124 as described herein and memory element 1104 is configured to store data associated with PCRF 124. In at least one embodiment, PCRF storage 1106 can be configured to store information associated with various operations as described herein. In various embodiments, PCRF storage 1106 can be configured to store information associated with one or more of: subscriber-based policy and/or charging information (e.g., for the subscriber associated with UE 112) and/or application-based policy and/or charging information (e.g., for TDF SFs), combinations thereof or the like.

Figure 11B:
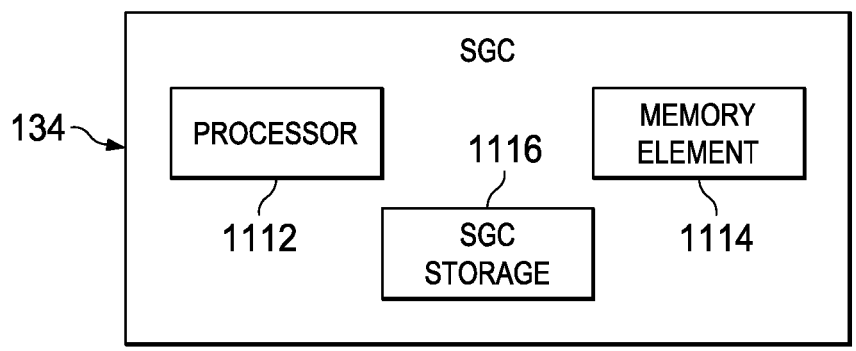

Referring to FIG. 11B, FIG. 11B is a simplified block diagram illustrating example details that can be associated with SGC 134 in accordance with one embodiment of communication system 100. FIG. 11B includes SGC 134, which, in one or more embodiments, can include at least one processor 1112, at least one memory element 1114 and a SGC storage 1116. In at least one embodiment, processor 1112 is a hardware processor configured to execute various tasks, operations and/or functions of SGC 134 as described herein and memory element 1114 is configured to store data associated with SGC 134. In at least one embodiment, SGC storage 1116 can be configured to store information associated with various operations as described herein. In various embodiments, SGC storage 1116 can be configured to store information associated with one or more of: a service function group load balancing table, maintaining affinity of subscriber IP session service function group assignment, maintaining information associated with which of one or more classifiers (e.g., classifiers 138.1-138.2) are handling subscriber IP flows, combinations thereof or the like.

Figure 11C:
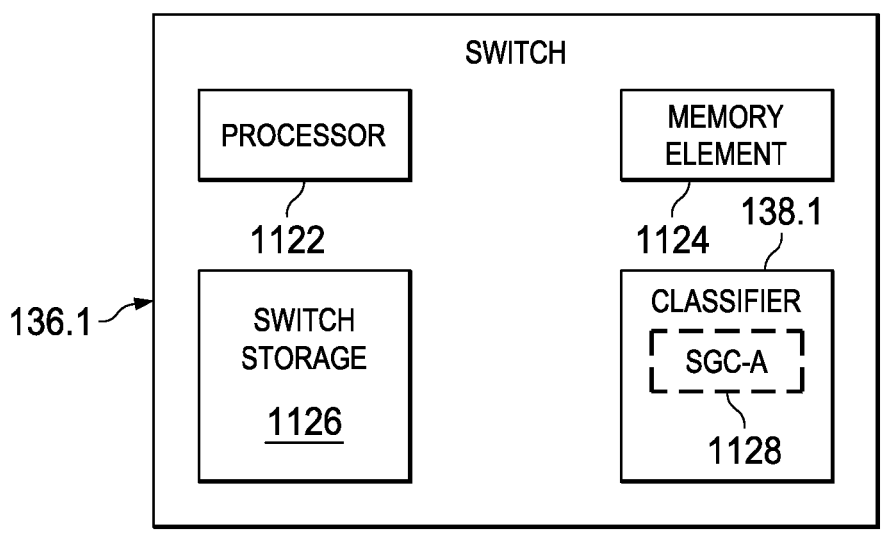

Referring to FIG. 11C, FIG. 11C is a simplified block diagram illustrating example details that can be associated with a given switch 136.1 in accordance with one embodiment of communication system 100. Note, although FIG. 11C is described with reference to switch 136.1, it should be understood that the example details described for switch 136.1 can be implemented for any switch (e.g., switch 136.2) that may be deployed in communication system 100. FIG. 11C includes switch 136.1, which, in one or more embodiments, can include classifier 138.1, at least one processor 1122, at least one memory element 1124 and a switch storage 1126. In at least one embodiment, processor 1122 is a hardware processor configured to execute various tasks, operations and/or functions of switch 136.1 and/or classifier 138.1 as described herein and memory element 1124 is configured to store data associated with switch 136.1 and/or classifier 138.1. In at least one embodiment, switch storage 1126 can be configured to store information associated with various operations as described herein. In various embodiments, switch storage 1126 can be configured to store information associated with one or more of: a service function chain type table, a service chain policy table, a service path table, determining service function chain type assignment, maintaining affinity of subscriber IP session service function group assignment and service function chain type assignment for subscriber IP flow(s), maintaining/updating load balancing metrics for service function groups, mapping and/or determining service path identifier(s) for subscriber IP flow(s), combinations thereof or the like. In at least one embodiment, classifier 138.1 can include a Services Gateway Controller Agent (SGC-A) 1128, which may store subscriber information and interface to both the SGC and to the packet-switching functionality for each classifier 138.1.

Figure 11D:
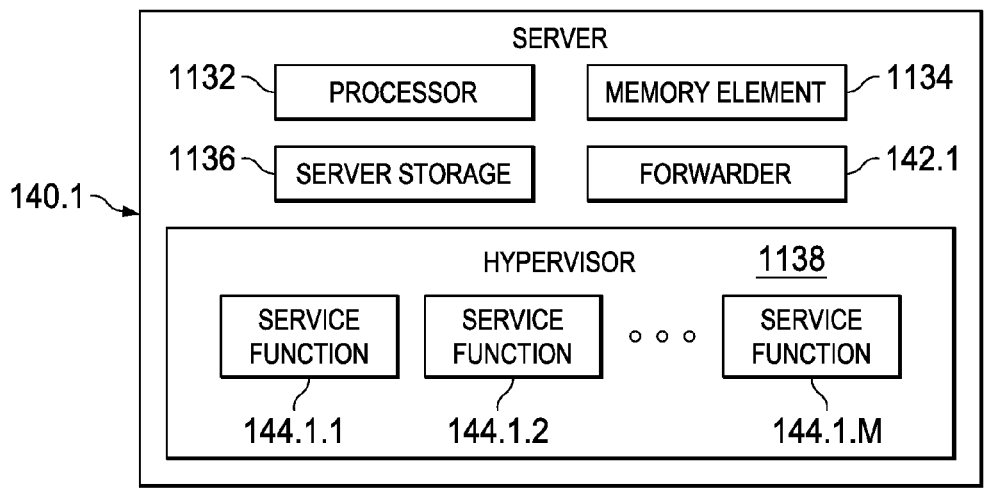

Referring to FIG. 11D, FIG. 11D is a simplified block diagram illustrating example details that can be associated with a given server 140.1 in accordance with one embodiment of communication system 100. Note, although FIG. 11D is described with reference to server 140.1, it should be understood that the example details described for server 140.1 in FIG. 11D can be implemented for any server (e.g., servers 140.2-140.N) that may be deployed in communication system 100. FIG. 11D includes server 140.1, which, in one or more embodiments, can include forwarder 142.1, at least one processor 1132, at least one memory element 1134, a server storage 1136, and a hypervisor 1138 for a hypervisor-based virtualization architecture that can be implemented for server 140.1. As shown in FIG. 11D, hypervisor can include one or more service functions 144.1.1-144.1.M instantiated therein as VMs. In various embodiments, any number of service functions 144.1.1-144.1.M can be instantiated for server 140.1 by service chain orchestration manager 146, as described herein. In at least one embodiment, processor 1132 is a hardware processor configured to execute various tasks, operations and/or functions of server 140.1 and/or forwarder 142.1 as described herein and memory element 1134 is configured to store data associated with server 140.1 and/or forwarder 142.1. In at least one embodiment, server storage 1136 can be configured to store information associated with various operations as described herein. In various embodiments, server storage 1136 can be configured to store information associated with one or more of: a service function chain type table, a service path table, service function type instantiation information, service function group instantiation information (e.g., for simple and/or virtual service function groups) determining a service function path for a given service function type assignment and service function group assignment for a subscriber IP flow, forwarding subscriber IP flow(s) between hops of service function paths, combinations thereof or the like.

Figure 11E:
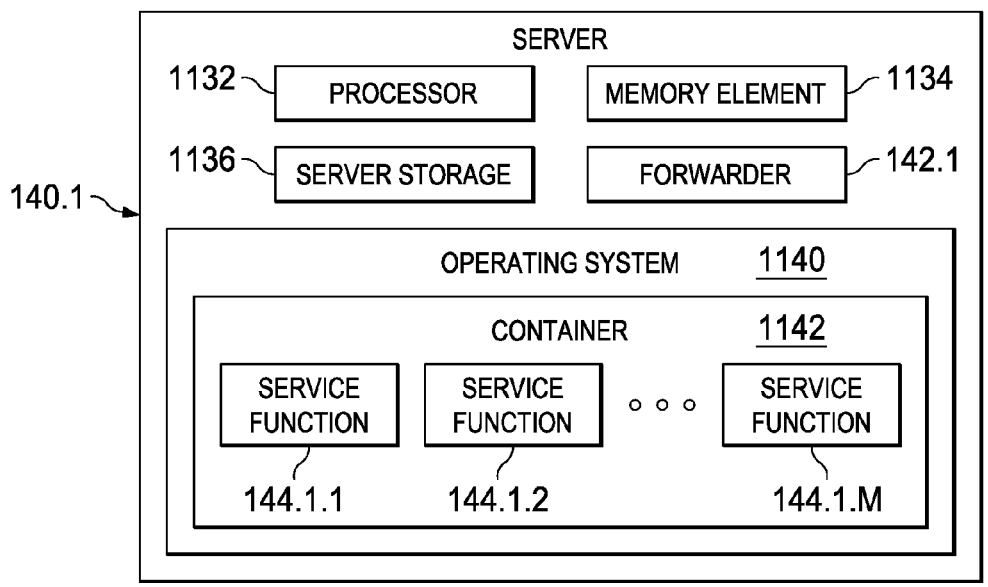

Referring to FIG. 11E, FIG. 11E is a simplified block diagram illustrating other example details that can be associated with a given server 140.1 in accordance with one embodiment of communication system 100. In particular, FIG. 11E illustrates service functions 144.1.1-144.1.M virtualized in container-based architecture for server 140.1. Note, although FIG. 11E is described with reference to server 140.1, it should be understood that the example details described for server 140.1 in FIG. 11E can be implemented for any server (e.g., servers 140.2-140.N) that may be deployed in communication system 100. As shown in FIG. 11E, server 140.1 can, in one or more embodiments, include forwarder 142.1, processor 1132, memory element 1134, server storage 1136, and service functions 144.1.1-144.1.M virtualized in a container 1142 of an operating system 1140 for server 140.1. Note it should be understood that server 140.1 as shown in FIG. 11D can also include an operating system, though such is not shown in FIG. 11D in order to illustrate other example details of the server. Accordingly, the system and method provided by communication system 100 can provide for different virtualization architectures in order to facilitate assignment of service functions for service chains in a network environment using both hypervisor-based virtualizations (as shown in FIG. 11D) and/or container-based virtualizations (as shown in FIG. 11E).

Figure 11F:
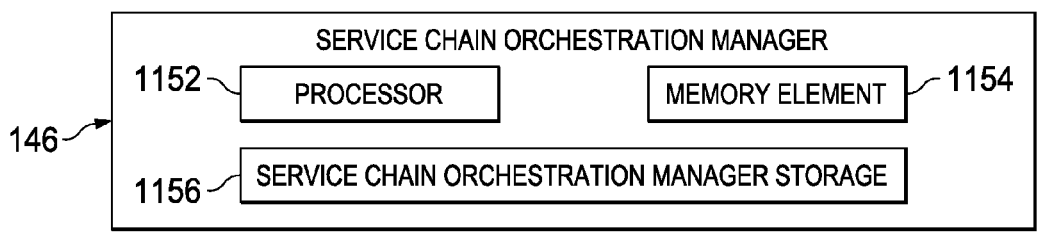

Referring to FIG. 11F, FIG. 11F is a simplified block diagram illustrating example details that can be associated with service chain orchestration manager 146 in accordance with one embodiment of communication system 100. FIG. 11F includes service chain orchestration manager 146, which, in one or more embodiments, can include at least one processor 1152, at least one memory element 1154 and a service chain orchestration manager storage 1156. In at least one embodiment, processor 1152 is a hardware processor configured to execute various tasks, operations and/or functions of service chain orchestration manager 146 as described herein and memory element 1154 is configured to store data associated with service chain orchestration manager 146. In at least one embodiment, service chain orchestration manager storage 1156 can be configured to store information associated with various operations as described herein. In various embodiments, service chain orchestration manager storage 1156 can be configured to store information associated with one or more of: a service function group load balancing table, a service function chain type table, a service policy table, maintaining/updating load balancing metrics for service function groups, determining whether to spin up new service functions and/or service function groups, assigning service function group identifiers, assigning service function chain type identifiers, determining system status (e.g., failure, loading, KPIs, etc. of server(s), switch(es), service function(s), SGC 134, etc.), combinations thereof or the like.

In regards to the internal structure associated with communication system 100, each of UE 112, gateway 122, routing devices 132.1-132.2, other switch(es) 136.2, other servers 140.2-140.N, and TDF 1002 may each also include a respective at least one processor, a respective at least one memory element and/or a respective storage. Hence, appropriate software, hardware and/or algorithms are being provisioned in UE 112, gateway 122, PCRF 124, routing devices 132.1-132.2, SGC 134, switches 136.1-136.2 (including respective classifiers 138.1-138.2), servers 140.1-140.N (including respective forwarders 142.1-142.N and one or more respective service functions 144.1.1-144.1.M through 144.N.1-144.N.M) and service chain orchestration manager 146 in order to facilitate the assignment of service functions for service chains and routing of subscriber IP flows for virtualized Services Gateway (vSG) 130 of communication system 100. Note that in certain examples, certain databases (e.g., for storing information associated with operations described herein) can be consolidated with memory elements (or vice versa), or the storage can overlap/exist in any other suitable manner.

In one example implementation, UE 112, gateway 122, PCRF 124, routing devices 132.1-132.2, SGC 134, switches 136.1-136.2, servers 140.1-140.N and service chain orchestration manager 146 are network elements, which are meant to encompass network appliances, servers, routers, switches, gateways, bridges, loadbalancers, firewalls, processors, modules, or any other suitable device, component, element, or object, which may be operable to exchange information that facilitates or otherwise helps the assignment of service functions for service chains and routing of subscriber IP flows (e.g., for networks such as those illustrated in FIGS. 1 and 9). In other embodiments, these operations and/or features may be provided external to these elements, or included in some other network device to achieve this intended functionality. Alternatively, one or more of these elements can include software (or reciprocating software) that can coordinate in order to achieve the operations and/or features, as outlined herein. In still other embodiments, one or more of these devices may include any suitable algorithms, hardware, software, components, modules, interfaces, or objects that facilitate the operations thereof. This may be inclusive of appropriate algorithms and communication protocols that allow for the effective exchange of data or information.

In various embodiments, UE 112, gateway 122, PCRF 124, routing devices 132.1-132.2, SGC 134, switches 136.1-136.2, servers 140.1-140.N and service chain orchestration manager 146 may keep information in any suitable memory element [e.g., random access memory (RAM), read only memory (ROM), an erasable programmable read only memory (EPROM), application specific integrated circuit (ASIC), etc.], software, hardware, or in any other suitable component, device, element, or object where appropriate and based on particular needs. Any of the memory items discussed herein should be construed as being encompassed within the broad term 'memory element'. The information being tracked or sent to UE 112, gateway 122, PCRF 124, routing devices 132.1-132.2, SGC 134, switches 136.1-136.2, servers 140.1-140.N and service chain orchestration manager 146 could be provided in any database, register, control list, cache, or storage structure: all of which can be referenced at any suitable timeframe. Any such storage options may be included within the broad term 'memory element' as used herein. Similarly, any of the potential processing elements, modules, and machines described herein should be construed as being encompassed within the broad term 'processor'. Each of the network elements and user equipment can also include suitable interfaces for receiving, transmitting, and/or otherwise communicating data or information in a network environment.

Note that in certain example implementations, the functions as outlined herein associated with assignment of service functions for service chains and routing of subscriber IP flows may be implemented by logic encoded in one or more tangible media, which may be inclusive of non-transitory media (e.g., embedded logic provided in an ASIC, in digital signal processing (DSP) instructions, software [potentially inclusive of object code and source code] to be executed by a processor, or other similar machine, etc.). In some of these instances, memory elements [as shown in FIGS. 11A-11F] can store data used for the operations described herein. This includes the memory elements being able to store software, logic, code, or processor instructions that are executed to carry out the activities described herein. A processor can execute any type of instructions associated with the data to achieve the operations detailed herein. In one example, a processor can include multiple processing cores, each capable of performing operations in a parallel or serial manner to carry out activities described herein. In another example, the processors [as shown in FIGS. 11A-11F] could transform an element or an article (e.g., data, information) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), a DSP processor, an EPROM, an electrically erasable PROM (EEPROM) or an ASIC that includes digital logic, software, code, electronic instructions, or any suitable combination thereof.

Note that in this Specification, references to various features (e.g., elements, structures, modules, components, steps, operations, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module as used herein this Specification, can be inclusive of an executable file comprising instructions that can be understood and processed on a computer, and may further include library modules loaded during execution, object files, system files, hardware logic, software logic, or any other executable modules.

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Note that with the examples provided above, as well as numerous other examples provided herein, interaction may be described in terms of one, two, three, or four network elements. However, this has been done for purposes of clarity and example only. In certain cases, it may be easier to describe one or more of the functionalities by only referencing a limited number of network elements. It should be appreciated that communication system 100 (and its teachings) are readily scalable and can accommodate a large number of components, as well as more complicated/sophisticated arrangements and configurations. Accordingly, the examples provided should not limit the scope or inhibit the broad teachings of communication system 100 as potentially applied to a myriad of other architectures.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, communication system 100 may be applicable to other exchanges or routing protocols. Moreover, although communication system 100 has been illustrated with reference to particular elements and operations that facilitate the communication process, these elements, and operations may be replaced by any suitable architecture or process that achieves the intended functionality of communication system 100.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:
 instantiating a plurality of service function instances for each of one or more hosts, wherein each service function instance corresponds to a particular service function type;
 grouping each of the plurality of service function instances into one or more service function groups, wherein at least one service function instance is a member of at least two service function groups established across one or more hosts;

establishing a service function path for each of a plurality of service function chain types associated with the one or more service function groups, wherein each service function chain type comprises an ordered combination of one or more of the service function instances within each service function group and wherein at least one service function chain type associated with at least one service function group can comprise a number of service function instances that is less than a total number of service function instances associated with the at least one service function group; and maintaining loading information for each of the plurality of service function groups based, at least in part, on a number of subscriber Internet protocol (IP) flows assigned to each service function group.

2. The method of claim 1, wherein at least one service function instance is a member of only one service function group for a particular host.

3. The method of claim 1, wherein the loading information is maintained in a service function group load balancing table, which includes a load balancing metric for each of the one or more service function groups.

4. The method of claim 3, further comprising:
determining each of the plurality of service function groups is unavailable to support additional subscriber IP flows;
instantiating one or more new service function instances based, at least in part, on the determination;
grouping the one or more new service function instances into a new service function group; and
establishing a service function path for each of the plurality of service function chain types associated with new service function group.

5. The method of claim 4, further comprising:
adding the new service function group and a load balancing metric associated with the new service function group into the service function group load balancing table, wherein the load balancing metric indicates that the new service function group is available to support additional IP flows.

6. The method of claim 1, further comprising:
determining a failure of a particular service function instance of a particular service function group;
instantiating a new service function instance to replace the particular service function instance;
grouping the new service function instance into the particular service function group; and
establishing a new service function path for one or more service function chain types for the particular service function group.

7. The method of claim 1, further comprising:
determining a particular service function instance of a particular service function group is underutilized;
grouping the particular service function instance into a new service function group; and
adding the new service function group and a load balancing metric associated with the new service function group into a service function group load balancing table.

8. One or more non-transitory tangible media encoding logic that includes instructions for execution by a processor, wherein the execution causes the processor to perform operations, comprising:
instantiating a plurality of service function instances for each of one or more hosts, wherein each service function instance corresponds to a particular service function type;
grouping each of the plurality of service function instances into one or more service function groups, wherein at least one service function instance is a member of at least two service function groups established across one or more hosts;
establishing a service function path for each of a plurality of service function chain types associated with the one or more service function groups, wherein each service function chain type comprises an ordered combination of one or more of the service function instances within each service function group and wherein at least one service function chain type associated with at least one service function group can comprise a number of service function instances that is less than a total number of service function instances associated with the at least one service function group; and
maintaining loading information for each of the plurality of service function groups based, at least in part, on a number of subscriber Internet protocol (IP) flows assigned to each service function group.

9. The media of claim 8, wherein at least one service function instance is a member of only one service function group for a particular host.

10. The media of claim 8, wherein the loading information is maintained in a service function group load balancing table, which includes a load balancing metric for each of the one or more service function groups.

11. The media of claim 10, wherein the execution causes the processor to perform further operations, comprising:
determining each of the plurality of service function groups is unavailable to support additional subscriber IP flows;
instantiating one or more new service function instances based, at least in part, on the determination;
grouping the one or more new service function instances into a new service function group; and
establishing a service function path for each of the plurality of service function chain types associated with new service function group.

12. The media of claim 11, wherein the execution causes the processor to perform further operations, comprising:
adding the new service function group and a load balancing metric associated with the new service function group into the service function group load balancing table, wherein the load balancing metric indicates that the new service function group is available to support additional IP flows.

13. The media of claim 8, wherein the execution causes the processor to perform further operations, comprising:
determining a failure of a particular service function of a particular service function group;
instantiating a new service function to replace the particular service function;
grouping the new service function into the particular service function group; and
establishing a new service function path for one or more service function chain types for the particular service function group.

14. The media of claim 8, wherein the execution causes the processor to perform further operations, comprising:
determining a particular service function instance of a particular service function group is underutilized;
grouping the particular service function instance into a new service function group; and adding the new service function group and a load balancing metric associated with the new service function group into a service function group load balancing table.

15. An apparatus comprising:
   at one memory element for storing data; and
   at least one processor for executing instructions associated with the data, wherein the executing causes the apparatus to perform operations, comprising:
   instantiating a plurality of service function instances for each of one or more hosts, wherein each service function instance corresponds to a particular service function type;
   grouping each of the plurality of service function instances into one or more service function groups, wherein at least one service function instance is a member of at least two service function groups established across one or more hosts;
   establishing a service function path for each of a plurality of service function chain types associated with the one or more service function groups, wherein each service function chain type comprises an ordered combination of one or more of the service function instances within each service function group and wherein at least one service function chain type associated with at least one service function group can comprise a number of service function instances that is less than a total number of service function instances associated with the at least one service function group; and
   maintaining loading information for each of the plurality of service function groups based, at least in part, on a number of subscriber Internet protocol (IP) flows assigned to each service function group.

16. The apparatus of claim 15, wherein the loading information is maintained in a service function group load balancing table, which includes a load balancing metric for each of the one or more service function groups.

17. The apparatus of claim 16, wherein the executing causes the apparatus to perform operations, comprising:
   determining each of the plurality of service function groups is unavailable to support additional subscriber IP flows;
   instantiating one or more new service function instances based, at least in part, on the determination;
   grouping the one or more new service function instances into a new service function group; and
   establishing a service function path for each of the plurality of service function chain types associated with new service function group.

18. The apparatus of claim 17, wherein the executing causes the apparatus to perform operations, comprising:
   adding the new service function group and a load balancing metric associated with the new service function group into the service function group load balancing table, wherein the load balancing metric indicates that the new service function group is available to support additional IP flows.

19. The apparatus of claim 15, wherein the executing causes the apparatus to perform operations, comprising:
   determining a failure of a particular service function instance of a particular service function group;
   instantiating a new service function instance to replace the particular service function instance;
   grouping the new service function instance into the particular service function group; and
   establishing a new service function path for one or more service function chain types for the particular service function group.

20. The apparatus of claim 15, wherein the executing causes the apparatus to perform operations, comprising:
   determining a particular service function instance of a particular service function group is underutilized;
   grouping the particular service function instance into a new service function group; and
   adding the new service function group and a load balancing metric associated with the new service function group into a service function group load balancing table.

* * * * *